United States Patent [19]

Kommrusch et al.

[11] Patent Number: 5,444,838
[45] Date of Patent: Aug. 22, 1995

[54] COMPUTER SYSTEM AND METHOD FOR INTERFERENCE CHECKING OF POLYHEDRA USING CAPPING POLYGONS

[75] Inventors: Steven J. Kommrusch, Ft. Collins, Colo.; Daniel G. Schmidt, Logan, Utah; Howard D. Stroyan, Ft. Collins, Colo.

[73] Assignee: Hewlett-Packard Company, Palo Alto, Calif.

[21] Appl. No.: 671,070

[22] Filed: Mar. 18, 1991

[51] Int. Cl.[6] ............................................. G06T 17/40
[52] U.S. Cl. .................................. 395/141; 395/134; 395/121
[58] Field of Search ............... 395/119, 120, 121, 133, 395/134, 141–143

[56] References Cited

U.S. PATENT DOCUMENTS

| | | | |
|---|---|---|---|
| 4,888,583 | 12/1989 | Lisocki et al. | 340/729 |
| 5,077,608 | 12/1991 | Dubner | 395/119 X |
| 5,113,490 | 5/1992 | Winget | 395/119 |

Primary Examiner—Almis R. Jankus

[57] ABSTRACT

A computer graphics system configured to allow a user to move at least one sectioning plane about at least one polyhedron having a plurality of polygons and to display, if necessary, an interference area between the plurality of polygons is disclosed. The computer graphics system first comprises at least one processor and at least one memory unit configured with the computer graphics system to process data. The computer graphics system further comprises an input device configured with the computer graphics system to allow the user to specify the at least one sectioning plane. The computer graphics system further comprises an interference checking module configured with the computer graphics system to generate an interference cap polygon indicative of the interference area. The computer graphics system further comprises a display device configured with the computer graphics system to display the interference cap polygon.

53 Claims, 30 Drawing Sheets

| 8A |
| 8B |
| 8C |
| 8D |
| 8E |
| 8F |
| 8G |
| 8H |

| EDGE ENTRY | FIRST VERTEX | SECOND VERTEX |
|---|---|---|
| 1 | 844 | 843 |
| 2 | 848 | 846 |
| 3 | 852 | 850 |
| 4 | 856 | 854 |

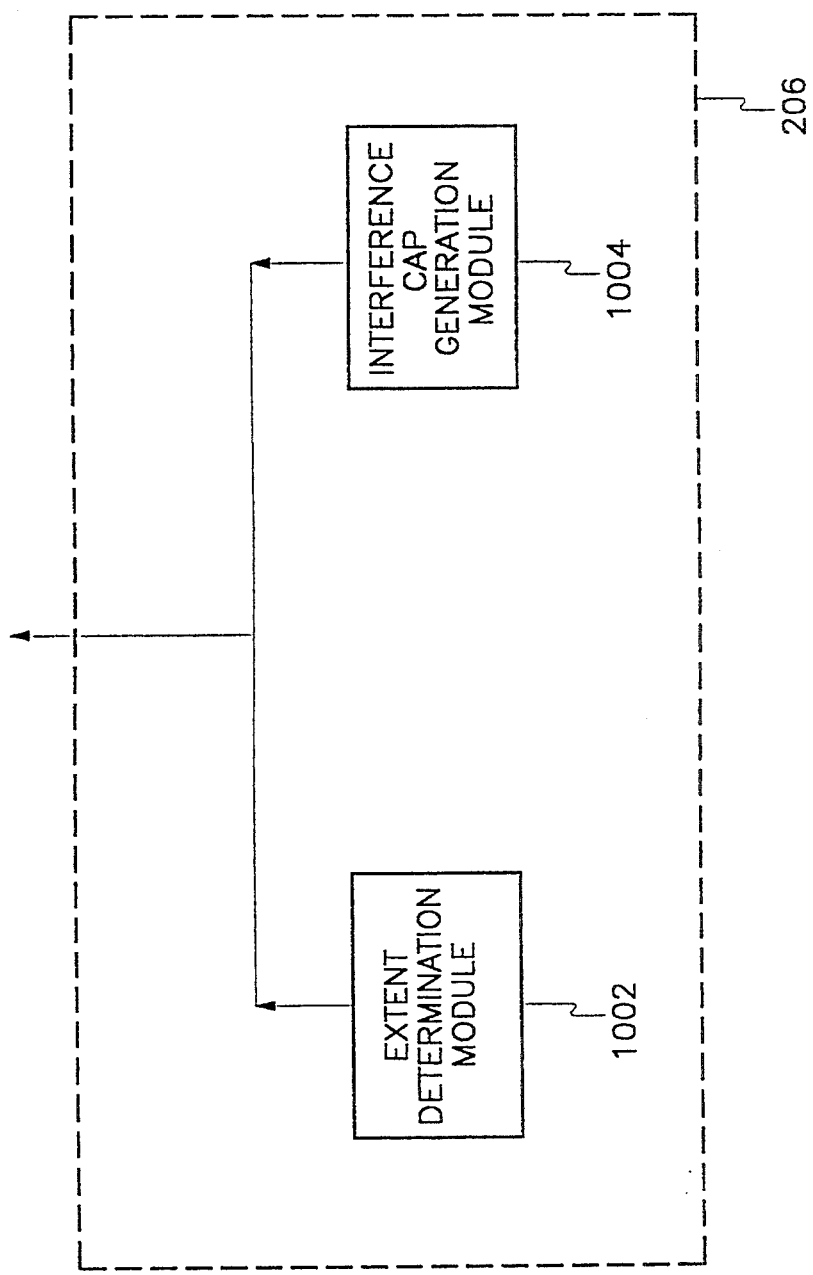

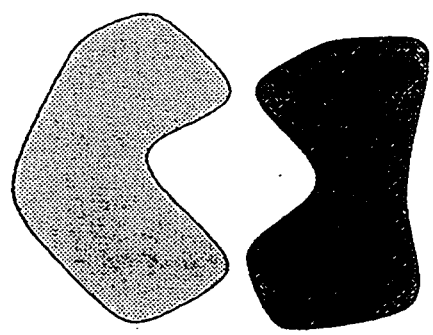
Fig. 15A
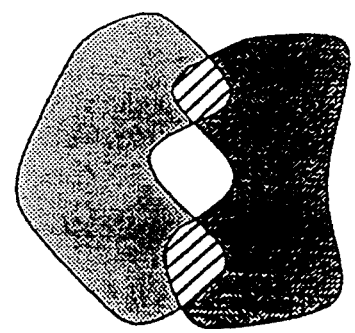
Fig. 15B
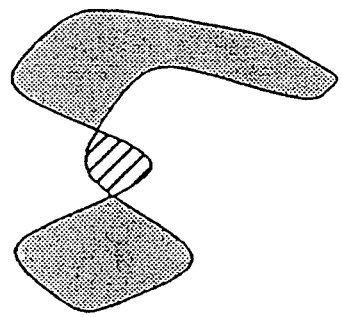
Fig. 15C
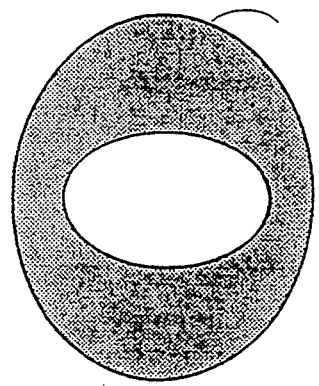
Fig. 15D
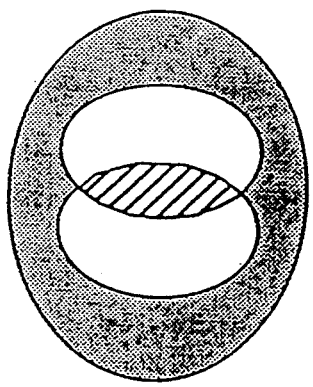
Fig. 15E
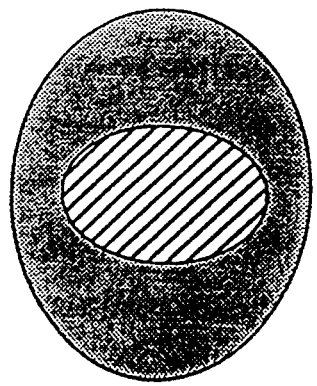
Fig. 15F
| 15A |
|---|
| 15B |
| 15C |
| 15D |
| 15E |
| 15F |
Fig. 15

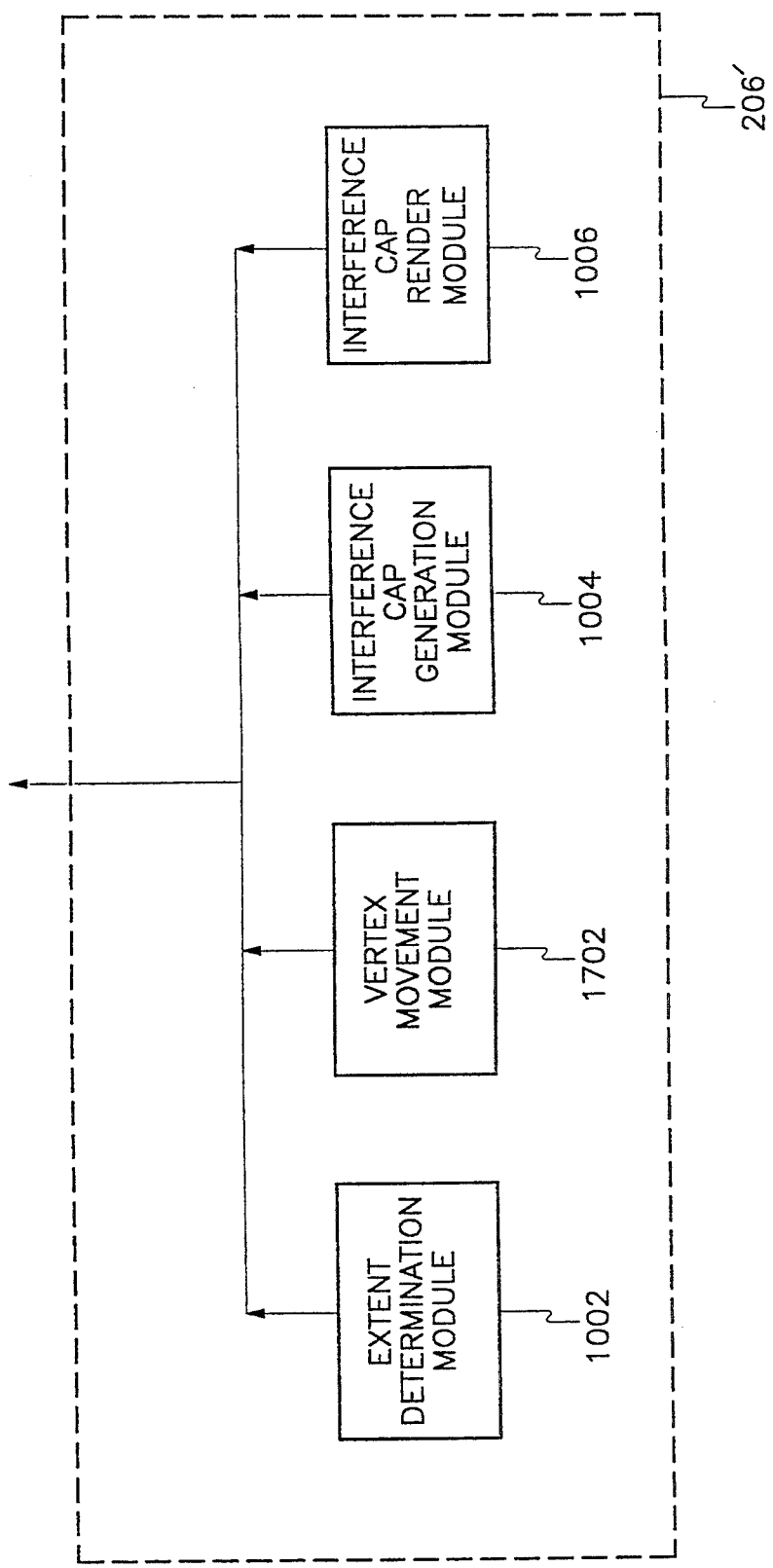

ACCEPT         REMAINING

FIG 20A
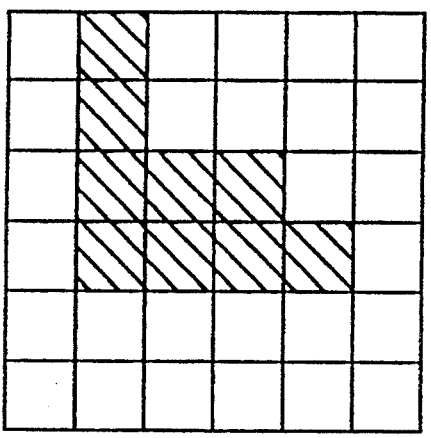
FIG 20B
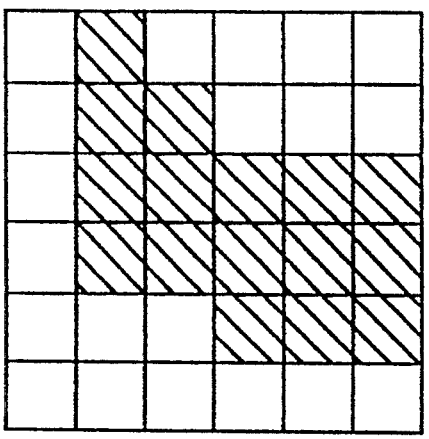
FIG 20C

COMPUTER SYSTEM AND METHOD FOR INTERFERENCE CHECKING OF POLYHEDRA USING CAPPING POLYGONS

FIELD OF THE INVENTION

The present invention relates generally to computer graphics systems. More particularly, the present invention relates to computer graphics systems that are configured to perform interference checking of three-dimensional objects.

BACKGROUND OF THE INVENTION

Computer graphics systems have been widely used by designers to design objects such as cars, airplanes, tooling, and the like. In recent years, computer graphics systems have been applied to more and more complex jobs. The objects rendered have improved from the early vector displays to photorealistic images.

Computer graphic systems typically employ what is known as primitives to create and display user specified geometric structures. Typical two-dimensional structures are points, lines, circles, and polygons.

Three-dimensional objects are often represented in polyhedra form. Polyhedra, by definition are, three-dimensional solids formed by a set of polygons. Curved surfaces of three-dimensional objects are typically approximated by displaying a combination of many small polygons.

Typically, designers only want to view a portion of the object. To avoid the rendering problems and clutter inherent in displaying data that is not within the prescribed visible range, graphic systems utilize what is known as a "view clipping" feature. This view clipping feature allows a designer to define a "window" in which a portion of the object is rendered. View clipping is performed using two-dimensional polygon clippers, such as the Sutherland-Hodgman (Sutherland et al,. "Reentrant Polygon Clipping", *Communications of the ACM* 17:32–42 (1974)) and the Weiler-Atherton (Weiler et al., "Hidden Surface Removal Using Polygon Area Sorting", *Computer Graphics* 11:214–222 (1977)) methods. These two dimensional clippers clip the two or three dimensional object against the defined window.

In contrast to view clipping, designers often want to inspect their designs (objects) from within. This is typically known as "sectioning." To accomplish this task, some computer graphics systems typically allow the designer to define arbitrary planes about the objects. The intersection of the planes with themselves and the object produce cut-away views which expose the interior of the object. Sectioning is a powerful tool for the graphics system designer.

Additionally, designers often want to determine prior to initiation of the manufacturing process, whether two objects will intersect during assembly and/or operation. In one situation for example, a designer of an airplane may want to ensure that a wheel sub-assembly can be properly be retracted into the airplane housing without interference with the other airplane sub-assemblies. In another situation, the designer may want to know if a cover will mate properly with a housing.

Identification of an interference between two or more objects that operate within the same system and/or subsystem prior to manufacturing is invaluable. As manufacturing costs continue to increase, there is a need for the designer to inspect the operation of their designs prior to entering the manufacturing stage.

One conventional interference system, used in the field of Constructive Solids Geometry (CSG), checks an entire model in three-dimensional space for interference problems. Although such a test is very thorough, it takes a great deal of computational time to render an answer.

SUMMARY OF THE INVENTION

The present invention is a computer graphics system, module, and method configured to detect an interference in a three-dimensional object or between three-dimensional objects. Unlike, conventional interference checking systems and/or methods, the present invention allows the user to check for an interference at a specific location within the three-dimensional object or objects. The user chooses the suspect region of the three-dimensional object(s) by specifying or moving a section plane or planes about the three-dimensional object(s). The three-dimensional objects are typically a set of polyhedra. Interference problems may exist within a single polyhedron itself or within a multi-polyhedron assembly.

After the creating the three-dimensional object on the graphics system, the user may check for an interference by specifying a sectioning plane at the area of interest. The surfaces of the polyhedron cut by the sectioning plane are then closed with a cap polygon. During this process the vertices of each cap polygon are stored in an interference cap list. Furthermore, cap polygons are separated into sub-polygons (referred to herein simply as polygons) as appropriate.

After all the polyhedra have been rendered and capped, all polygons are checked against all others for areas of overlap. The overlapping area of polygons represents interference of the polyhedron or polyhedra. The interference is displayed to the user as an interference cap polygon. The interference cap polygon may consist of sub-polygons (referred to herein simply as interference polygons. The interference polygons can be highlighted using a variety of polygon attributes. By way of example only, the interference polygons can be red with a white cross-hatch pattern.

Many interference problems involve observing a part to see if its motion causes interference. For example, if a piston rod is just a little too long, the piston will only hit the cylinder head during the upper part of its motion. In such situations, the expertise of the user, typically an engineer, allows her to know where to place the sectioning plane in order to view the potential problem areas. This allows the user to observe the full range of motion that an application program will display.

In situations where the user can use skill to limit the interference search space, the present invention is a much faster and easier approach to finding interference problems than conventional interference checking systems and/or methods. As such, the present invention can greatly shorten design cycles for complex mechanical objects.

In one embodiment, the present invention is a computer graphics system configured to allow a user to move at least one sectioning plane about at least one polyhedron having a plurality of polygons. The computer graphics system displays to the user the area of overlap (interference area) between the plurality of polygons. The computer graphics system may first comprise at least one processor and at least one memory unit configured with the computer graphics system to process data. The computer graphics system may further comprise an input device configured with the computer graphics system to allow the user to specify the at least one sectioning plane. The computer graphics system further comprises an interference checking module configured with the computer graphics system to generate an interference cap polygon indicative of the interference area. The computer graphics system may further comprise a display device configured with the computer graphics system to display the interference cap polygon.

The interference checking module may comprise a sectioning module, a cap formation module, and an interference module. The sectioning module is configured to section the plurality of polygons of each polyhedron against the user defined sectioning plane(s).

The cap formation module is configured to generate a cap polygon for each polyhedron after the plurality of polygons of each polyhedron have been sectioned. A cap polygon is generated for each sectioning plane. Each cap polygon has a plurality of vertices and may consist of multiple sub-polygons (referred to herein as simply polygons).

The interference module is configured to generate an interference cap based on a comparison of the polygons. The interference module comprises an extent determination module and an interference cap generation module. The extent determination module is configured to determine whether each of the polygons represents an "including area" or an "excluding area." A polygon that is flagged as "including area" represents a solid. In contrast, a polygon that is flagged as "excluding area" represents a hole. The "including area" and "excluding area" feature of the extent determination module allows polyhedron having holes therein to be interference checked.

The interference cap generation module is configured to compare each polygon against each other polygon to determine whether the polygons overlap each other. If the polygons overlap each other, the edges of the polygons that are part of the interference area are stored in an interference cap edge list. The edges of the polygon that area part of the interference area are stored as a pair of vertices. The pair of vertices may be indicative of the intersection point of the various polygons and/or vertices of a particular polygon that are also part of the interference area. The interference cap edge list contains all of the vertices of the interference cap polygon.

The interference cap generation module is further configured to generate the interference cap polygon by connecting the polygon vertices and/or intersection points stored in interference cap edge list into an ordered interference cap description. The interference cap polygon can be assigned a variety of attributes such as cross-hatching to enhance visualization of the interference area.

In another embodiment, the present invention is a computer method for interference checking of one or more polyhedra on a computer graphics system about at least one user defined sectioning plane. The computer method generally comprises the steps of sectioning the at least one polyhedron on the computer graphics system about the user defined sectioning plane, generating a cap polygon on the computer graphics system for each of the polyhedra that have been sectioned, and generating an interference cap polygon indicative of the overlapping area between each of the cap polygons.

The cap polygons may consist of multiple sub-polygons (referred to hereafter as simply polygons).

The step of generating an interference cap polygon may further comprise the step of calculating the area of each polygon. A positive area is indicative of that the polygon is "including area" and thus represents a solid. A negative extent area is indicative that the polygon is "excluding area," thus representing a hole.

The step of generating an interference cap polygon may further comprise the step of comparing each polygon against each other to determine whether the polygons overlap each other. The step of generating an interference cap polygon may further comprise the step of storing the edges of the polygons that are part of the interference area in a interference cap edge list. The edges of the polygons are stored as an ordered pair of vertices. The vertices may derive from the polygon intersection points and/or the vertices of the polygons that are part of the interference area.

The step of generating an interference cap polygon further comprises the step of generating the interference cap polygon by connecting the edges stored in the cap interference edge list into an ordered interference cap polygon description. The step of generating an interference cap polygon may further comprise the step of displaying the interference cap polygon with a specified attribute such as cross-hatching to thereby enhance visualization of the interference area.

BRIEF DESCRIPTION OF THE DRAWINGS

The following detailed description of the present invention will be more fully understood by reference to the accompanying drawings in which:

FIG. 8(d) is a cap edge list for the polyhedron of FIG. 8(a);

FIG. 10 is a high level block diagram showing the architecture of the interference module.

FIG. 15 is comprised of FIGS. 15(a)-(f). FIGS. 15(a)-(f) show various interfering and non-interfering cap polygons;

FIG. 16 is a high level block diagram showing another embodiment of the architecture of the interference module to include a vertex movement another embodiment of the architecture of the module.

FIG. 20(A) shows an example numbering for a 6×6 array of pixels;

FIGS. 20(B-C) show 2 examples of pixel coverage for capped polygons.

DETAILED DESCRIPTION OF THE PREFERRED EMBODIMENT

The present invention is a computer graphics system that is configured to perform interference checking of a three-dimensional object about a two-dimensional sectioning plane.

Figure 1:
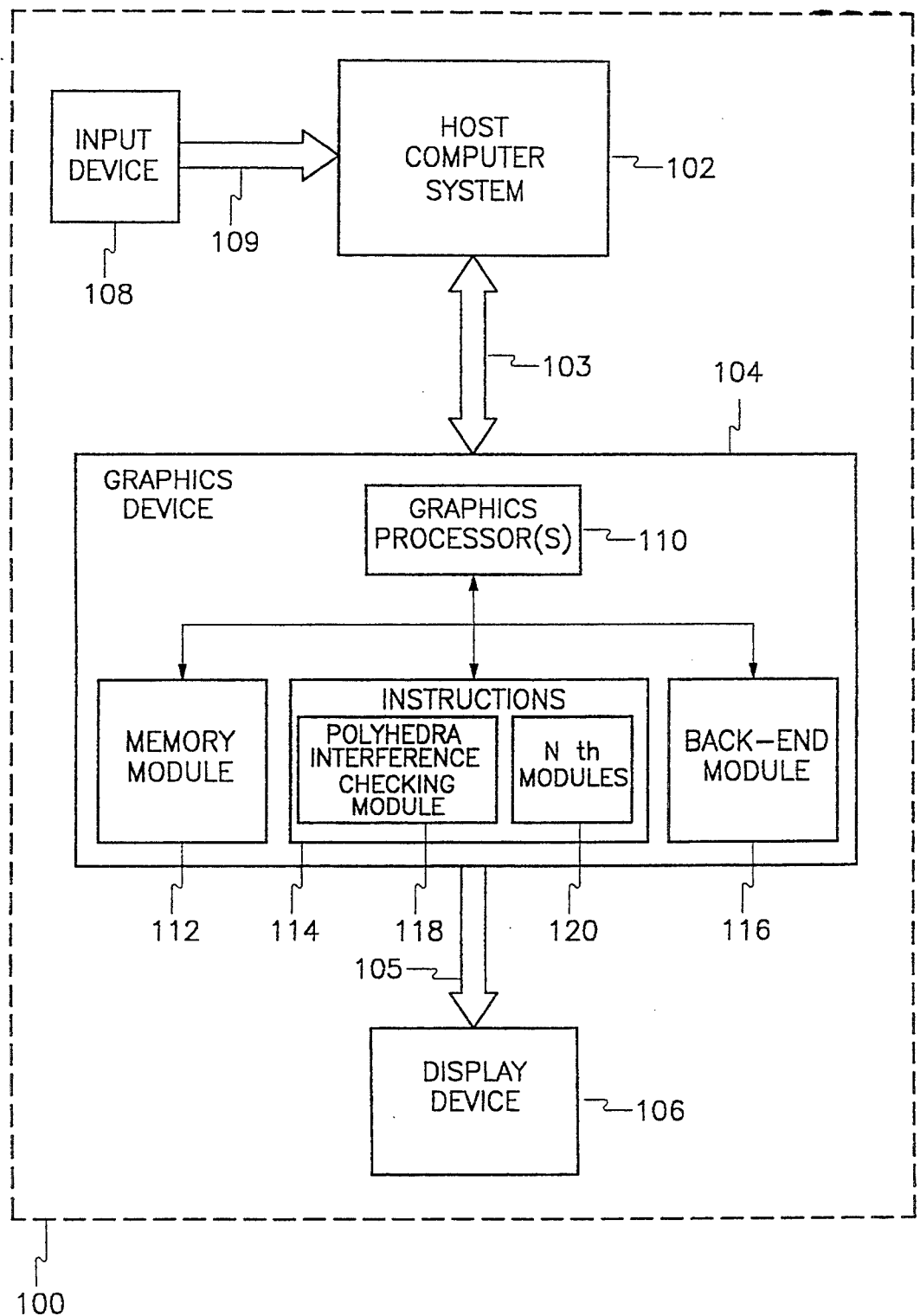
FIG. 1 is a high level block diagram showing the computer graphics system of the present invention.

Referring now to FIG. 1, a high level block diagram of a computer graphics system 100 of the present invention is shown. The computer graphics system 100 generally comprises a host computer system 102 connected to a graphics device 104 via a bus 103. In the preferred embodiment, host computer system 102 is a model HP 375 host computer, available from Hewlett Packard Corporation of Palo Alto, Calif., U.S.A. In the preferred embodiment, graphics device 104 is a model HP 425 VRX series device, available from Hewlett Packard Corporation of Palo Alto, Calif., U.S.A.

Computer graphics system 100 may further comprise a display device 106 connected to the graphics device 104 via a bus 105. Display device 106 is generally provided to display three-dimensional objects. In the preferred embodiment, display device 106 is that of a 1280×1024 pixel color graphics terminal which is available from a variety of electronic distributors.

Computer graphics system 100 may further comprise an input device 108 connected to the host computer 102 via a bus 109. Input device 108 is provided to allow the user to communicate with the computer graphics system 100. Input device 108 may take many forms. By way of example only, input device 108 may be a key board, a mouse or a joy stick.

Graphics device 104 generally comprises a graphics processor 110, a memory module 112, an instruction module 114, and a back-end module 116. Although not necessarily, graphics processor 110 may be a processor dedicated to performing graphics computations. Memory module 112 provides a storage location so that the graphics processor 110 can carry out certain tasks. Instruction module 114 provides graphics processor 110 with instructions for carrying out a variety of graphics related tasks.

Instruction module 114 comprises a polyhedron interference checking module 118. Although not specifically shown, instruction module 114 will typically comprise many graphics application modules other than interference checking module 118. Such other graphics application modules are generally denoted as Nth modules 120. Such other Nth modules 120 modules may include, but are not limited to, a sectioning module, a capping module, a scaling module for allowing the user to scale an object, a translation module for allowing the user to translate an object, a rotation module for allowing the user to rotate an object, and/or a lighting module for allowing the user to artificially light an object. As will become obvious to one skilled in the art, the polyhedron interference checking module 118 described herein can be easily integrated with and/or operate independently of such other Nth modules 120.

In the preferred embodiment, polyhedron interference checking module 118 is implemented as microcode (firmware). However, it should be understood that polyhedron interference checking module 118 could be embodied in other architectures. By way of example only, polyhedron interference checking module 118 may have a software and/or hardware architecture. In its software architecture, polyhedron interference checking module 118 may comprise computer instructions of an application program stored on and/or in a storage media device. By way of example only, such storage media devices may included, but are not limited to, a floppy disk or a random access memory (RAM) device. In its hardware architecture, polyhedron interference checking module 118 may comprise logic operations implemented in integrated circuit form, such as an application specific integrated chip (ASIC).

It should also be understood that aside from the polyhedron interference checking module 118, the computer components/sub systems/devices/modules which make up the computer graphics system 100 are all of conventional design. Any suitable presently available or future developed computer component/subsystems/devices/modules may be used.

Figure 2:
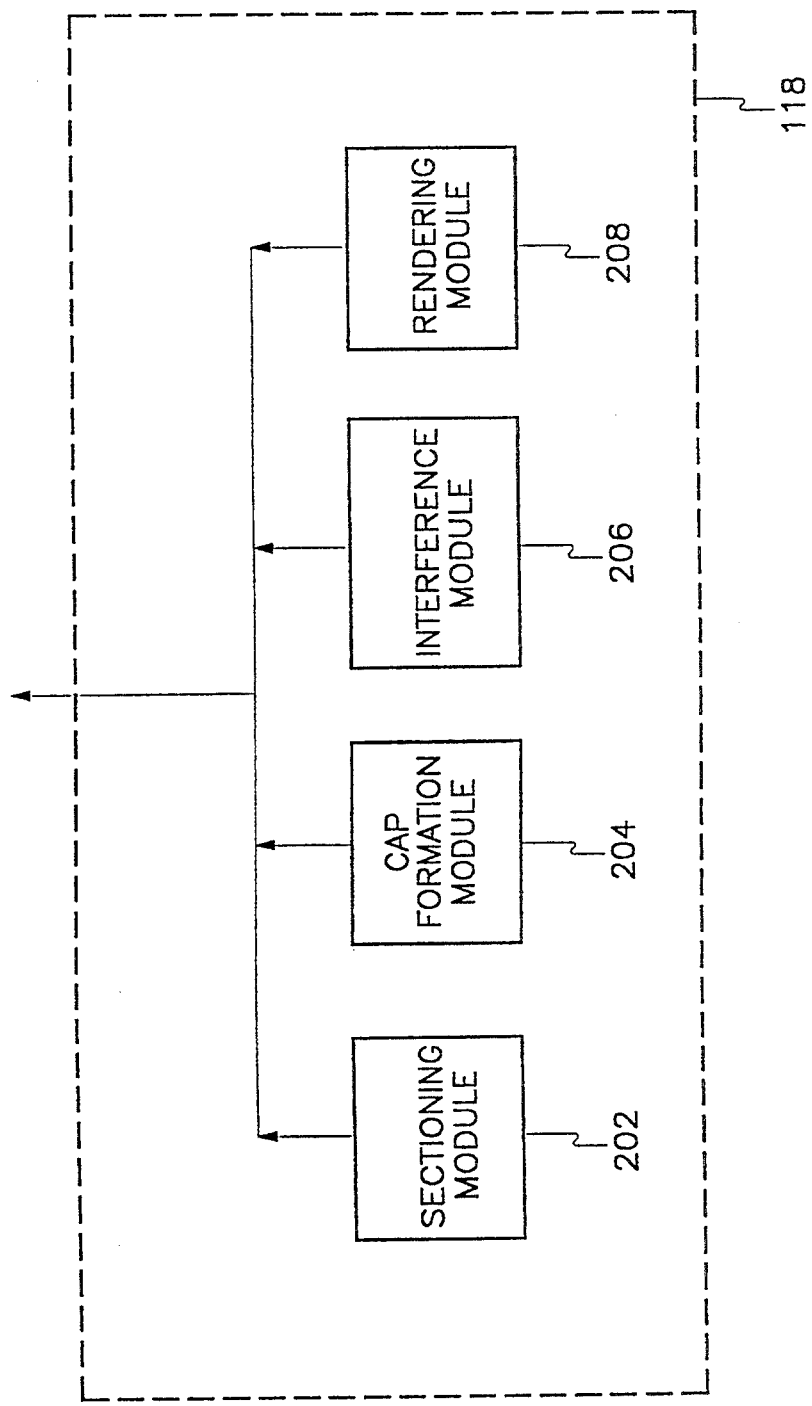
FIG. 2 is a high level block diagram showing the architecture of the polyhedra interference checking module of the present invention.

A high level architecture block diagram of polyhedron interference checking module 118 is shown in FIG. 2. Polyhedron interference checking module 118 generally comprises a sectioning module 202, a cap formation module 204, an interference module 206, and a rendering module 208. Sectioning module 202 is generally configured to section (clip) the polyhedron against sectioning planes specified by the user. Cap formation module 204 is generally configured to generate a cap polygon for each sectioning plane. The cap polygon may consist of multiple sub-polygons. Interference module 206 is generally provided to compare all of the cap polygons with each other and to generate an interference cap polygon indicative of the overlapping area of the polygons. If there is no interference between polygons, then no interference cap polygon is generated. Rendering module 208 is generally provided to display at the appropriate times, the clipped polyhedron(s), cap polygon(s), and the interference cap(s).

Figure 3:
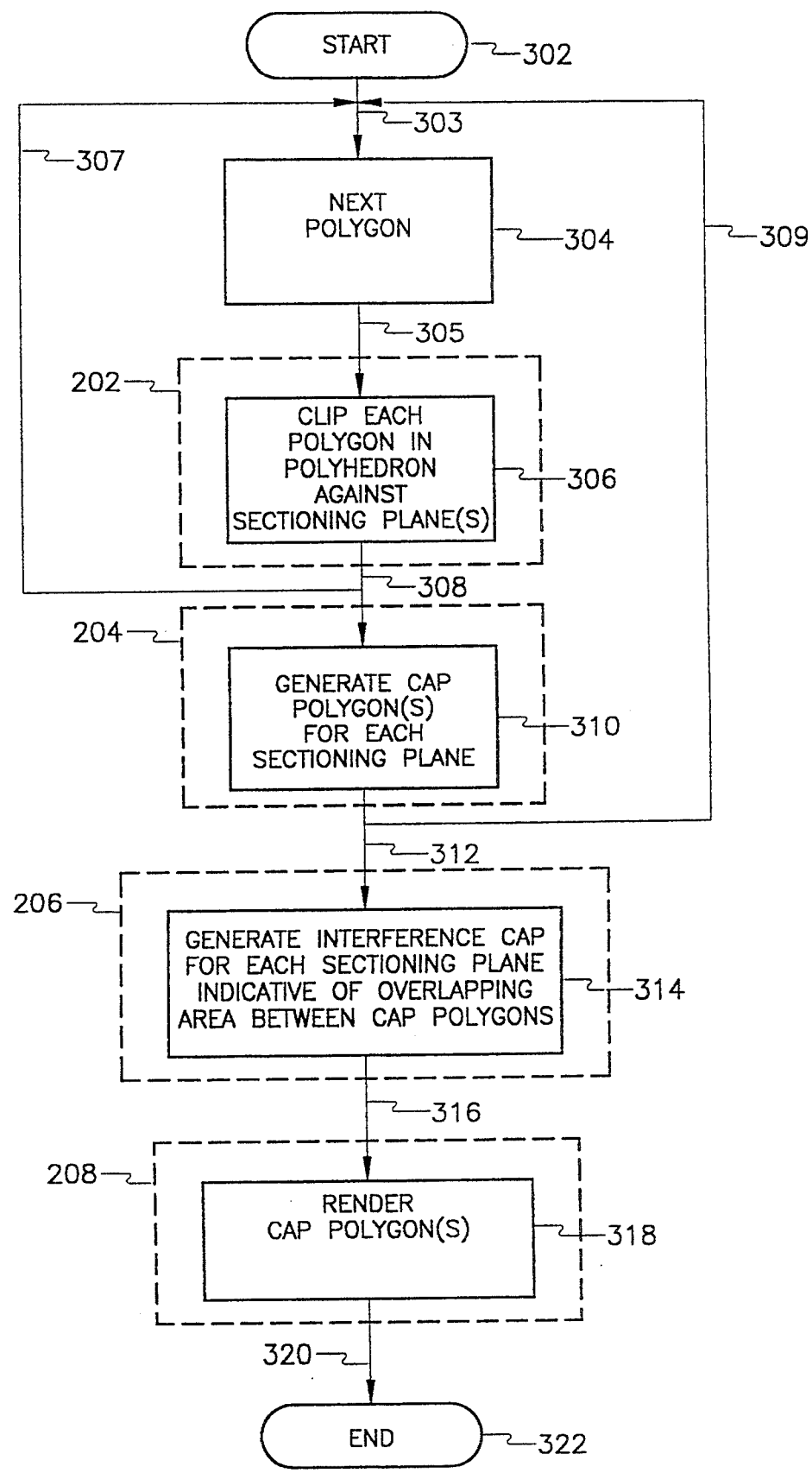
FIG. 3 is a high level flow chart showing the operation of the polyhedra interference checking module of the present invention.

FIG. 3 is a high level flow chart describing the inter-operation of sectioning module 202, cap formation module 204, interference module 206, and rendering module 208. A start block 302 initiates operation. Control is then passed along a logic path 303 to an operational block 304.

As shown by operational block 304, the first polygon of the first polyhedron in the pipeline is processed. Control is then passed along a logic path 305 to an operational block 306.

As shown by operational block 306, sectioning module 202 is prompted to section (clip) each polygon in the polyhedron against the defined sectioning plane(s). After all the polygons have been sectioned against the sectioning planes, control is passed along a logic path 308 to an operational block 310.

As shown by operational block 310, cap formation module 204 is then prompted to generate a cap polygon for each sectioning plane. A cap polygon may consist of multiple sub-polygons. Control is then passed along a logic path 312 to an operational block 314.

As shown by operational block 314, if all of the cap polygons have been generated and rendered, interference module 206 operates to collect all of the cap polygons from each polyhedron and generate an interference cap polygon. The interference cap represents the interference area between cap polygons and thus the polyhedron(s). The interference cap polygon may consist of multiple sub-polygons. Control is then passed along a logic path 316 to an operational block 318.

As shown by operational block 318, rendering module 208 then operates to display the interference cap polygon on the clipped polyhedra and the cap polygons. Control is then passed along a logic path 320 to an end block 322.

Figure 4:
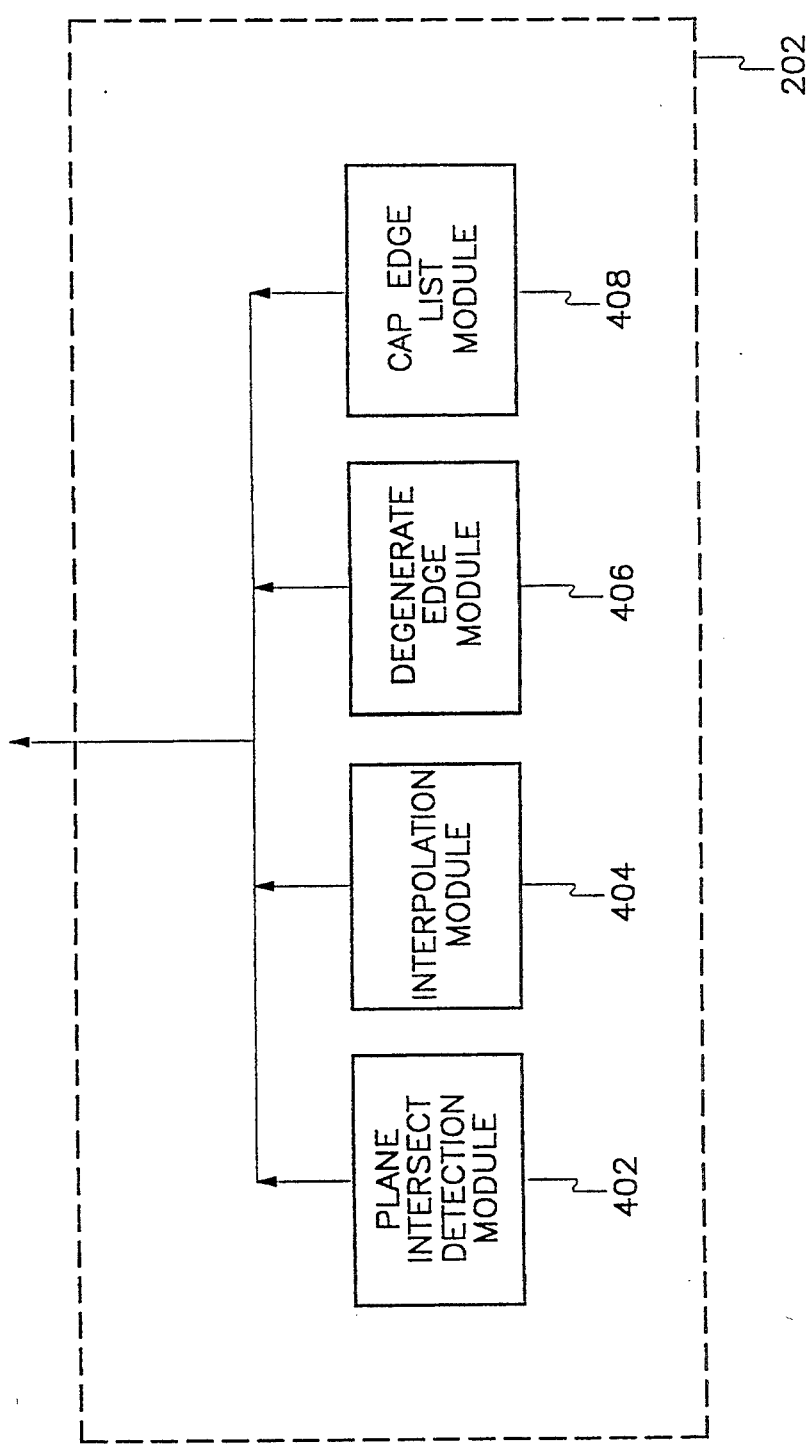
FIG. 4 is a high level block diagram showing the architecture of the sectioning module of the present invention.

Referring next to FIG. 4, a more detailed architectural block diagram of sectioning module 202 is shown. Sectioning module 202 comprises a plane intersect detection module 402, an interpolation module 404, a degenerate edge module 406, and a cap edge list module 408.

Plane intersect detection module 402 is generally configured to determine if the edges of the polygons that make up the polyhedron actually intersect the user defined sectioning plane(s). As will described more fully herein, this task is performed by checking the end points of each edge as they reside with respect to the sectioning plane(s). If the end points of the edge lie on opposite sides of the sectioning plan(s) then the edge does intersect the sectioning plane. If both end points of the edge lie on same side of the sectioning planes (either on the acceptance side of the sectioning plane or on the unacceptable side of the sectioning plane), then the edge does not intersect the sectioning plane.

Interpolation module 404 is generally configured to determine the polygon edge/section plane intersection point (vertex). This operation is necessary in order to accept and later render that portion of the polygon edge that is on the acceptance side of the sectioning plane.

Degenerate edge module 406 is generally configured to remove all degenerate edges that may have been generated by plane intersect detection module 402 and interpolation module 404. Degenerate edges may span areas that were not part of the original polyhedron. If capping polygons are to be generated, there can be no degenerate edges in the clipped polygons or the caps will be incorrect. Sutherland and Hodgman described a post-process that could be applied to their algorithm to remove such degenerate edges (Sutherland et al,. "Reentrant Polygon Clipping", *Communications of the ACM* 17:32–42 (1974)). This reference, in its entirety, is hereby incorporated by reference into this specification.

Cap edge list module 408 is generally configured to store the intersection points generated by the clipping process heretofore described in a cap edge list. As will be discussed more fully herein, the cap edge list provides a data base from which the cap formation module 204 can generate a cap polygon. A cap polygon may consist of multiple sub-polygon.

Figures 5, 5A:
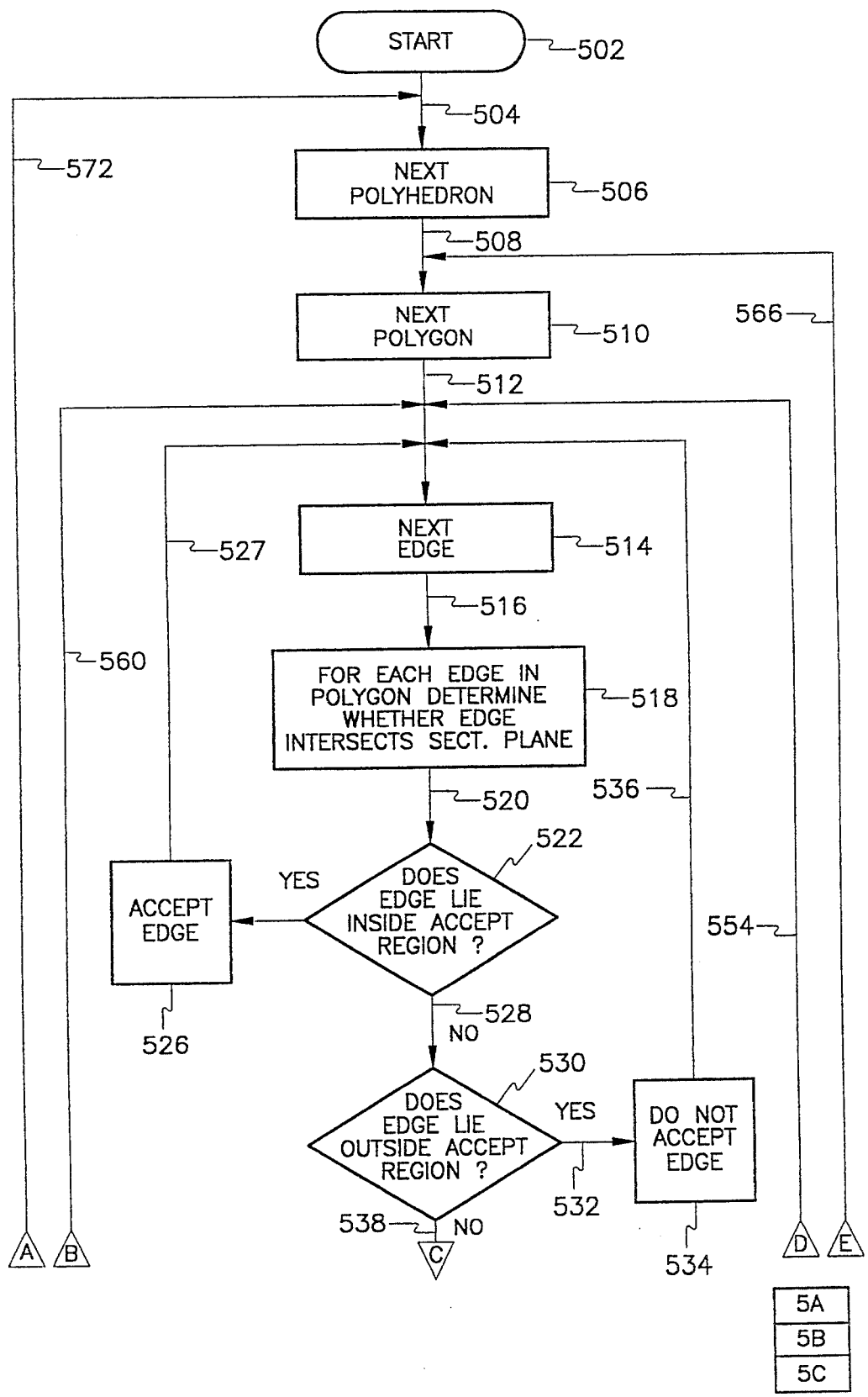
FIGS. 5(A-C) is a high level flow chart showing the operation of the sectioning module of the present invention.
Figure 5B:
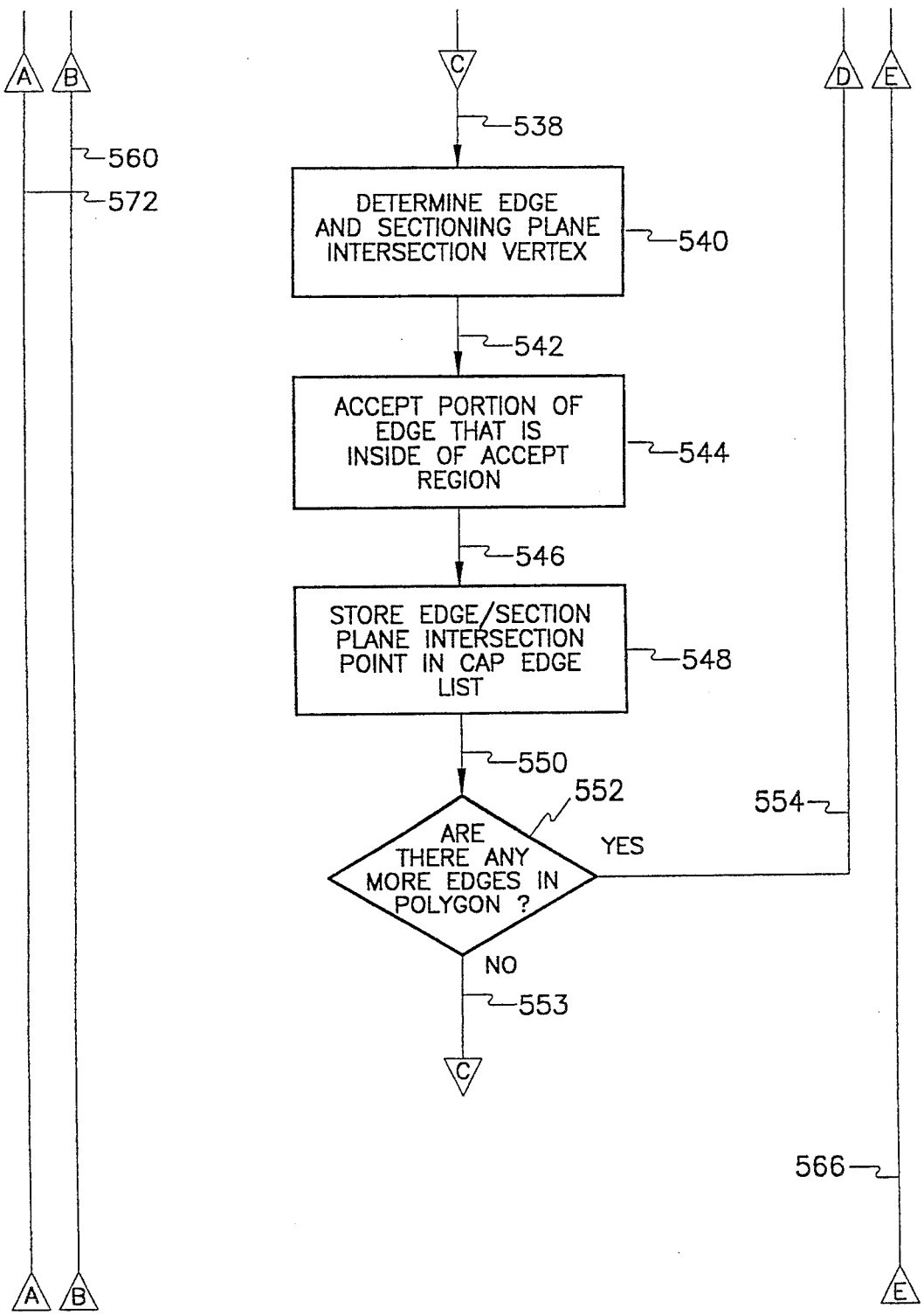
Figure 5C:
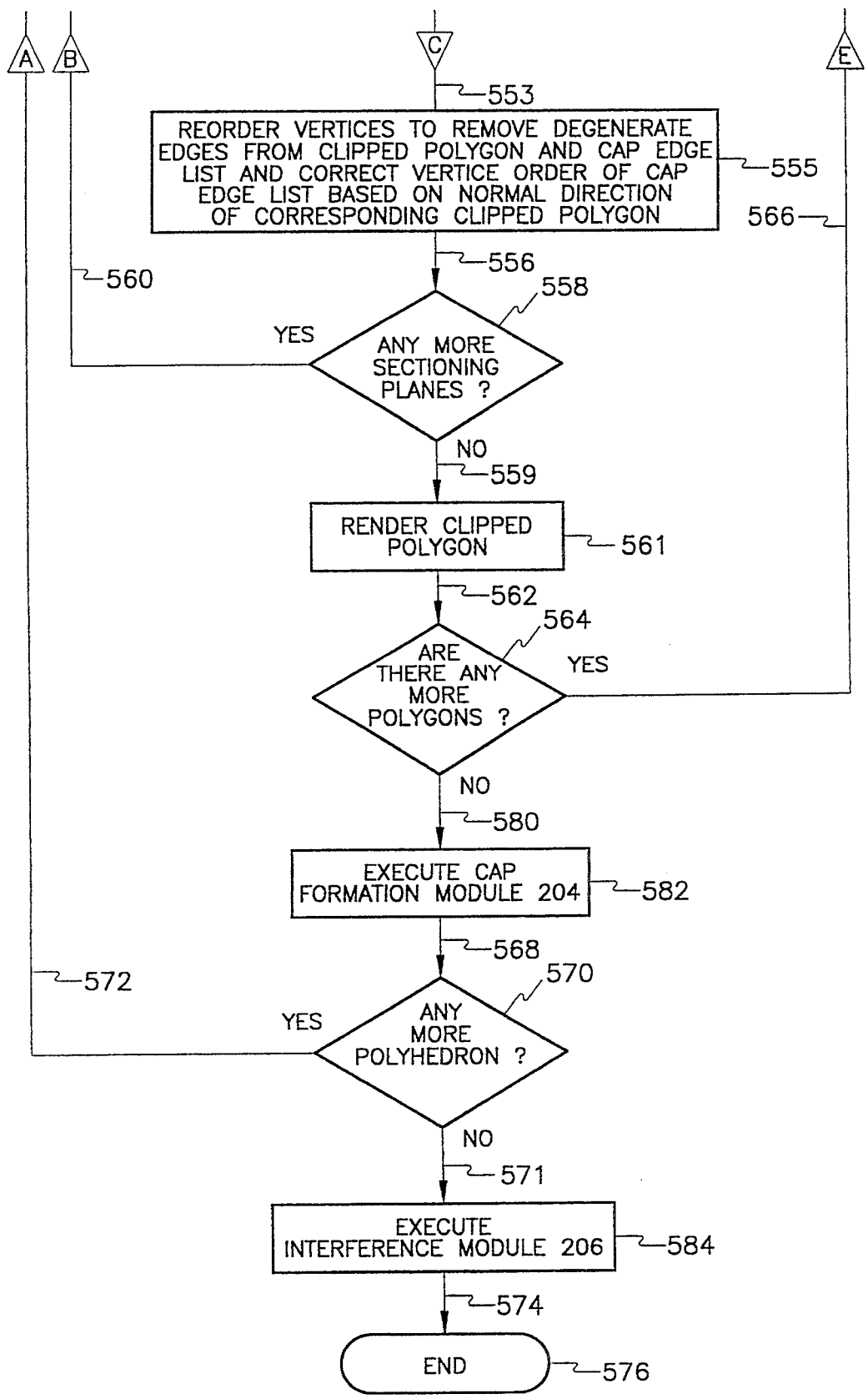

FIG. 5 is a high level flow chart showing the operation of the sectioning module 202 and the inter-operation of plane intersect detection module 402, interpolation module 404, degenerate edge module 406, and cap edge list module 408. However, in order to understand FIG. 5, several concepts and/or practical operations need to be identified. First, the computer graphics system 100 may often be used to design, for example, a mechanical engine. The mechanical engines typically have many parts. Each part may be one polyhedron. Each polyhedron may be made up of many polygons or even sub-polyhedra. In a pipeline architecture, polygons are passed down the pipeline one at a time. Pipeline architecture has proven to be a fast method of rendering objects.

Referring now to FIG. 5, a start block 502 initiates operation of sectioning module 202. Control is then passed along a logic path 504 to an operational block 506.

As shown by operational block 506, the sectioning module 202 is configured to process the first polyhedron passed down the pipeline. Control is then passed along a logic path 508 to an operational block 510.

As shown by operational block 510, the sectioning module 202 is configured to process the first polygon of the first polyhedron. Control is then passed along a logic path 512 to an operational block 511.

As shown by operational block 511, the sectioning module 202 is then configured to accept the first user defined sectioning plane. Control is then passed along a logic path 513 to an operational block 514.

As shown by operational block 514, the sectioning module 202 is then configured to process the first edge of the first polygon. For ease of discussion, the first edge and first polygon will be referred to herein as the "current edge" and "current polygon" respectively. Control is then passed along a logic path 516 to an operational block 518.

As shown by operational block 518, the sectioning module 202 is then configured to determine whether the current edge under examination intersects the user defined sectioning plane(s). This operation is performed using the following plane equation.

$$Ax + By + Cz + D = 0 \qquad \text{Eq. 1}$$

For example, given a known point, $[x_1, y_1, z_1]$ on a sectioning plane and normal vector, $[A\ B\ C]$, D of the plane equation is computed as follows:

$$D = -(Ax_1 + By_1 + Cz_1). \qquad \text{Eq. 2}$$

Substituting a known edge point, p, into the plane equation (eq. 1) tells us whether the edge point is inside or outside the acceptance region by the following relationship:

$$Ap_x + Bp_y + Cp_z + D \begin{cases} >0 \text{ } p \text{ is inside the acceptance region} \\ =0 \text{ } p \text{ is on the boundary} \\ <0 \text{ } p \text{ is outside the acceptance region} \end{cases} \quad \text{Eq. 3}$$

Control is then passed along a logic path 520 to a decisional block 522.

As shown by decisional block 522, if the edge lies fully inside of the acceptance region, then control is passed along a logic path 524 to an operational block 526. As shown by operational block 526, the edge is accepted and control is returned along a logic path 527 and logic path 550 to decisional block 552 where the next edge in the pipeline is processed. If, however, the edge is not fully inside the acceptance region, then control is passed along a logic path 528 to a decisional block 530.

As shown by decisional block 530, sectioning module 202 is then configured to determine whether the edge lies fully outside of the acceptance region. If the edge lies fully outside the acceptance region, then control is passed along a logic path 532 to an operational block 534. As shown by operational block 534, the edge is not accepted and control is returned along a logic path 536 and logic path 550 to decisional block 552 where the next edge in the pipeline is processed. Although not shown on the flow chart of FIG. 5, if the last edge of a polygon is determined to lie fully inside or outside the acceptance region, then control is returned to operational block 510 where the next polygon in the pipeline in processed.

If an edge is not fully inside the acceptance region and not fully outside the acceptance region, then control is passed along a logic path 538 to an operational block 540. As shown by operational block 540, the sectioning module 202 is then configured to determine the point (vertex) at which the edge intersects the sectioning plane. This is hereby defined as the intersection point. Calculation of the intersection point is necessary so that the fraction of the line that is outside the acceptance region can be computed and thereafter clipped.

For example, if S and E represent the end points of the edge that are respectively outside and inside of the acceptance region, let I represent the point of intersection between the edge and the plane. Distances between S and both E and a given sectioning plane provide similar triangles from which the intersection point is given by $$I_x = S_x + a\Delta x, \quad I_y = S_y + a\Delta y, \quad I_z = S_z + a\Delta z \quad \text{Eq. 4}$$

where $\alpha$ is the fraction of the line from S to the plane, $$(O \leq a \leq 1.0), \quad \text{Eq. 5}$$

$$a = \frac{-(AS_x + BS_y + CS_z + D)}{(A\Delta x + B\Delta y + C\Delta z)}$$

and $$\Delta x = E_x - S_x, \quad \Delta y = E_y - S_y, \quad \Delta x = E_z - S_z. \quad \text{Eq. 6}$$

If S and E are end points of the edge and the results of the plane equation as applied to S and E in operational block 518 are $R_s$ and $R_e$, then:

$$R_s = AS_x + BS_y + CS_z + D, \quad \text{Eq. 7}$$

$$R_e = AE_x + BE_y + CE_z + D$$

and, $$a = \frac{R_s}{R_s - R_e} \quad \text{Eq. 8}$$

Upon sectioning module 202 calculating the intersection point, control is passed along a logic path 542 to an operational block 544.

As shown by operational block 544, the sectioning module 202 is then configured to accept that portion of edge that is inside the acceptance region. Because the intersection point has been determined by operational block 540, sectioning module 202 can easily render that portion of the line beginning at the end point and finishing at the intersection point. Depending on the normal vector of the sectioning plane, either one of the end points may lie in the acceptance region. Control is then passed along a logic path 546 to an operational block 548.

As shown by operational block 548, the sectioning module 202 is then configured to store the intersection point in the cap edge list. Once all the original polygons that made up the polyhedron have been clipped and closed, the cap polygons, one for each clipping plane, will have been saved as an ordered vertex list indicative of the whether the cap polygon is "enclosing area" within its boundaries or, alternatively, "excluding area" within its boundaries. The cap edge list contains all the edges (properly ordered) generated while clipping all the polygons against a given sectioning plane. As will be more fully described with respect to cap formation module 204, the polyhedron capping module 218 is further configured to connect the edges of each cap edge list into a cap polygon data structure.

It should be understood that the cap polygons may be made up of several sub-polygons, have holes or appear otherwise concave. A cap polygon may be made up of multiple sub-polygons.

Control is then passed along a logic path 550 to a decisional block 552.

As shown by decisional block 552, the sectioning module 202 is then configured to determine whether there are any more edges in the current polygon. If additional edges exist, then control is returned along a logic path 554 to operational block 514 where the next edge in the pipe line is processed. If no additional edges exist in the polygon, then control is passed along a logic path 553 to an operational block 555.

As shown by operational block 555, the sectioning module 202 is then configured to reorder the vertices to remove degenerate edges from the clipped polygon and the cap edge list. Sectioning module 202 is further configured to correct the vertice order based on the normal direction of the corresponding clipped polygon. It is important, that intersection points (vertices) that make up a given edge are stored properly as either the first vertex or the second vertex. As will be described herein, the order of the vertices of each edge of the cap polygon allow the bounded area of the cap polygon to be viewed as a hole or a solid. If the cap polygon is made up of several sub-polygons, each sub-polygon may independently "include" or "exclude" area.

The storage technique of the preferred embodiment is as follows. Conceptually, the edges are stored such that when looking down the normal of the sectioning plane at a cap polygon edge, the left side of the edge (following the edge from the first vertex to the second vertex) will be the front face of the intersecting polygon. For example, consider an edge E1 having a first vertex V1 and a second vertex V2. Assume that closing of the polygon (addition of an E1) occurs from V1 to V2. Further, assume that normal direction of the clipped polygon (normal direction indicates the front face of the polygon) for which E1 was created for, is pointing to the left of the edge. In this case, vertices V1 and V2 are stored such that if you travel down the edge, the polygon normal is pointing to the left side of the edge, E1. In the present example, the first vertex of edge E1, would be V1 and the second vertex would be V2. Proper ordering of the vertices is important in that when the cap polygons are processed during operation of interference module 206, it is important to know that the polygon is either a hole or a solid. As such, the above storage technique allows polyhedron having holes to be interference checked.

The storage technique used uses only two coordinates to locate the point on the sectioning plane for further processing. For example, if the magnitude of the planes normal is largest in the y direction, then only the x and z coordinates need to be stored. The y coordinate of the point can later be recalculated as follows:

$$y = \frac{-Ax}{B} - \frac{Cz}{B} - \frac{D}{B} \qquad \text{Eq. 9}$$

Control is then passed along a logic path 556 to a decisional block 558.

As shown by decisional block 558, the sectioning module 202 is then configured to determine whether the polygon being processed in the pipeline has been clipped with respect to all the user defined sectioning planes. If additional sectioning planes exist, then control is returned along a logic path 560 to operational block 511 where the same polygon is clipped against the next sectioning plane. If no additional sectioning planes exist, then control is passed along a logic path 559 to an operational block 561.

As shown by operational block 561, sectioning module 202 is then configured to render the clipped polygon. Control is then passed along a logic path 562 to a decisional block 564.

As shown by decisional block 564, the sectioning module 202 is then configured to determine whether any more polygons exist in the polyhedron. If additional polygons exist, then control is passed along a logic path 566 to operational block 510 where the next polygon in the pipeline is processed. If no additional polygons exist, then control is passed along a logic path 580 to an operational block 582.

Operational block 582 is the execution block for the cap formation module 204. Cap formation module 204 will be described more fully herein. Cap formation module 204 operates to generate a cap polygon for each sectioning plane using the cap edge list(s). The cap polygon may consist of multiple sub-polygons. Control is then passed along a logic path 568 to a decisional block 570.

As shown by decisional block 570, the sectioning module 202 is then configured to determine whether any more polyhedra exist. If additional polyhedra exist, then control is passed along a logic path 572 to operational block 506 where the next polyhedron in the pipeline is processed. If no additional polyhedra are present, then control is passed along a logic path 571 to an operational block 584.

As shown by operational block 584 is the execution block for the interference module 206. Interference module 206 will be described more fully herein. For the moment, assume that interference module 206 operates to examine all the polygons of each cap polygon with each other to generate an interference cap indicative of the overlapping area of the polygons. Control is then passed along a logic path 574 to an end block 576.

Figure 6:
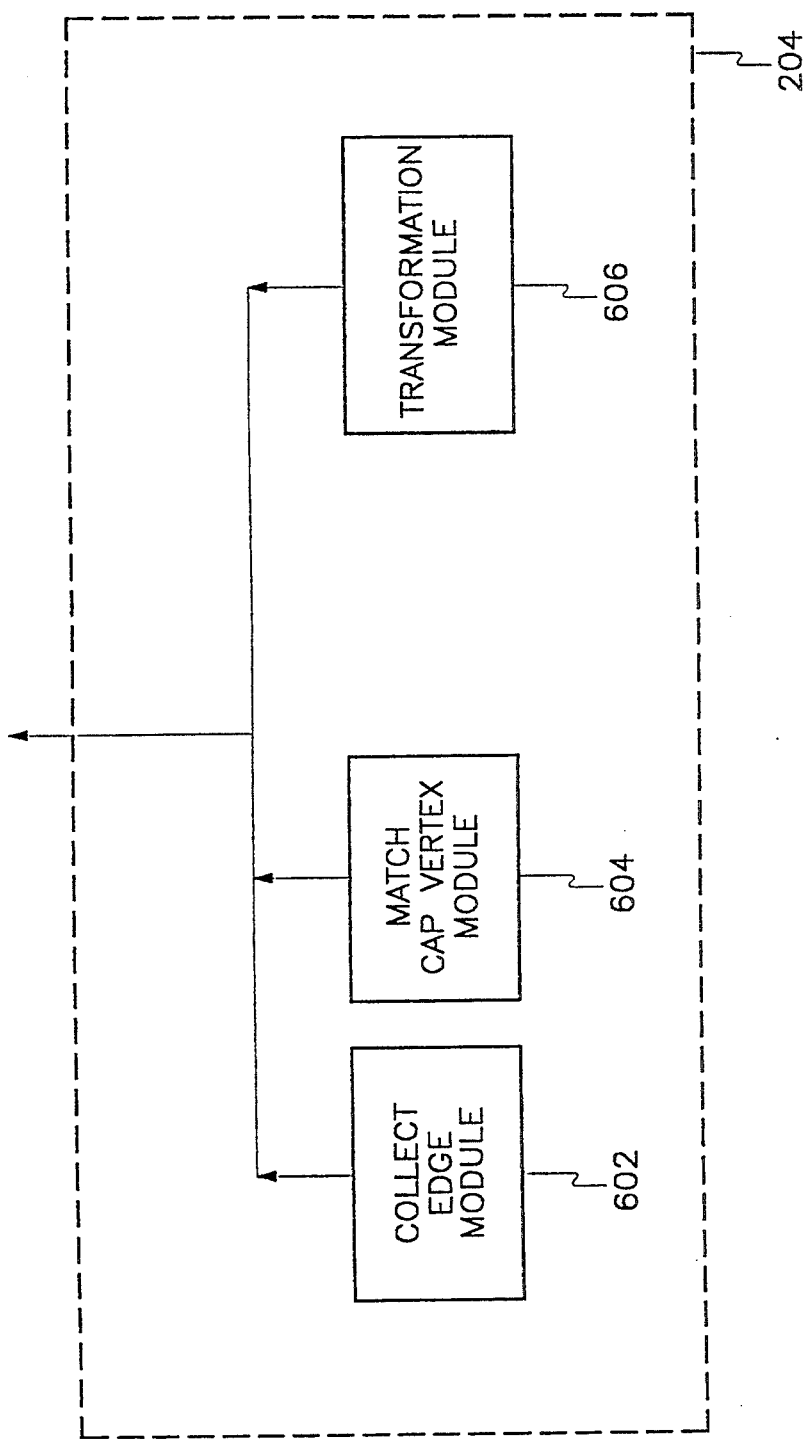
FIG. 6 is a high level block diagram showing the architecture of the cap formation module of the present invention.

FIG. 5 heretofore described is a high level flow chart showing the operation and configuration of sectioning module 202. Following is the pseudo-code for the sectioning module 202:

for each polyhedron:
  for each polygon in polyhedron:
    for each sectioning plane:
      for each edge of polygon:
        if both end points lie inside:
          trivially accept this edge;
        else if both end points lie outside:
          trivially reject this edge;
        else: calculate the vector/plane intersection;
          update the offending end point;
      remove degenerate edges;
      add new polygon edges to the cap edge list in their proper order;
    render the clipped polygon;

Referring next to FIG. 6, a more detailed description of cap formation module 204 is shown. Cap formation module 204 is generally configured to reorder the set of edges in the cap edge list(s) into an ordered vertex description of a cap polygon. Cap formation module 204 generally comprises a collect edge module 602, a match cap vertex module 604, and a transformation module 606.

Collect edge module 602 is generally configured to collect the cap edges from the cap edge list. Caps are collected independently for each sectioning plane. As such, the model to world transformation matrix may be changed during rendering without affecting the capping procedure.

Match cap vertex module 604 is generally provided to join the vertices of all the edges in the cap edge list into a cap polygon. The cap polygon can consist of sub-polygon caps. As such, and as will be described more fully herein, match cap vertex module is configured to generate a cap polygon description which insures its integrity as either a hole or as a solid and to store for later processing by the interference module 206. This data is stored in a cap list.

Transformation module 606 is generally provided to transform the cap polygon into a data structure suitable for rendering by the graphics pipeline architecture.

Figure 7A:
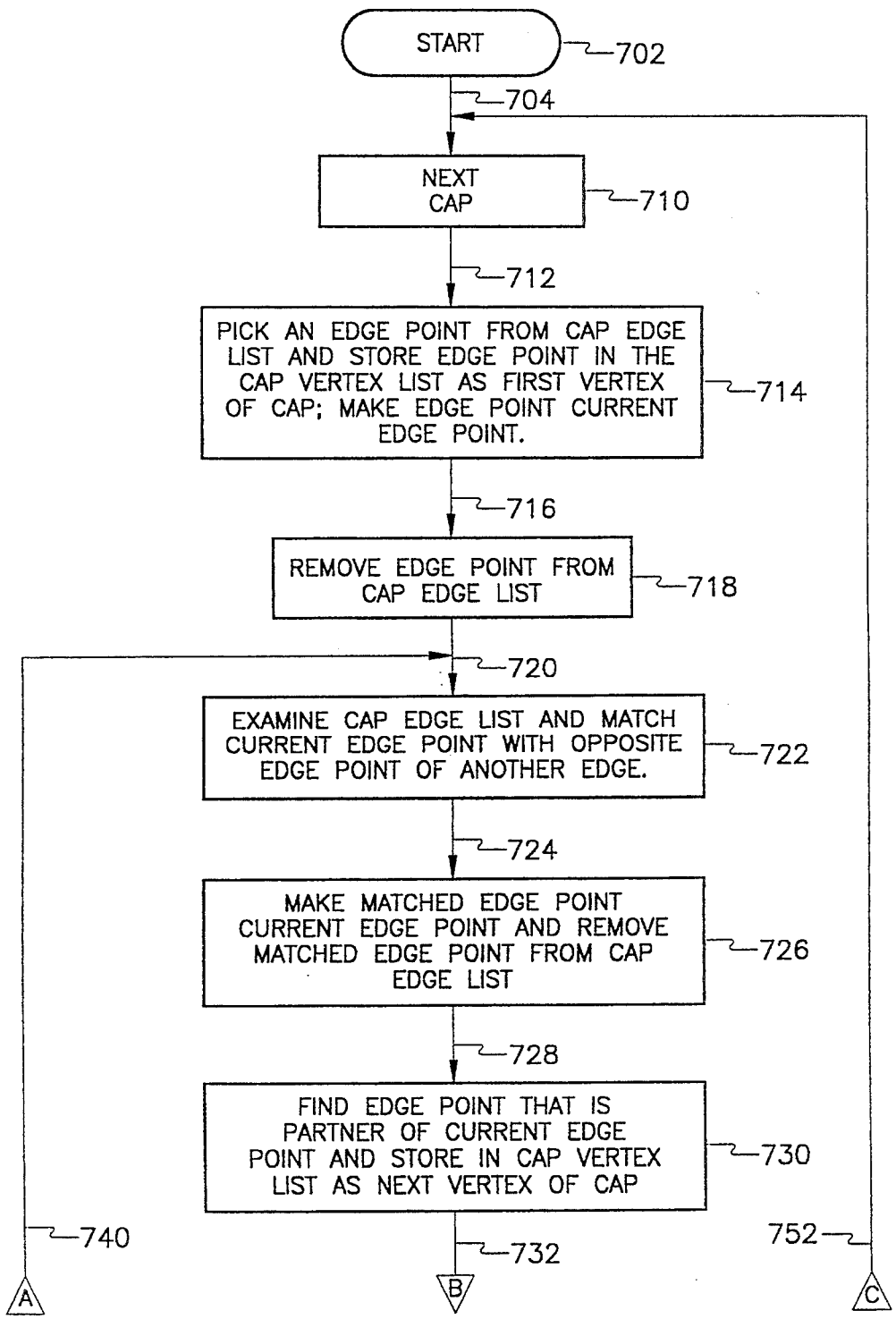
FIGS. 7(A-B) is a high level flow chart showing the operation of the cap formation module of the present invention.
Figure 7:
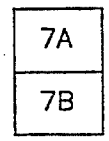
Figure 7B:
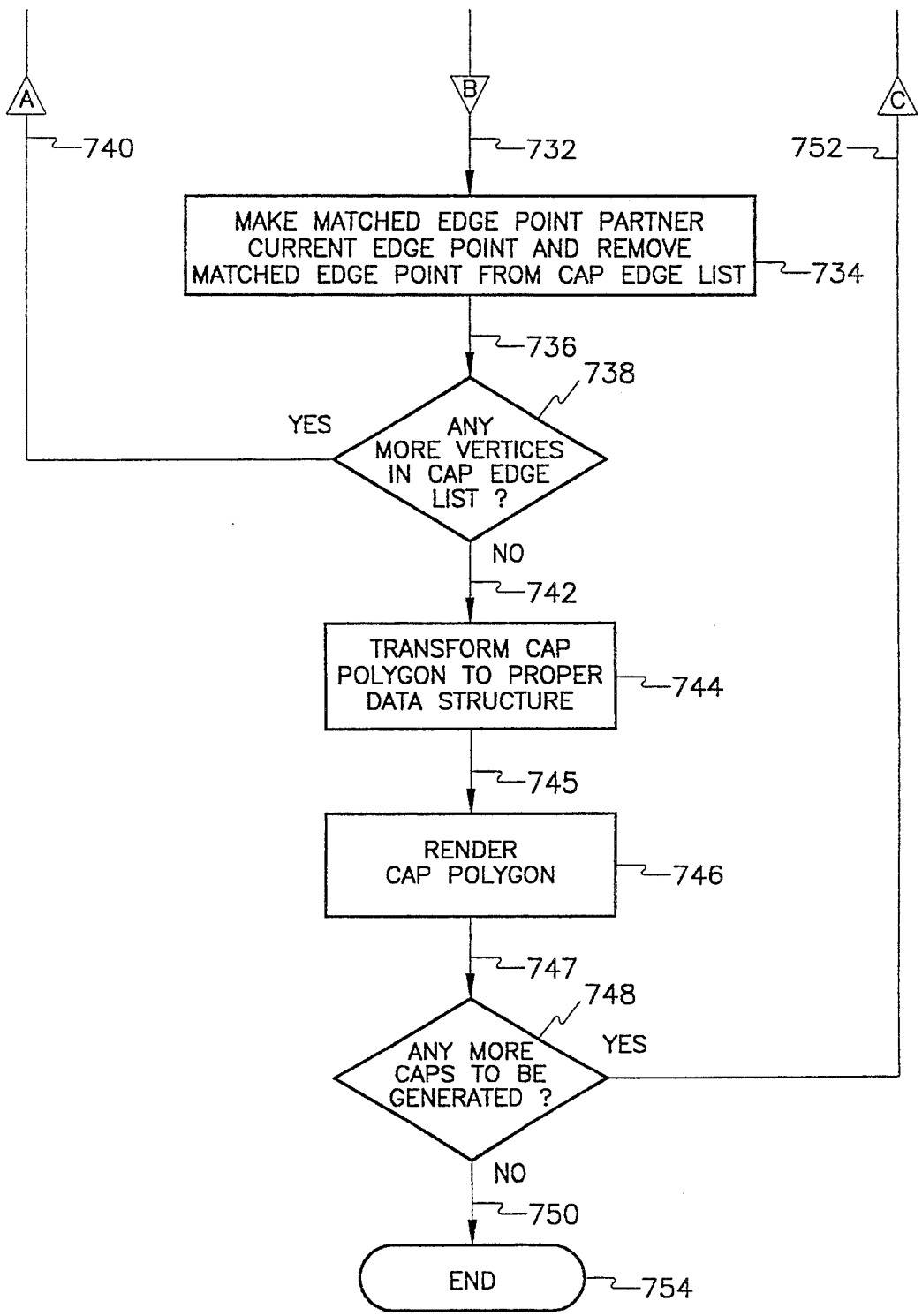

Referring next to FIG. 7, a high level flow chart shows the operation of cap formation module 204, and the inter-operation of collect edge module 602, match cap vertex module 604, and transformation module 606. A start block 702 initiates operation of cap formation module 204. Control is then passed along a logic path 704 to an operational block 710.

As shown by operational block 710, the cap formation module 204 is first configured to process the first cap edge list. One cap edge list is generated for each sectioning plane and one cap polygon will be generated for each cap edge list. Control is then passed along a logic path 712 to an operational block 714.

As shown by operational block 714, the cap formation module 204 is then configured to pick a vertex from the first cap edge list. To ensure integrity as either a hole or a solid, the chosen vertex must be a second vertex. Cap formation module 204 is further configured to make the chosen vertex the current vertex. Control is then passed along a logic path 716 to an operational block 718.

As shown by operational block 718, the cap formation module 204 is further configured to label the chosen vertex point from the cap edge list as the last sub-polygon vertex. It is necessary to insure that the chosen vertex will not be rematched in later processing. Control is then passed along a logic path 720 to an operational block 722.

As shown by operational block 722, the cap formation module 204 is further configured to examine the cap edge list and match the current vertex with the closest opposite vertex of a different edge that remains in the cap edge list. Opposite vertex means that the first vertex of an edge can only match with the second vertex of a different edge. Similarly, the second vertex of an edge can only match with the first vertex of a different edge. This match operation is performed as follows.

Recall that as the sectioning module 202 executes the clipping process, the edges of the cap polygons accumulate as edge end-point pairs and are properly stored as a first vertex and a second vertex. As previously described, defining the first vertex as one end point of the edge and the other end point as the second vertex is important to ensure that the resultant cap polygon will be properly treated as either a hole or as a solid. After all the polyhedron's polygons have been processed, each end-point (stored as either a first vertex or a second vertex) must ideally equal at least one other edges end-point. The problem that must be overcome is a by-product of the floating-point intersection calculations that produced each of these end-points. Significant roundoff error may be introduced, especially when 32-bit floating point precision is used. This is further complicated by the fact that the original data may have had similar errors creating small gaps between the polygons, particularly when the polygons did not share vertices in a mesh structure.

To reconnect the edges of the cap edge list, each point must be compared with every other point in the cap edge list to find the geometrically closest point in three dimensions. This turns out to be a comparison of the magnitudes of each of the vectors formed by using one point as the start point and each of the remaining points as the end point. Because the absolute magnitudes must be compared, the magnitude squared may be used. This is computed as the sum of the squares of $\Delta x$ and $\Delta y$ or $\Delta y$ and $\Delta z$ or $\Delta z$ and $\Delta x$, depending on which two vertices have been chosen. On the average, each match requires $(n-1)/2$ such compares, where n is the number of edges in the cap polygon.

If we assume, however, that all end points that lie within some small distance, $\epsilon$, of each other can be matched together without regard to which is literally closest, then an imaginary circle can be drawn around each point. If two point lie within the same circle (the magnitude squared is less than $\epsilon^2$), we can match the two points and move on. Using this technique, we save an average of half the comparisons that had to be made to find the closest match. The allowable small distance, $\epsilon$, than can be used is defined as the average_edge_length/10,000. This approximation has found to be quite acceptable in matching two vertices which have slightly differing locations.

In addition, the matching process of operational block 722 can be further simplified by allowing the magnitude of the vertex location to be approximated and compared with an approximated circle. The circle is approximated as a two-dimensional square centered at the point in question with an axial radius of $\epsilon$.

Now we can quickly compare $|\Delta x|$ against $\epsilon$. If it is too large we can immediately move on to the next point because the first point cannot lie within the square. If $|\Delta x|$ is small enough then we compare $|\Delta y|$ to the half-width of the square. If the half-width is too small to accommodate $|\Delta x|$ and $|\Delta y|$, then the point can be rejected. The above case was the situation where $\Delta x$ and $\Delta y$ were chosen. The other cases, $\Delta y$ and $\Delta z$ or $\Delta z$ and $\Delta x$, would be processed in the same manner.

Typically, the match would be found after testing half of the remaining unmatched points with just the $|\Delta x|$ check and then once a point passed that, one more comparison will further verify that it was indeed a match. Notice that each check requires a total of two subtractions and an absolute value. No multiplication is needed at all, and the absolute value is a simple matter when dealing with IEEE floating-point numbers that are represented as a sign-magnitude pair; just clear the sign bit.

Control is then passed along a logic path 724 to an operational block 726.

As shown by operational block 726, cap formation module 204 is then configured to make the matched vertex the current vertex. The cap formation module 204 is further configured to remove the matched vertex from the cap edge list. Control is then passed along a logic path 728 to an operational block 730.

As shown by operational block 730, cap formation module 204 is then configured to examine the cap edge list and locate the edge partner of the current vertex. Recall that edges are stored as a pair of end vertices. As such, knowledge of one vertex results in knowledge of the opposite vertex. The cap formation module 204 is further configured to store the vertex partner as the next vertex in the cap vertes list. The cap vertex list is hereby defined as an ordered list of vertices that form the cap polygon. Control is then passed along a logic path 732 to an operational block 734.

As shown by operational block 734, cap formation module 204 is then configured to make the matched vertex partner the current vertex. The cap formation module 204 is further configured to remove the matched vertex partner from the cap edge list. Control is then passed along a logic path 736 to a decisional block 738.

As shown by decisional block 738, cap formation module 204 is then configured to check whether any more vertices remain in the cap edge list. If additional vertices remain in the cap edge list, then control is passed along a logic path 739 to decisional block 737. If, however, no additional vertices remain in the cap edge list, then control is passed along a logic path 742 to an operational block 744.

As shown in decisional block 737, the cap formation module 204 is then configured to check whether the current edge point was labeled as the last sub-polygon vertex by operational block 718. If the current edge point is so labeled, control is returned along logic path 741 to operational block 714 where a new sub-polygon cap vertex list is started. If it is not so labeled, control is returned along logic path 740 to operational block 722 where the current vertex is matched with the closest vertex that remains in the cap edge list.

As shown by operational block 744, cap formation module 204 is then configured to transform the cap polygon data structure in the cap list into a data structure compatible with the graphics pipeline architecture. This is necessary so that the cap polygon can be properly displayed by rendering module 706. Cap formation module 204 is further configured to store the cap data structure in an interference cap list for further processing by the interference module 206. Interference cap list is hereby defined as the set of cap polygons that have been rendered for a given sectioning plane. The cap polygons may consist of multiple sub-polygons. The stored vertices have only two coordinates. Control is then passed along a logic path 745 to an operational block 746 where the cap polygon is rendered. Control is then passed along a logic path 747 to a decisional block 748.

As shown by decisional block 748, cap formation module 204 is then configured to determine whether any additional caps need to be generated. If additional caps need to be generated, then control is passed along a logic path 752 to operational block 710 where the next cap edge list is processed. If, however, no additional caps need to be rendered, then control is passed along a logic path 750 to an end block 754 where operation of cap formation module 204 is terminated.

After operation of the cap formation module 204, a cap list for each polyhedron will have been generated. As will be described more fully herein, the interference module 206 operates on the cap list to generate an interference cap polygon that is indicative of the overlap area encompassed by the individual cap polygons.

FIG. 7 as heretofore described is a high level flow chart showing the operation and configuration of cap formation module 204. Following is the pseudo code for the cap formation module 204:

For each edge in cap edge list
  Add length to total.
Calculate ε average_edge_length/10000.
For each vertex V1 in cap edge list
  Label V1 as last sub-polygon vertex.
  Do
    Search cap edge list for vertex V2 that is closer than ε to V1.
    Set V1 to be edge partner of V2
    Remove V2 from cap edge list.
    Add V1 to cap vertex list.
    Remove V1 from cap edge list.
  While V1 is not labeled as last sub-polygon vertex.
Transform ordered cap vertex list into compatible polygon structure.
Render cap polygon.

Operation of the polyhedron interference checking module 118 in so far as it generates the cap lists and thus the cap polygons will now be further described with reference to the FIGS. 8(a)–(h), wherein a polyhedron 800 is shown. Thereafter, the interference module 206 of the polyhedron interference checking module 118 which generates the actual interference cap, will be described.

Figures 8, 8A:
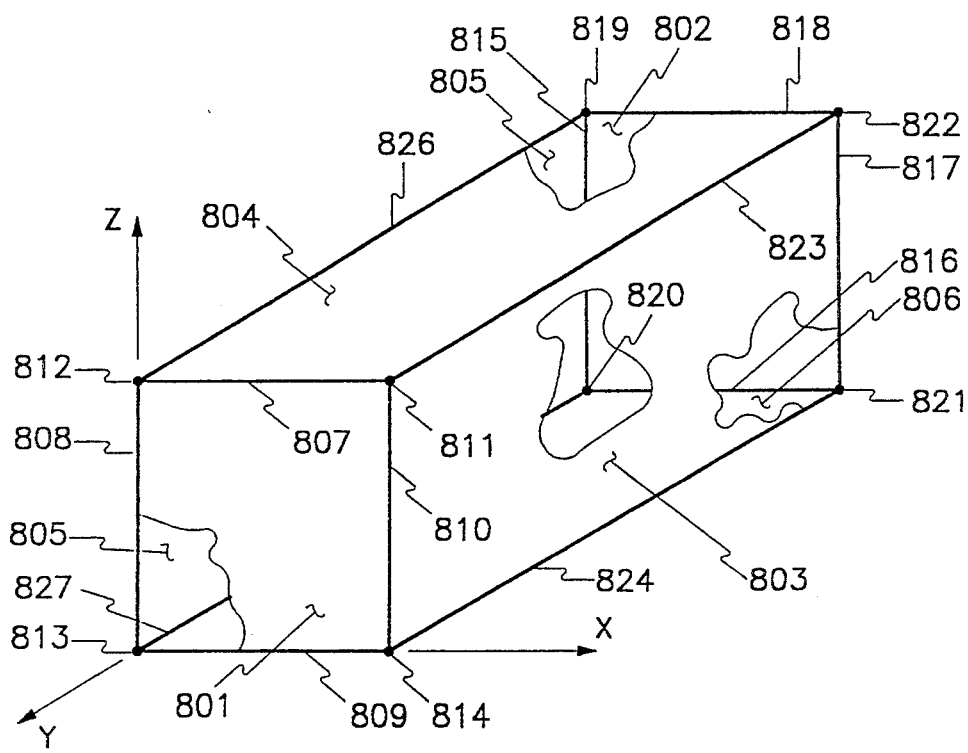
FIG. 8 is comprised of FIGS. 8(a)-(h), where
FIG. 8(a) is a perspective view of a solid polyhedron to be capped by the present invention.

As shown by FIG. 8(a), polyhedron 800 is made up of six polygons; polygons 801–806, respectively. Although cut-away views are shown in FIGS. 8(a)–(h) for ease of discussion and identification of the polyhedron 800 features, in operation, polyhedron 800 would be displayed with appropriate shading to appear as a solid object.

Polygon 801 is formed of edges 807–810, respectively. Edges 807–810 are connected by vertices 811–814. Polygon 802 is formed of edges 815–818. Edges 815–818 are connected by vertices 819–822, respectively.

Polygon 803 is formed of edges 823, 824, 810, and 817. Edges 810 and 817 of polygon 803 are shared (common) with polygons 801 and 802, respectively. Edge 823 is formed by connection of vertices 811 and 822. Edges 824 is formed by connection of vertices 814 and 821. Polygon 804 is formed of edges 807, 818, 823 and 826. Edges 807, 818, and 823 of polygon 804 are shared with polygons 801, 802, and 803, respectively. Edges 826 is formed by connection of vertices 812 and 819. Polygon 805 is formed of edges 808, 815, 826, and 827. Edges 808, 815, and 826 of polygon 805 are shared with polygons 801, 802, and 804, respectively. Edges 839–842 are formed by connection of vertices 813 and 820. Polygon 806 is formed of edges 809, 816, 824, and 827. Edges 809, 816, 824, and 827 of polygon 806 are shared with polygons 801, 801, 803, and 805, respectively.

Figure 8B:
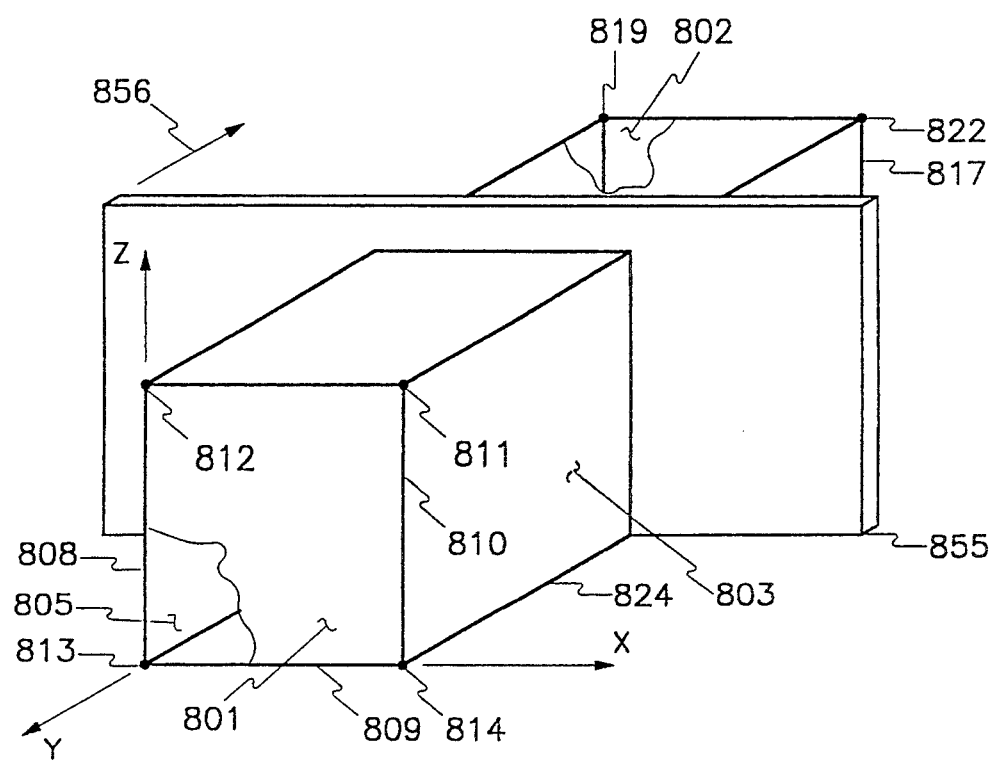
FIG. 8(b) is a perspective view of the polyhedron of FIG. 8(a) showing a sectioning plane.
Figure 8C:
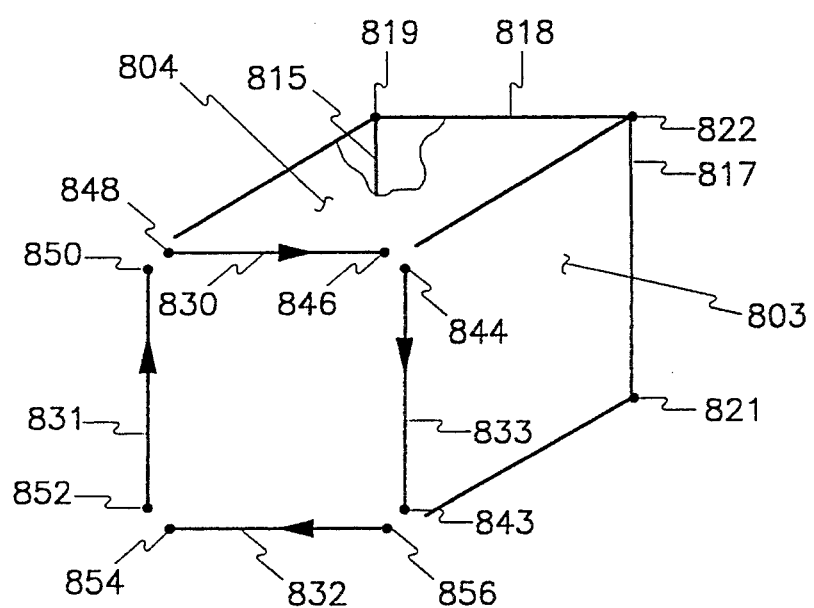
FIG. 8(c) is a perspective view of the sectioned polyhedron of FIG. 8(a)

Referring next to FIG. 8(b), the user has specified a sectioning plane 855 having a normal vector 856. The direction of normal vector 856 defines the acceptable region to which the polyhedron 800 is clipped by sectioning module 202.

The following discussion of the operation of polyhedron capping module 118 will be made with continual reference to FIGS. 5 and 7. As discussed above, FIG. 5 is the flow chart showing the operation of sectioning module 202. Furthermore, FIG. 7 is the flow chart showing the operation of cap formation module 204.

As shown by operational block 506 of FIG. 5, the polyhedron 800 is passed down the pipeline. As shown by operational block 510, the first polygon of polyhedron 800 is processed. For purposes of this discussion, assume that polygon 801 is the first polygon passed down the pipeline, polygon 802 the second, and so forth with polygon 806 being the last polygon of polyhedron 800 in the pipeline.

As shown by operational block 514, the first edge of the first polygon in the pipeline (polygon 801) is processed by sectioning module 202. For purposes of this discussion, assume that edge 807 is the first edge passed down the pipeline, edge 808 the second edge, and so forth, with edge 810 being the last edge of polygon 801 in the pipeline. As shown by operational block 518, sectioning module 202 first operates to determine whether the edge 807 intersects the sectioning plane 855. As shown by decisional block 522, sectioning module 202 decides whether edge 807 lies fully inside the acceptance region. In the present case, edge 807 does not lie fully within the acceptance region. As such, control is passed to decisional block 530 where sectioning module 202 decides if edge 807 lies fully outside the acceptance region. In the present case, edge 807 lies fully outside the acceptance region. Control is then passed to operational block 534, where sectioning module 202 does not accept edge 807. In other words, edge 807 is rejected. Control is then returned to operational block 824 through decisional bloce 552, where the next edge of polygon 801 is processed. In the present example, we have defined edge 808 as the next edge in the pipeline.

Edge 808 is processed the same as edge 807 described above. As such, sectioning module 202 determines that edge 808 is also fully outside the acceptance region and does not accept edge 808. Control is then returned to operational block 514, where the next edge of polygon 801 is processed. In the present example, we have defined edge 809 as the next edge in the pipeline.

Edge 809 is processed the same as edge 807 described above. As such, sectioning module 202 also determines that edge 809 is fully outside the acceptance region and does not accept edge 809. Control is then returned to operational block 514, where the next edge of polygon 801 is processed. In the present example, we have defined edge 810 as the next edge in the pipeline (edge 810 is also the last edge in polygon 801).

Edge 810 is processed the same as edge 807 described above. As such, sectioning module 202 also determines that edge 810 is fully outside the acceptance region and does not accept edge 810. Since there are no more sectioning planes and polygon 801 was totally rejected and because edge 810 is the last edge in the polygon 801, control is returned to operational block 510 where the next polygon in the pipeline (polygon 802) is processed.

For purposes of this example, assume that the edges of polygon 802 are stacked in the pipeline as follows: edge 815, edge 816, edge 817, and edge 818. As shown by decisional block 522, sectioning module 202 determines that edge 815 lies fully inside the acceptance region (unlike edges 807–810, previously discussed). As such, control is passed to operational block 526 where edge 815 is accepted. Control is then returned to operational block 514 where the next edge in the pipeline (edge 816 in the present example) is processed.

Edge 816 is processed the same as edge 815 described above. As such, sectioning module 202 determines that edge 816 is fully inside the acceptance region and accepts edge 816. Control is then returned to operational block 514, where the next edge of polygon 802 is processed. In the present example, we have defined edge 817 as the next edge of polygon 802 in the pipeline.

Edge 817 is processed the same as edge 815 described above. As such, sectioning module 202 determines that edge 817 is fully inside the acceptance region and accepts edge 817. Control is then returned to operational block 514, wherein the next edge of polygon 802 is processed. In the present example, we have defined edge 818 as the next edge in the pipeline (edge 818 is also the last edge in polygon 802).

Edge 818 is processed the same as edge 815 described above. As such, sectioning module 202 determines that edge 818 is fully inside the acceptance region and does accepts edge 818. Because edge 818 is the last edge in polygon 802, polygon 802 is rendered and control is returned to operational block 510 where the next polygon in the pipeline (polygon 803) is processed.

For purposes of this example, assume that the edges of polygon 803 are stacked in the pipeline as follows: edge 810, 824, 817, and 823. As shown by decisional block 530, sectioning module 202 determines that edge 810 lies fully outside the acceptance region. As such, control is passed to operational block 534 where edge 810 is not accepted. Control is then returned to operational block 514 where the next edge in the pipeline (edge 824 in the present example) is processed.

As shown by decisional block 522, sectioning module 202 determines that edge 824 does not lie fully inside the acceptance region. As such, control is passed to decisional block 530 where sectioning module 202 determines that edge 824 does not lie fully outside the acceptance region. As such, control is passed to operational block 540 where an intersection point 843 of edge 824 and sectioning plane 855 is calculated. Calculation of the intersection point has been fully described.

After calculation of the intersection point 843, control is passed to operational block 544 where the portion of edge 824 inside of the acceptance region is accepted (the portion outside of the acceptance region is rejected). Control is then passed to operational block 548 where the section module 202 stores the intersection point 843 in the cap edge list 875 shown in FIG. 8(d). Only two coordinates as discussed earlier are stored in the cap edge list 875. Control is then passed to operational decisional block 552 where sectioning module 202 determines whether there are any more edges in the polygon 803. Additional edges exist (edges 817 and 823) and control is passed to operational block 514 where the next edge in the pipeline is processed. In our example, edge 817 is the next edge in the pipeline.

Edge 817 is processed the same as edge 823 described above. However, sectioning module 202 determines that edge 817 is fully inside the acceptance region and renders edge 817. Control is then returned to operational block 514, where the next edge of polygon 803 is processed. In the present example, we have defined edge 823 as the next edge in the pipeline (edge 823 is also the last edge in polygon 803).

As shown by operational decisional block 522, edge 823 is found not to lie fully inside the acceptance region. As such, control is passed to decisional block 530 where it is further determined that edge 823 does not lie fully outside the acceptance region. As such, control is passed to operational block 540 where the intersection point 844 of edge 823 and sectioning plane 855 is calculated. After calculation of the intersection point 844, control is passed to operational block 544 where the portion of edge 824 inside of the acceptance region is accepted. Control is then passed to operation block 548 where the section module 202 stores intersection point 844 in the cap edge list 875. Control is then passed to decisional block 552 where sectioning module 22 determines whether there are any more edges in the polygon 803. Because edge 823 is the last edge of polygon 803 in the pipeline, control is passed to operational block 555 where the sectioning module 202 operates to reorder the vertices to remove degenerate edges from the clipped polygon and the cap edge list 875. Sectioning module 202 is further configured to check, and if necessary, reorder the order of the vertices based on the normal direction of the corresponding clipped polygon.

As previously described, it is important that intersection points 843 and 844 are properly stored as either the first or second vertex of edge 833. This is necessary to insure that the resultant cap polygon will be treated properly as either a hole of a solid (the present invention used the ordering of the vertices of an edge in order to know whether a polygon is enclosing solid material or is a hole). In the present example, polyhedron 800 is a solid and as such, the normal of polygon 803 is facing outward. As such, the end points of an edge are stored such that the normal of the polygon is always facing left as the edge is drawn from its first vertex to its second vertex. In the present example, intersection point 844 would be stored as the first vertex and intersection point 843 would be stored as the second vertex. FIG. 8(d) shows the cap edge list 875 having intersection point 844 stored as the first vertex of edge 833 and intersection point 843 as the second vertex. Thereafter, control is passed to decisional block 558.

As shown by decisional block 558, sectioning module 202 determines whether any other sectioning planes have been defined by the user. Recall a polygon's data base is only processed once and is clipped against all sectioning planes prior to processing of the next polygon. In the present example, no other sectioning planes have been specified and as such control passes to operational block 561.

As shown by operational block 561, sectioning module 202 is then configured to render the clipped polygon. Control then passes to decisional block 564, where it is determined that more polygons need to be processed. As such, control passes to operational block 510, wherein the next polygon (polygon 804) in the polyhedron 800 is processed.

For purposes of this example, assume that the edges of polygon 804 are stacked in the pipeline as follows: edge 807, 823, 818, and 826. As shown by operational block 530, sectioning module 202 determines that edge 807 lies fully outside the acceptance region. As such, control is passed to operational block 534 where edge 807 is not accepted. Control is then returned to operational block 514 where the next edge in the pipeline is processed.

In the present example, the next edge is edge 823.

As shown by decisional block 522, sectioning module 202 determines that edge 823 does not lie fully, inside the acceptance region. As such, control is passed to decisional block 530 where it is further determined that edge 823 does not lie fully outside the acceptance region. As such, control is passed to operational block 540 where an intersection point 846 of edge 823 and sectioning plane 855 is calculated. After calculation of the intersection point 846, control is passed to operational block 544 where the portion of edge 823 inside of the acceptance region is accepted. Control is then passed to operation block 548 where the section module 202 stores intersection point 846 in the cap edge list 875. Control is then passed to decisional block 552 where sectioning module 202 determines whether there are any more edges in the polygon 804. Additional edges exist (edges 818 and 826, respectively) and control is passed to operational block 514 where the next edge in the pipeline is processed.

In the present example, edge 818 is the next edge in the pipeline. Edge 818 is processed the same as edge 807 described above. Sectioning module 202 determines that edge 818 is fully inside the acceptance region and accepts edge 818. Control is then returned to operational block 514, where the next edge of polygon 804 is processed.

In the present example, we have defined edge 826 as the next edge in the pipeline (edge 826 is also the last edge in polygon 803). As shown by decisional block 522, edge 826 is found not to lie fully inside the acceptance region. As such, control is passed to decisional block 530 where it is further determined that edge 826 does not lie fully outside the acceptance region. As such, control is passed to operational block 540 where an intersection point 848 of edge 826 and sectioning plane 855 is calculated. After calculation of the intersection point 848, control is passed to operational block 544 where the portion of edge 826 inside of the acceptance region is accepted. Control is then passed to operation block 548 where the section module 202 stores intersection point 848 in the cap edge list 875.

Control is then passed to decisional block 552 where sectioning module 202 determines whether there are any more edges in the polygon 804. Because edge 826 is the last edge in polygon 804, control is passed to operational block 555 where the sectioning module 202 operates to reorder the vertices to remove degenerate edges from the clipped polygon and the cap edge list 875. Sectioning module 202 is further configured to check, and if necessary, reorder the order of the vertices based on the normal direction of the corresponding clipped polygon. In the present example, intersection point 848 would be stored as the first vertex and intersection point 846 would be stored as the second vertex. FIG. 8(d) shows the cap edge list 875 having intersection point 848 stored as the first vertex of edge 830 and intersection point 846 as the second vertex. Thereafter, control is passed to decisional block 558.

As shown by decisional block 558, sectioning module 202 determines whether any other sectioning planes have been specified. In the present example, no other sectioning planes have been specified and as such control is passed to operational block 561.

As shown by operational block 561, the clipped polygon is rendered. Control is then passed to decisional block 564 where sectioning module 202 determines that additional polygons need to be processed. As such, control is returned to operational block 510, wherein the next polygon (polygon 805) in the polyhedron 800 is processed.

For purposes of this example, assume that the edges of polygon 805 are stacked in the pipeline as follows: edge 808, 827, 815, and 826. As shown by decisional block 530, edge 808 lies fully outside the acceptance region. As such, control is passed to operational block 534 where edge 808 is not accepted. Control is then returned to operational block 514 where the next edge is processed.

In the present example, the next edge is edge 827. As shown by operational decisional block 522, edge 827, is found not to lie fully inside the acceptance region. As such, control is passed to decisional block 530 where it is further determined that edge 827 does not lie fully outside the acceptance region. As such, control is passed to operational block 540 where an intersection point 852 of edge 827 and sectioning plane 855 is calculated. After calculation of the intersection point 852, control is passed to operational block 544 where the portion of edge 827 inside of the acceptance region is accepted. Control is then passed to operation block 548 where the section module 202 stores intersection point 852 in the cap edge list 875. Control is then passed to decisional block 552 where sectioning module 202 determines whether there are any more edges in the polygon 805. Additional edges exist (edges 815 and 826, respectively) and control is passed to operational block 514 where the next edge in the pipeline is processed.

In the present example, edge 815 is the next edge in the pipeline. Edge 815 is processed the same as edge 808 described above. Sectioning module 202 determines that edge 815 is fully inside the acceptance region and accepts edge 815. Control is then returned to operational block 514, where the next edge of polygon 805 is processed.

In the present example, we have defined edge 826 as the next edge in the pipeline (edge 826 is also the last edge in polygon 803). As shown by operational decisional block 522, edge 826 is found not to lie fully inside the acceptance region. As such, control is passed to decisional block 530 where it is further determined that edge 826 does not lie fully outside the acceptance region. As such, control is passed to operational block 540 where an intersection point 850 of edge 826 and sectioning plane 855 is calculated. After calculation of the intersection point 850, control is passed to operational block 544 where the portion of edge 826 inside of the acceptance region is accepted.

Control is then passed to operation block 548 where the section module 202 stores intersection point 850 in the cap edge list. Control is then passed to decisional block 552 where sectioning module 22 determines whether there are any more edges in the polygon 805. Because edge 826 is the last edge in polygon 804, control is passed to operational block 555 where the sectioning module 202 operates to reorder the vertices to remove degenerate edges from the clipped polygon and the cap edge list 875. Sectioning module 202 is further configured to check, and if necessary, reorder the order of the vertices based on the normal direction of the corresponding clipped polygon. In the present example, intersection point 852 would be stored as the first vertex and intersection point 850 would be stored as the second vertex. FIG. 8(*d*) shows the cap edge list 875 having intersection point 852 stored as the first vertex of edge 831 and intersection point 850 as the second vertex. Thereafter, control is passed to decisional block 558.

As shown by decisional block 558, sectioning module 202 determines whether any other sectioning planes have been specified. In the present example, no other sectioning planes have been specified and as such control is passed to operational block 561.

As shown by operational block 561, the clipped polygon is rendered. Control is then passed to decisional block 564 where sectioning module 202 determines that additional polygons need to be processed. As such, control is returned to operational block 510, wherein the next polygon (polygon 806) in the polyhedron 800 is processed.

For purposes of this example, assume that the edges of polygon 806 are stacked in the pipeline as follows: edge 809, 824, 816, and 827. As shown by operational decisional block 530, sectioning module 202 determines that edge 809 lies fully outside the acceptance region. As such, control is passed to operational block 534 where edge 809 is not accepted. Control is then returned to operational block 514 wherein the next edge is processed.

In the present example, the next edge is edge 824. As shown by operational decisional block 522, edge 824 is found not to lie fully inside the acceptance region. As such, control is passed to decisional block 530 where it is further determined that edge 824 does not lie fully outside the acceptance region. As such, control is passed to operational block 540 where an intersection point 856 of edge 824 and sectioning plane 855 is calculated. After calculation of the intersection point 856, control is passed to operational block 544 where the portion of edge 824 inside of the acceptance region is accepted. Control is then passed to operation block 548 where the section module 202 stores intersection point 856 in the cap edge list 875. Control is then passed to decisional block 552 where sectioning module 202 determines whether there are any more edges in the polygon 806. Additional edges exist (edges 816 and 827, respectively) and control is passed to operational block 514 where the next edge in the pipeline is processed.

In the present example, edge 816 is the next edge in the pipeline. Edge 816 is processed the same as edge 809 described above. Sectioning module 202 determines that edge 816 is fully inside the acceptance region and accepts edge 816. Control is then returned to operational block 824, wherein the next edge of polygon 806 is processed.

In the present example, we have defined edge 827 as the next edge in the pipeline (edge 827 is also the last edge in polygon 806). As shown by operational decisional block 522, edge 827 is found not to lie fully inside the acceptance region. As such, control is passed to decisional block 530 where it is further determined that edge 827 does not lie fully outside the acceptance region. As such, control is passed to operational block 540 where an intersection point 854 of edge 827 and sectioning plane 855 is calculated. After calculation of the intersection point 854, control is passed to operational block 544 where the portion of edge 827 inside of the acceptance region is accepted. Control is then passed to operation block 548 where the section module 202 stores intersection point 854 in the cap edge list 875. Control is then passed to decisional block 552 where sectioning module 202 determines whether there are any more edges in the polygon 806. Because edge 827 is the last edge in polygon 806, control is passed to operational block 555 where the sectioning module 202 operates to reorder the vertices to remove degenerate edges from the clipped polygon and the cap edge list 875. Sectioning module 202 is further configured to check, and if necessary, reorder the order of the vertices based on the normal direction of the corresponding clipped polygon. In the present example, intersection point 856 would be stored as the first vertex and intersection point 854 would be stored as the second vertex. FIG. 8(*d*) shows the cap edge list 875 having intersection point 856 stored as the first vertex of edge 832 and intersection point 854 as the second vertex. Thereafter, control is passed to decisional block 558.

As shown by decisional block 558, sectioning module 202 determines whether any other sectioning planes have been specified. In the present example, no other sectioning planes have been specified and as such control is passed to operational block 561.

As shown by operational block 561, sectioning module operates to render the clipped polygon. Control is then passed to decisional block 564.

As shown by decisional block 564, sectioning module 202 determines that no other polygons exist in the polyhedron. Control is then passed to operational block 582, where the polyhedron interference checking module 118 passes control from the sectioning module 202 to the cap formation module 204. As will be described herein, after execution of cap formation module 204, polyhedron capping module 118 returns control to operational block 570 of sectioning module 202, where sectioning module 202 determines if there are any additional polyhedra in the pipeline. If no additional polyhedra are in the pipeline, then control is passed to the interference module 206 where the caps of all the polyhedra are checked for interferences.

Referring now to FIG. 8(*d*), it shows the various intersection points stored as in their correct order as either the first or second vertex of their corresponding edge. As shown and as identified heretofore, the cap edge list 875 has stored the following data: two coordinates for each of intersection points 844 and 843 as the first and second vertex of edge 830, two coordinates for each of intersection points 848 and 846 as the first and second vertex of edge 830, two coordinates for each of intersection points 852 and 850 as the first and second vertex of edge 831, and two coordinates for each of intersection points 856 and 854 as the first and second vertex of edge 832.

As shown by operational block 710 of FIG. 7, cap formation module 204 processes the first cap which also corresponds to first cap edge list 875. In the present example, only one sectioning plane has been specified by the user. As such only one cap edge list was generated by sectioning module 202. Therefore, only one cap will be generated by cap formation module 204.

Control is passed to operational block 714 where cap formation module 204 chooses a cap vertex (intersection point) from the cap edge list 875. A second vertex of some edge must be chosen as the initial vertex. This is necessary to insure that the cap polygon will be properly stored in the cap list (FIGS. 8E-H). Failure to do this will result in a polygon being treated as a solid when it was specified as a hole by the user.

For purposes of the present example, assume that cap formation module 204 chooses intersection point 843 first. Cap formation module 204 operates to make intersection point 843 the current vertex. Control is then passed to operational block 718.

As shown by operational block 718, intersection point 843 is labeled as the last sub-polygon vertex. Control is then passed to operational block 722.

As shown by operational block 722, cap formation module 204 is configured to examine the cap edge list 875 and find the vertex point that is closest to intersection point 843. In the present example, cap formation module 204 would determine that intersection point 856 is the closest point. Control is then passed to operational block 726.

As shown by operational block 726, cap formation module 204 is configured to make intersection point 856 the current edge point. Cap formation module 204 is further configured to remove intersection point 856 from the cap edge list 875. Control is to operational block 730.

Figure 8E:
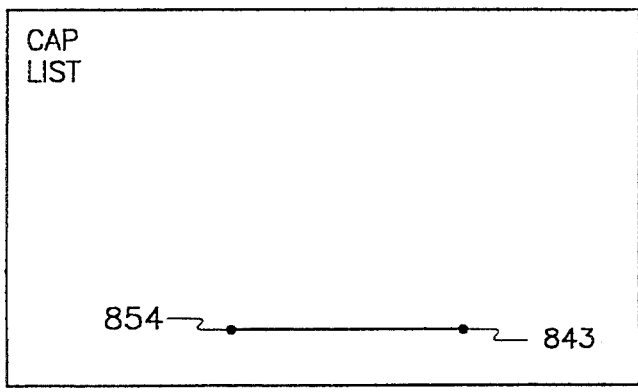
FIGS. 8(e)-(h) are sequential illustrations of a cap list showing formation of a cap polygon for the polyhedron of FIG. 8(a)

As shown by operational block 730, cap formation module 204 is then configured to examine the cap edge list 875 and find an edge that has an intersection point 856; in the present case, edge entry 4. Accordingly, cap formation module 204 knows that intersection point 856 is connected to intersection point 854. Cap formation module then stores intersection point 854 in the cap vertex list 880 (FIG. 8e). Control is then passed to operational block 734.

As shown by operational block 734, cap formation module 204 is configured to make the edge point partner (intersection point 854) the current vertex. Cap formation module 204 is further configured to remove intersection point 854 from the cap edge list. Control is then passed to decisional block 738.

As shown by decisional block 738, cap formation module 204 is configured to determine whether any other vertices exist in cap edge list 875. In the present case, additional vertices exist and as such control is passed to decisional block 737.

As shown by decisional block 737, cap formation module 204 is configured to check to see if the current vertex is labeled as the last sub-polygon vertex. In this example, the current vertex 854 is not so labeled so control is returned to operational block 722.

As shown by operational block 722, cap formation module 204 reexamines the cap edge list 875 to find the vertex that is closest to vertex 854. In the present case, this would be vertex 852. Control is then passed to operational block 726.

As shown by operational block 726, cap formation module 204 is then configured to make intersection point 852 the current vertex and to remove end point 854 from the cap edge list 875. Control is then passed to operational block 730.

As shown by operational block 730, cap formation module 204 is then configured to examine the cap edge list 875 and find an edge that is a partner with intersection point 852; in the present case, edge entry 3. Accordingly, cap formation module 204 knows that end point 852 is connected to end point 850. Control is then passed down to operational block 734.

Figure 8F:
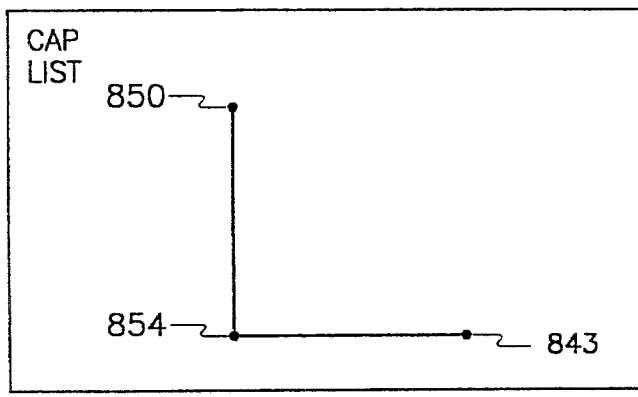

As shown by operational block 734, the cap formation module 204 is then configured to make the matched end point partner (intersection point 850) the current vertex and to store the intersection point 850 as the next vertex in the cap vertex list 880. This is shown in FIG. 8F. Control then passes to decisional block 738.

As shown by decisional block 738, cap formation module 204 is configured to determine whether any other vertices exist in cap edge list 875. In the present case, additional vertices exist and as such control is passed to decisional block 737.

As shown by decisional block 737, cap formation module 204 is configured to check to see if the current vertex is labeled as the last sub-polygon vertex. In this example, the current vertex 850 is not so labeled so control is returned to operational block 722.

As shown by operational block 722, cap formation module 204 reexamines the cap edge list 875 to find the vertex that is closest to intersection point 850. In the present case, this would be intersection point 848. Control is then passed to operational block 726. As shown by operational block 726, cap formation module 202 is configured to make intersection point 848 the current vertex and further to remove it from the cap edge list 875.

Figure 8G:
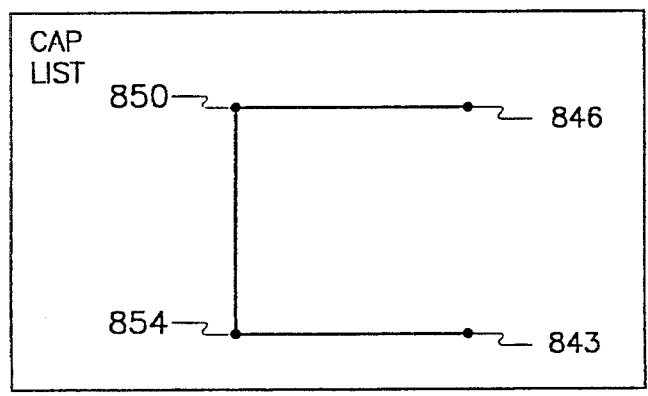
Figure 8H:
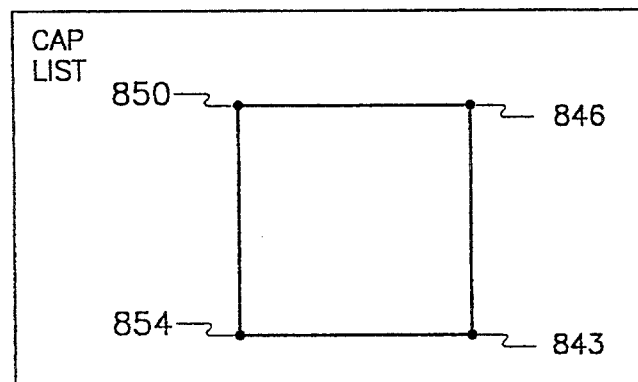

As shown by operational block 730, cap formation module 204 is then configured to examine the cap edge list 875 and find an edge that has as its partner intersection point 848; in the present case, edge entry 2. Accordingly, cap formation module 204 knows that intersection point 850 is connected to intersection point 846. Cap formation module 24 is further configured to stores the matched end partner, intersection point 846 as the next vertex in the cap vertex list 880 and remove it from the cap edge list 875. This is shown in FIG. 8G. Control passes down to decisional block 738.

As shown by decisional block 738, cap formation module 204 is configured to determine whether any other vertices exist in cap edge list 875. In the present case, additional vertices exist so control is passed to decisional block 737.

As shown by decisional block 737, cap formation module 204 is configured to check to see if the current vertex is labeled as the last sub-polygon vertex. In this example, the current vertex 846 is not so labeled so control is returned to operational block 722.

As shown by operational block 722, cap formation module 204 reexamines the cap edge list 875 to find the vertex that is closest to intersection point 846. In the present case, this would be end point 844. Control is then passed to operational block 726.

As shown by operational block 726, cap formation module 204 is then configured to make intersection point 844 the current vertex and to remove intersection point 844 from the cap edge list 875. Control is then passed to operational block 730.

As shown by operational block 730, cap formation module 204 is then configured to examine the cap edge list 875 and find an edge that has an intersection point 844; in the present case, edge entry 1. Accordingly, cap formation module 204 knows that end point 844 is connected to intersection point 843. Intersection point 843 is stored in the cap vertex list 880 (FIG. 8h) by cap formation module 204. Control is then passed to operational block 738.

As shown by operational block 734, cap formation module 204 is configured to make the current vertex edge partner the current vertex. As such it also removes vertex 843 from the cap edge list 875. Control is then passed to decisional block 738.

As shown in decisional block 738, cap formation module 204 is configured to determine whether any other vertices exist in cap edge list 875. In cases where the cap polygons contain multiple sub-polygons, the cap edge list would not have been empty and control would have flowed to decisional block 737 where the last sub-polygon vertex label on the current vertex would cause control to pass to operational block 714 where a new sub-polygon cap vertex list would be started. In the present case, no additional vertices exist and as such control is passed to operational block 744.

As shown by operational block 744, cap formation module 204 is then configured to transform the cap polygon stored in the cap list 880 into a data structure compatible with the graphics pipeline architecture. Control is then passed to operational block 741 where the cap polygon is rendered on the clipped polyhedron. Control is then passed to decisional block 748.

As shown by decisional block 748, cap formation module 204 is configured to determine if there are any other caps to be generated. In the present example, only one sectioning plane was defined and as such only one cap edge list and corresponding cap is generated. Control is passed to end block 754 which then returns control to decisional block 570 (FIG. 5) of sectioning module 202.

As shown by decisional block 570, sectioning module 204 is then configured to determine if any additional polyhedra exist. In the present example, no other polyhedra exist and control is passed to the interference module 206 of the present invention.

Figure 9:
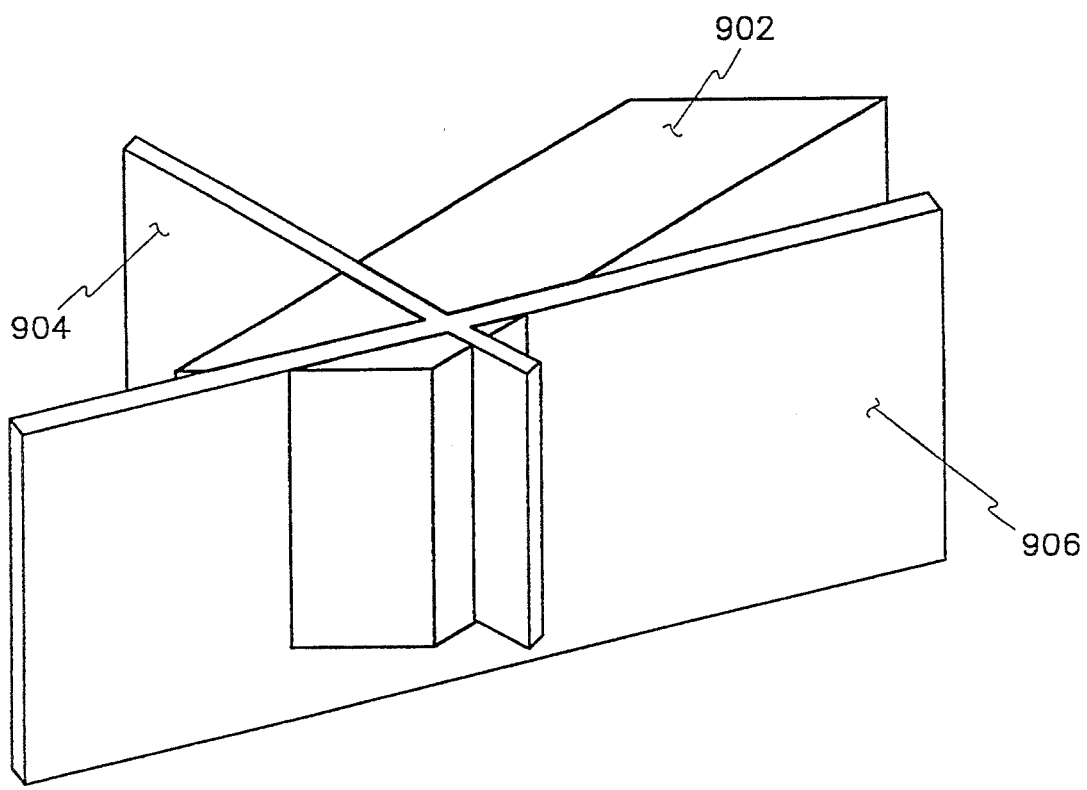
FIG. 9 is a perspective view of a polyhedron having two sectioning plane(s).

In the above example, the polyhedron 800 only has a single sectioning plane 855 specified by the user. However, it may often be the case that the user will specify several sectioning planes. FIG. 9 shows a polyhedron 902 to be sectioned and capped about a first sectioning plane 904 and a second sectioning plane 906. In operation, the polyhedron interference checking module 118 operates in the same manner. However, note that as the sectioning module 202 of polyhedron interference checking module 118 is operating, several cap lists will be generated. Each cap is created independently and when a cap polygon is rendered, it is sectioned against all other sectioning planes other than the one that generated it.

Referring next to FIG. 10, a high level block diagram showing the architecture of the interference module 206 is shown. Interference module 206 is generally configured to collect all of the cap polygons generated by the clipping and capping process and to determine whether any of the caps overlap (intersect). The interference module 206 is further configured to generate an interference cap polygon indicative of the overlapping area. The cap polygons may be that of several polyhedra or of a single polyhedron.

Interference module 206 comprises an extent determination module 1002 and an interference cap generation module 1004. Extent determination module 1002 is generally provided to initialize each polygon data structure and to determine whether it "includes" or "excludes" the area bounded by its vertices. Extent determination module 1002 is further configured to break up a cap polygon into its constituent sub-polygons (referred to hereinafter as simply polygons) if the cap polygon consists of sub-polygons. This is necessary so that the interference module 206 knows that the polygon represents a hole or a solid. If the polygon "includes" area, it represents a solid. In contrast, if the polygon "excludes" area, it represents a hole.

Interference cap generation module 1004 is generally provided to compare each of the polygons with all of the other polygons and to generate an interference cap polygon that represents the overlapping area between the polygons. The interference cap polygon is then rendered by rendering module 208. The interference cap polygon may also consist of multiple polygons.

Figures 11, 11A:
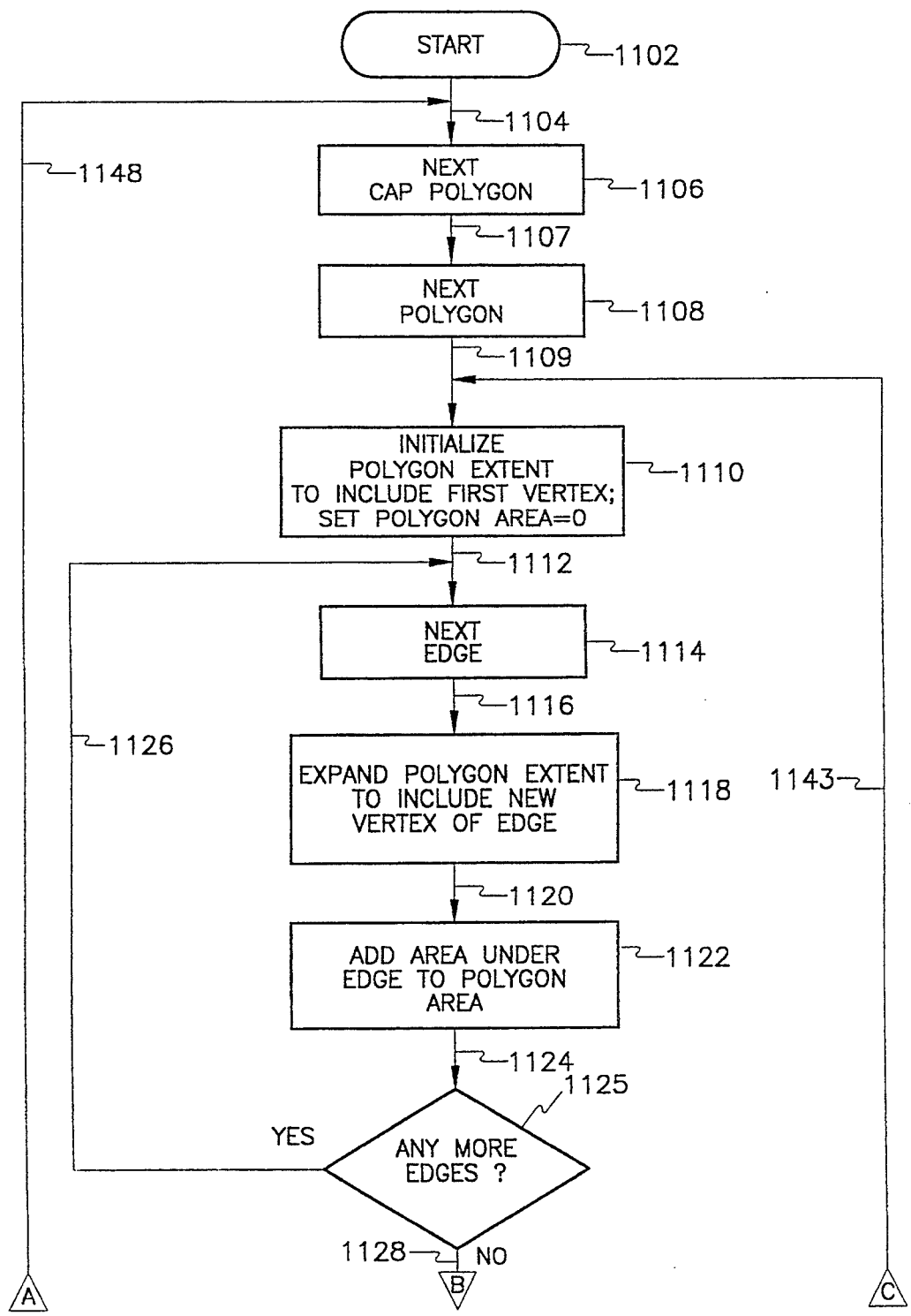
FIGS. 11(A-B) is a high level block diagram showing the operation of the extent determination module.
Figure 11B:
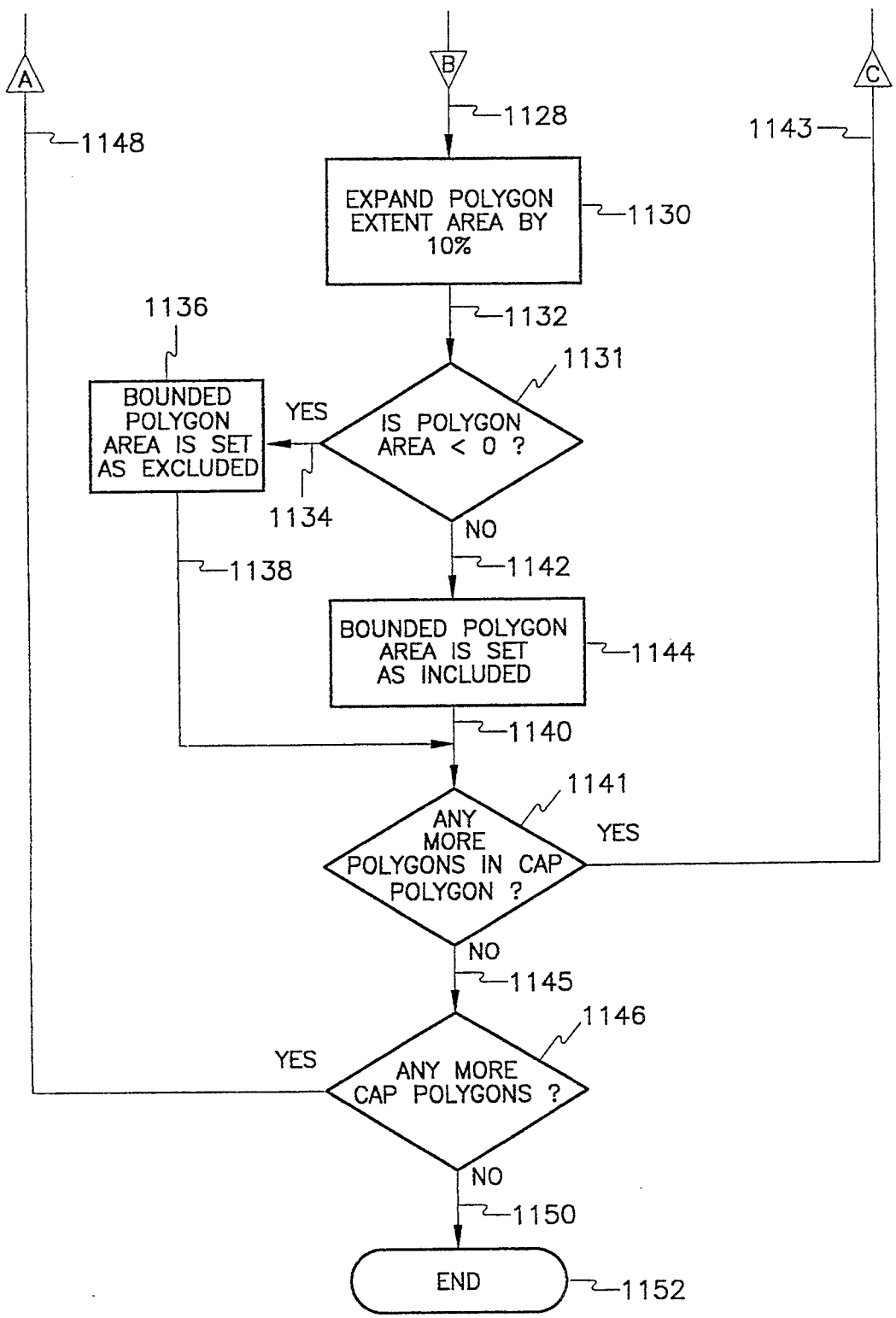

Referring now to FIG. 11, a high level flow chart showing the operation of the extent determination module 1002 is shown. FIG. 11 consists of FIGS. 11A and 11B.

Operation is initiated at a start block 1102. Control is then passed along a logic path 1104 to an operational block 1106.

As shown by operational block 1106, extent determination module 1002 is first configured to process the first cap polygon from the list of cap polygons generated by the clipping and capping process. It should be understood that one cap polygon may consist of several sub-polygons. Control is then passed along a logic path 1107 to an operational block 1108.

As shown by operational block 1108, extent determination module 1002 is then configured to process the first polygon of the current cap polygon. Control is then passed along a logic path 1109 to an operational block 1110.

As shown by operational block 1110, the extent determination module 1002 is then configured to initialize the current polygon and to determine the extent of the polygon. Determination module 1002 is further configured to set the polygon area to zero and to form the extent to include the first vertex of the polygon.

The extent is hereby defined as a rectangle that includes every vertex point of the polygon. In contrast, the polygon area is the actual area of the polygon.

As will be more described herein, if the polygon area is positive, then the polygon "includes" the bounded area, and as such represents a solid. In contrast, if the area is negative, the polygon "excludes" its bounded area and represents a hole. The polygon area is calculated by summing up the area under all of the edges starting with the first chosen vertex. The area of each is added in the order in which the edges were stored in the cap list. As such, it is essential that the vertices of the cap polygon were stored in their proper order.

For example, if the polygon is a square and the ordering of the vertices is such that the square polygon was connected in a counter-clockwise direction, the area for the polygon would be negative. As such, interference module 206 knows that polygon is "excluding" the area bound by its vertices. In contrast, if the polygon was a square but the ordering of the vertices was such that the polygon was connected in a clockwise direction, then the interference module 206 would know that the area bounded by the vertices represents a solid object. Control is then passed along a logic path 1112 to an operational block 1114.

As shown by operational block 1114, extent determination module 1102 operates on the first edge connected to the chosen vertex. Control is then passed along a logic path 1116 to an operational block 1118.

As shown by operational block 1118, extent determination module 1102 is then configured to expand the extent to include the new vertex of the edge that is currently being processed. Control is then passed along a logic block 1120 to an operational block 1122.

As shown by operational block 1122, extent determination module 1002 is then configured to add the area under the edge to the current polygon area. This area calculation takes into account the direction of edges, thus an edge from <1,5> to <3,5> would add 10 area units (3−1),5) to the polygon whereas the reverse edge from <3,5> to <1,5> would subtract 10 area units (1−3)*5). Because of this, polygons which go primarily clockwise will have positive area while those going counter-clockwise have negative area. This area calculation depends on the ordering of edges done during the cap edge collection stage. The area calculation is very robust and successfully deals with minor inconsistencies caused by previous floating point round-off errors. Control is then passed along a logic path 1124 to a decisional block 1125.

As shown by decisional block 1125, extent determination module 1102 is then configured to determine whether there are any more edges in the current polygon that need to be processed. If there are additional edges to be processed, control is returned along a logic path 1126 to operational block 1114 wherein the next edge in the polygon is processed. However, if there no additional edges need to be processed, control is passed along a logic path 1128 to an operational block 1130.

As shown by operational block 1130, interference module 206 is then configured to expand the current polygon extent by ten percent. This operation is necessary to ensure that the floating point calculations relating to determination of the various interference cap polygon vertices points will not cause an error in determining whether one edge intersects with another edge. Control is then passed along a logic path 1132 to a decisional block 1131.

As shown by decisional block 1131, interference module 206 is then configured to determine whether the current polygon area is less than zero. As described before, if the polygon area is less than zero, then the area bounded by the polygon is "excluded" and represents a hole. In contrast, if the polygon area is positive, then the area bounded by the cap polygon is "included" and represents a solid. As such, if the current polygon area is less than zero, then control passes along a logic block 1134 to an operational block 1136.

As shown by operational block 1136, interference module 206 sets the current polygon area as "excluding." Control is then passed along a logic path 1138 to a logic path 1140. However, if the current polygon area is greater than zero, then control is passed along a logic path 1142 to an operational block 1144 wherein the current polygon area would be set as "including." As will be described more fully herein, the interference cap generation module 1004 uses the knowledge of whether a polygon excludes area or includes area to determine whether a vertex is within the interference area. Thereafter, control is passed along a logic path 1140 to a decisional block 1141.

As shown by decisional block 1141, extent determination module 1002 is then configured to determine whether there are any more polygons in the current cap polygon. If additional polygons exist, then control is returned along a logic path 1143 to operational block 1108 where the next polygon of the current cap polygon is processed. If no additional polygons exist in the current cap polygon, then control is passed along a logic path 1145 to a decisional block 1146.

As shown by decisional block 1146, interference module 206 is then configured to determine whether there are any other cap polygons to process. If there are more cap polygons to process, then control is returned along a logic path 1148 to operational block 1106 where the next cap polygon is processed. If however, no more cap polygons need to be processed, then control is passed along a logic path 1150 to an end block 1152. Control is then passed to the interference cap generation module 1004.

Figures 12, 12A:
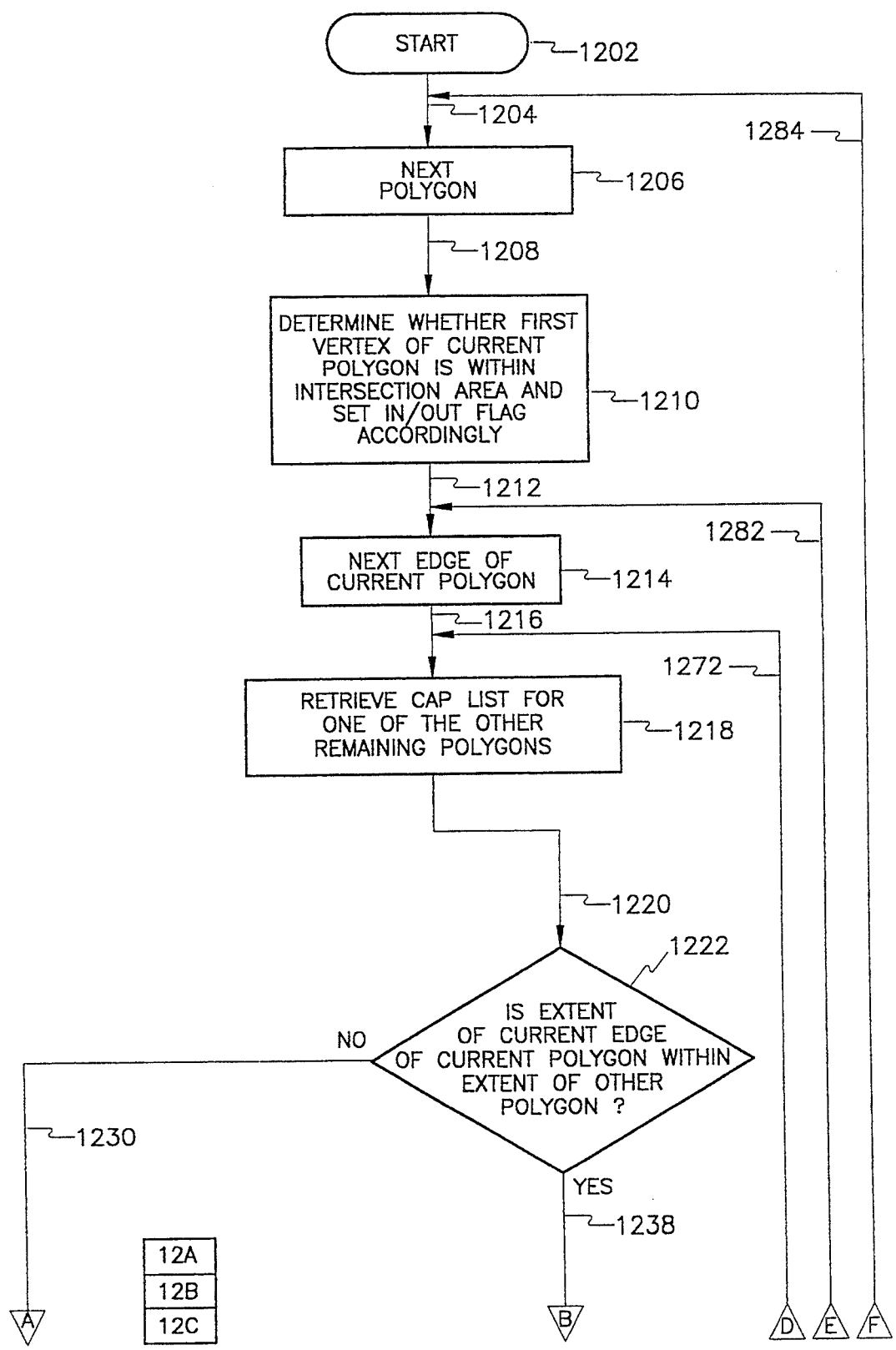
FIGS. 12(A-C) is a high level block diagram showing the operation of the interference cap generation module.
Figure 12B:
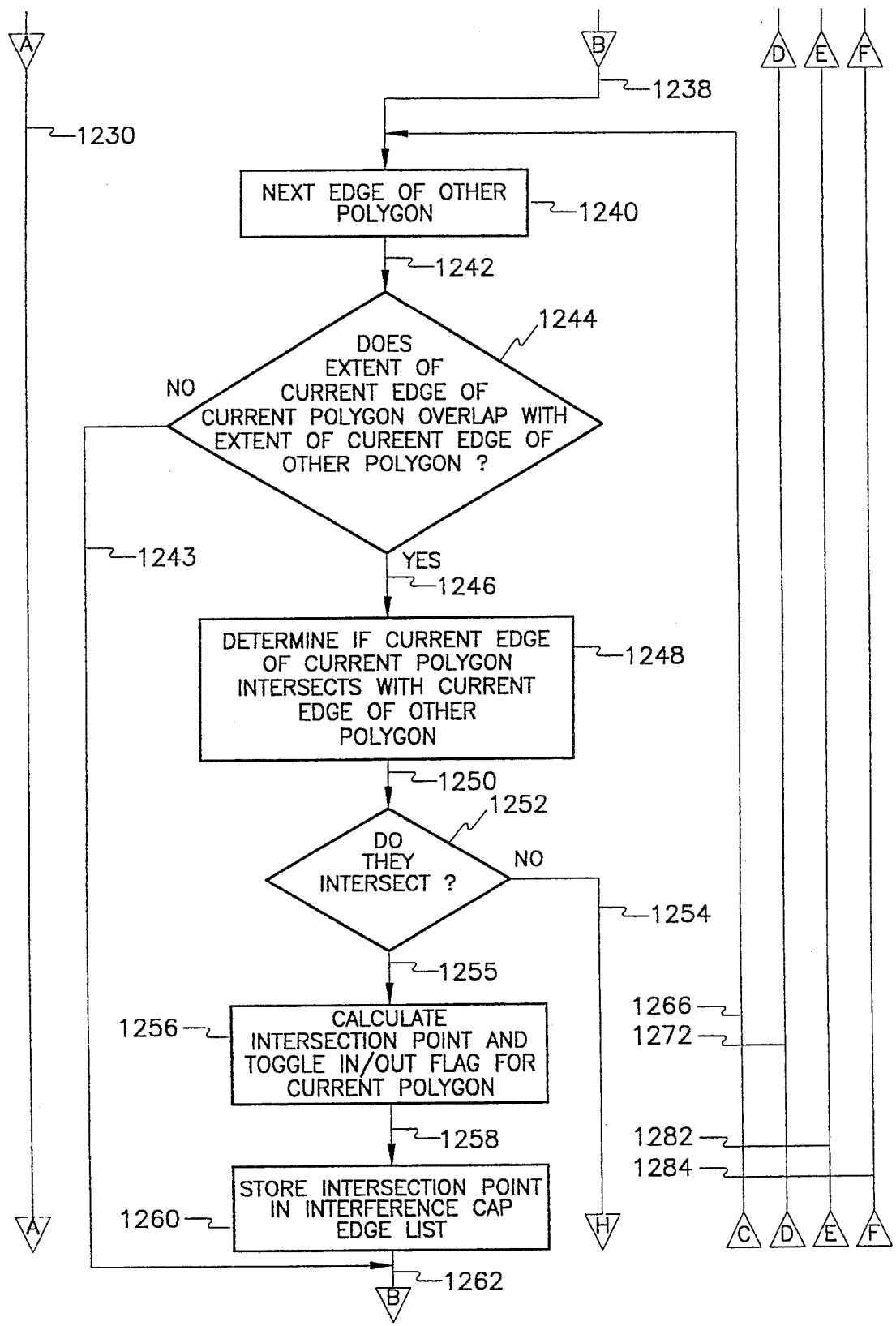
Figure 12C:
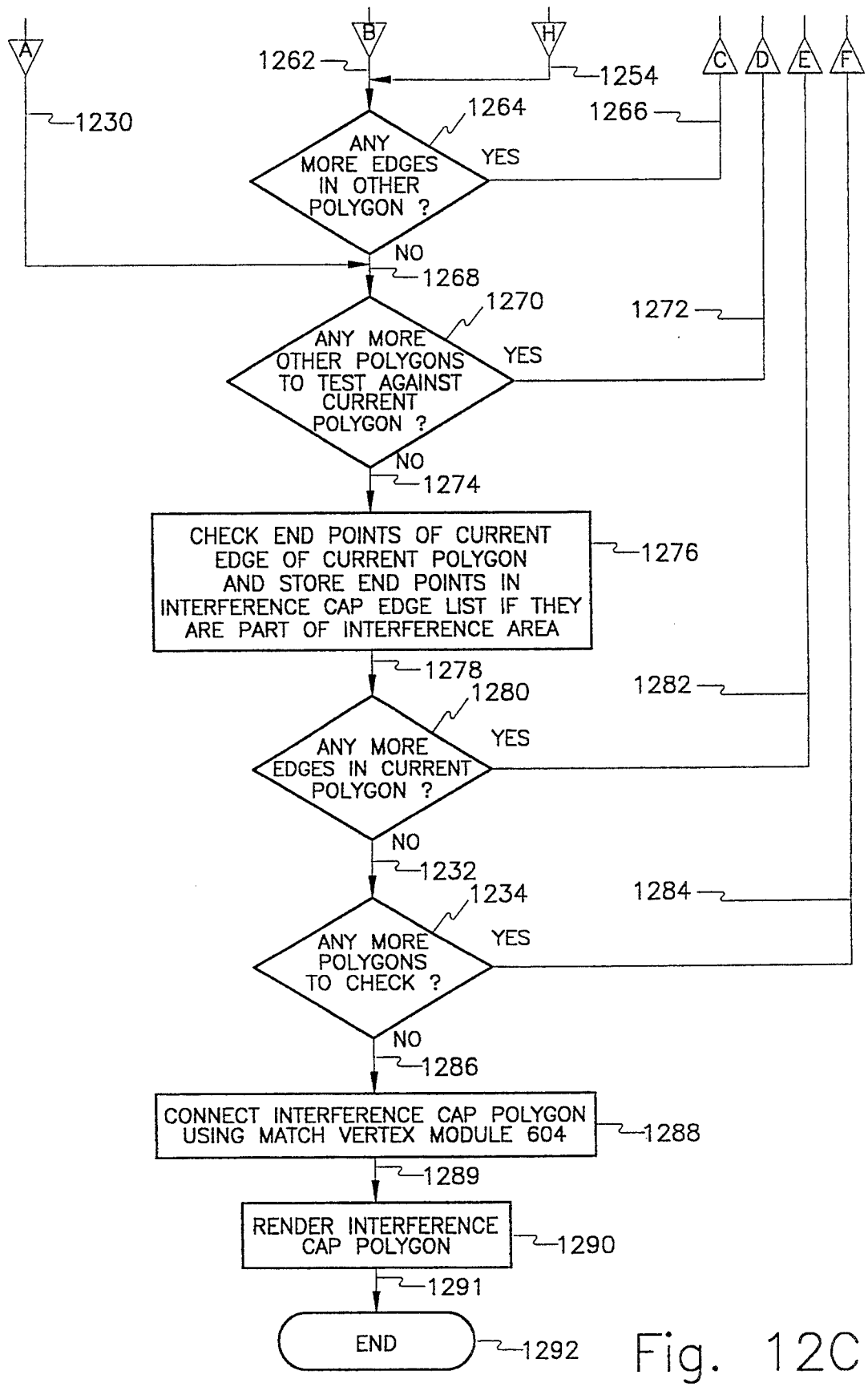

Following is the pseudo code for the extent determination module 1002.

for each polygon in set of caps
initialize polygon extent to include only
first vertex
set polygon area to 0
for each edge in polygon
    possibly expand polygon extent to include new vertex
    add area on under edge to polygon area
expand polygon extent by 10%
if polygon area <0
set polygon_exclude bit
else
    clear polygon_exclude bit Referring now to FIG. 12, a high level flow chart shows the operation of the interference cap generation module 1004 is shown. FIG. 12 consists of FIGS. 12A, 12B and 12C.

Operation of the interference cap generation module 1004 of the interference module 206 is initiated by a start block 1202. Control is then passed along a logic path 1204 to an operational block 1206.

As shown by operational block 1206, the interference cap generation module 1004 is first configured to process the first polygon. As will be more fully described herein, each polygon is compared against all of the other polygons. The polygon which is being compared against all the other polygons will be referred to herein as the current cap polygon. Control is passed along a logic block 1208 to operational block 1210.

As shown by operational block 1210, interference cap generation module 1004 is then configured to determine whether the first vertex of the current polygon is within the interference area. This operation is performed using a "scanline conversion" technique.

In this technique, the scanline check is done by examining the ray from a point, P, positioned at Px, Py, to negative infinity, Py. The interference cap generation module 1104 is configured to check how many times the ray is crossed by edges from the current and other polygons. This check combined with the current polygon area and the directions of the two edges which share point P, is used to determine whether point P is in the interference area, and thus in the interference cap polygon. Control is then passed along logic path 1212 to an operational block 1214.

As shown by operational block 1214, the interference cap generation module 1004 is then configured to process the first edge of the current polygon. The selection and/or ordering of the next edge is not arbitrary and is defined by the storage technique heretofore described. After retrieval of the first edge of the current polygon, control is passed along a logic path 1216 to an operational block 1218.

As shown by operational block 1218, interference cap generation module 1004 is then configured to retrieve the extent for one of the other remaining polygons, hereinafter referred to as the other polygon. As will be further shown herein, the current edge of the current polygon will be compared against the overall extent of the current other polygon and then potentially, every edge of the current other polygon. Control is then passed along a logic path 1220 to a decisional block 1222.

As shown by decisional block 1222, the interference cap generation module 1004 is then configured to determine whether the extent of the current edge of the current polygon overlaps with the overall extent of the current other polygon. This operation can be easily performed with simple comparison routines. If extent of the current edge of the current polygon does not overlap with the extent of the current other polygon, control is passed along a logic path 1230 to a decisional block 1270.

As shown by decisional block 1270, the interference cap generation module 1004 is then configured to determine whether there are any other polygons to test against the current edge of the current polygon. Decisional block 1270 will be described in more detail herein.

Now returning to decisional block 1222, if the extent of the current edge of the current polygon overlaps with the overall extent of the current other polygon, than an interference may exist. If it is determined that the current edge of the current polygon overlaps with the overall extent of the current other polygon, then it is necessary to do a more refined interference check to determine check whether the extent of the individual edges of the current polygon interfere with the individual edge extents of the current other polygon. As such, control is passed along a logic path 1238 to an operational block 1240.

As shown by operational block 1240, the interference cap generation module 1004 is then configured to retrieve the first edge of the current other polygon. Control is then passed along a logic path 1242 to a decisional block 1244.

As shown by decisional block 1244, the interference cap generation module 1004 is then configured to determine whether the extent of the current edge of the current polygon overlaps the extent of the current edge of the current other polygon. If the extent of the current edge of the current polygon does not overlap with the extent of the current edge of the current other polygon, then control is passed along a logic path 1243 to a decisional block 1264 where interference cap generation module 1004 determines whether any more edges need to be processed for the current other polygon. However, if the extent of the current edge of the current polygon overlaps with the extent of the current edge of the current other polygon, then control is passed along a logic path 1246 to a operational block 1248.

As shown by operational block 1248, interference cap generation module 1004 is then configured to determine if the current edge (not the extent of the current edge) of the current polygon actually intersects with the current edge of the current other polygon. What was checked before was whether the extent, and not the actual edge of the current polygon intersected with the extent of the current edge of the current other polygon. Control is then passed along a logic path 1250 to a decision block 1252.

As shown by decisional block 1252, the interference cap generation module 1004 is then configured to determine whether the current edge of the current polygon intersects with the current edge of the current other polygon. If the edges do not intersect, then control is passed along a logic path 1254 to decisional block 1264 wherein the interference cap generation module determines whether any other edges of the current other polygon need to be processed. However, if the current edge of the current polygon does indeed intersect with the current edge of the current other polygon, then control is passed along a logic path 1255 to an operational block 1256.

As shown by operational block 1256, the interference cap generation module 1004 is then configured to calculate the actual intersection point. Calculation of the intersection point is performed with well known mathematical algorithms. Interference cap generation module 1004 is further configured to toggle (change) the IN/OUT flag for the current polygon. Control is then passed along a logic path 1258 to an operational block 1260.

As shown by operational block 1260, the interference cap generation module 1004 is then configured to store the intersection point in an interference cap edge list. The interference cap edge list is hereby defined as a data list that contains all of the edges of the interference cap polygon. Each edge is stored as a pair of vertices. Each vertex is stored with two coordinates. As described heretofore, the interference cap polygon represents the interference area between the various polygons. Control is then passed a logic path 1262 to decisional block 1264.

As shown by decisional block 1264, briefly described heretofore, the interference cap generation module 1004 is then configured to determine whether there are any more edges in the current other polygon that need to be compared against the current edge in the current polygon. If there are more edges in the current other polygon, then control is returned along a logic path 1266 to operational block 1240 where the next edge of the current other polygon is processed. If however, there are no additional edges in the current other polygon, then control is passed along a logic path 1268 to decisional block 1270.

As shown by decisional block 1270, and as briefly described heretofore, the interference cap generation module 1004 is then configured to determine whether there are any more other polygons that need to be tested against the current edge of the current polygon. If there are more other polygons to test against current edge of the current polygon, then control is returned a logic path 1272 to operational block 1218 where the next other polygon extent is retrieved for processing. If however, there are no more other polygons to test against the current edge of the current polygon, then control is passed along a logic path 1274 to an operational block 1276.

As shown by operational block 1276, the interference cap generation module 1004 is then configured to check the end points (vertices) of the current edge of the current cap polygon and store the end point(s) in the interference cap edge list if they are in fact a part of the interference area. Recall that the first vertex was determined to be "in" or "out" of the interference area by the "scanline conversion" technique (described heretofore). The IN/OUT flag for the polygon keeps track of whether the remaining vertices are "in" or "out" of the interference area. Control is then passed along a logic path 1278 to a decisional block 1280.

As shown by decisional block 1280 the interference cap generation module 1004 is then configured to determine if there are any more edges in the current polygon. If additional edges in the current polygon need to be processed, then control is returned along a logic path 1282 to operational block 1214 wherein the next edge of the current polygon is processed. However, if no more edges in the current polygon need to be processed, then control is passed along a logic path 1232 to a decisional block 1234.

As shown by decisional block 1234, the interference cap generation module 1004 is then configured to determine whether there are any other polygons to check. As described before each polygon is checked against all others. In the case of two polygons, so far we have only checked the first cap polygon (referred to as the current polygon) relative to the second polygon (referred to as the other polygon). However, to complete the interference check, it is necessary to check the second polygon relative to the first polygon. In this case, control is returned along a logic path 1284 to operational block 1206 where the next polygon would be made the current polygon. However, if all polygons have been checked as against all other polygons, then control is passed along a logic path 1286 to an operational block 1288.

As shown by operational block 1288, the interference cap generation module 1004 is then configured to connect the interference cap polygon using the edges stored as a pair of vertices in the interference cap edge list. In the preferred embodiment, connection of the interference cap edge list may be performed by the match cap vertex module discussed heretofore. Control is then passed along a logic path 1289 to an operational block 1290.

As shown by operational block 1290, the interference generation module 104 passes control to rendering module 208 which renders the interference cap polygon. The interference cap polygon may be rendered with a variety attributes to enhance recognition of the interference area. Such attributes may include, but are not limited to, shading or cross-hatching. Control is then passed along a logic path 1291 to an end block 1292 wherein operation of the interference cap generation module 1004 and thus interference checking module 118 is terminated.

Following is the pseudo code for the interference cap generation module 1004.

for each current polygon in set of cap polygons
    set 'in_or_out' for current polygon's area as well as 'scan conversion' of first vertex
    for each current edge in current polygon
        for each other polygon in set of caps
            if extent of current edge of current polygon overlaps with extent of other polygon
                for each other edge in other polygon
                      if current edge of current polygon intersects with other edge of the other polygon
                          calculate intersection point
                          store point
                          toggle 'in_or_out'
        may add 1 or both endpoints depending on 'in_or_out' state
    sort points to remove degenerate edges
    call close cap routine to match endpoints of interference polygon and render The operation of the interference module 206 will now be described with reference to a set of polygons to determine whether an interference exists. If an interference exists, an interference cap polygon indicative of the interference area is generated.

Figure 13:
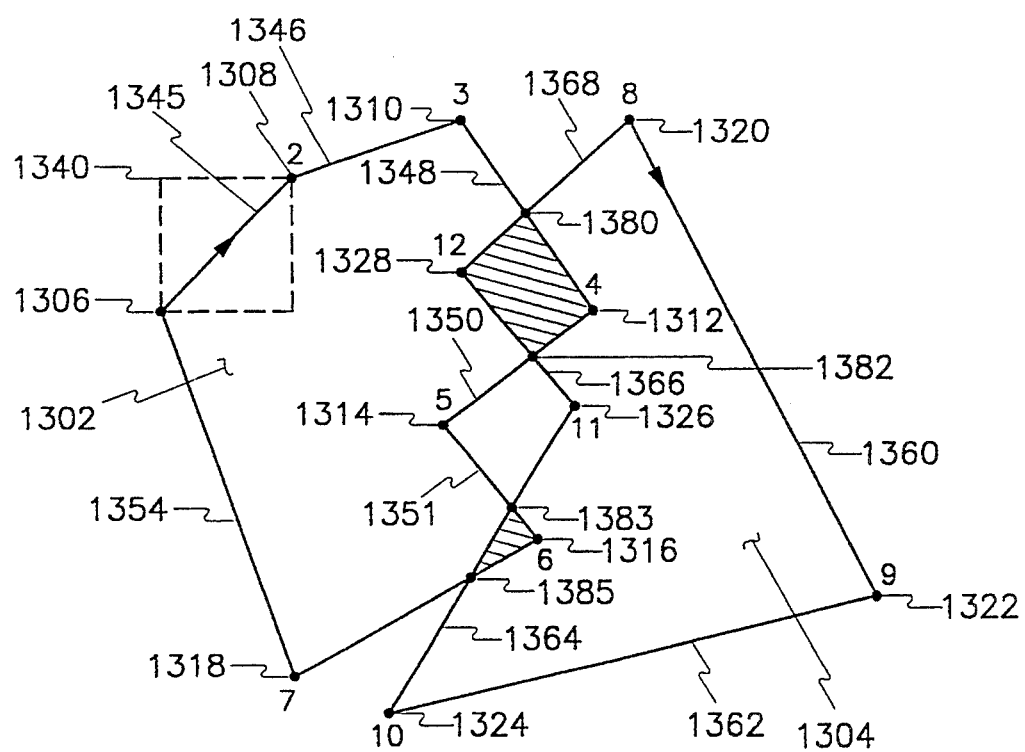
FIG. 13 is a plan view showing two solid cap polygons and a corresponding interference cap polygon.

Referring now to FIG. 13, a first polygon 1302 and a second polygon 1304 are shown. As discussed heretofore, it should be understood that polygons 1302 and 1304 could have been generated from one and/or two cap polygons.

Polygon 1302 is bounded by a first vertex 1306, a second vertex 1308, a third vertex 1310, a fourth vertex 1312, a fifth vertex 1314, a sixth vertex 1316, and a seventh vertex 1318 connected to the first vertex 1306. Edges 1345, 1346, 1348, 1350, 1351, 1352, and 1354 are also shown. Let's further assume that the above vertice order was ordered in the cap vertex list such that the polygon 1302 is connected in a clockwise direction.

Polygon 1304 is bounded by a first vertex 1320, a second vertex 1322, a third vertex 1324, a fourth vertex 1326, and a fifth vertex 1328 which is connected to the first vertex 1322. Edges 1360, 1362, 1364, 1366, and 1368 are also shown. Furthermore, assume that the above vertice order is ordered in the cap vertex list such that the polygon 1304 is connected in a clockwise direction.

The operation of interference module 1104 on polygons 1302 and 1304 will now be described with reference to FIGS. 11 and 12. FIGS. 11 and 12 show flow chart operations of the extent determination module 1002 and interference module 1004, respectively.

Extent termination module 1002 is initiated by the start block 1102. Controls passes to the operational block 1106.

As shown by operational block 1106, extent determination module 1002 is first configured to retrieve the first cap polygon. In our example, assume that the first cap polygon to be processed is that of polygon 1302. However, it would not matter whether polygon 1304 was processed first and thereafter polygon 1302 or vice versa. Assuming that polygon 1302 is the current polygon processed, control is then passed along logic path 1107 to the operational block 1108.

As shown by operational block 1108, extent determination module 1002 is configured to process the first polygon of polygon 1302. In the present case, polygon 1302 is only made up of one polygon (referred to herein as polygon 1302). Control is passed to operational block 1110.

As shown by operational block 1110, the polygon 1302 extent is initialized and the polygon 1302 area is set equal to zero. Thereafter, a first vertex is chosen. Assume that the first vertex is that of vertex 1306. Additionally, the extent is set to include the first vertex 1306. Controls then passes along logic path 1112 to operational block 1114.

As shown by operational block 1114, the first edge connected to vertex 1306 is processed. In the present example, this would be edge 1345. The ordering of the vertices in the cap list determines which edge is first processed. In other words, the ordering of the vertices in the cap vertex list determines the sequence in which the edges of the cap polygon are connected. Control is then passed along logic path 1116 to operational block 1118.

As shown by operational block 1118, the extent for cap polygon 1302 is expanded to include the entire edge 1345, or in other words, to include the vertex 1308. This extent is shown on FIG. 13 as a numeral 1340. For ease of clarification and understanding of the polygon 1302 of FIG. 13, no additional extents will be drawn. Control is then passed along logic path 1120 to operational block 1122.

As shown by operational block 1122, extent determination module 1002 is then configured to add the area under edge 1345 to the polygon 1302 area. Control is then passed along logic path 1124 to decisional block 1125.

As shown by decisional block 1125, the extent determination module 1002 is then configured to determine if there are any more edges in polygon 1302. Because more edges remain in polygon 1302, control is returned along logic path 1126 to operational block 1114 when the next edge of polygon 1302 is processed.

The next edge in polygon 1302 is edge 1346 which is formed by connection of vertex 1308 to vertex 1310. Edge 1346 is processed the same way as edge 1345 described above. Control is then passed along logic path 1116 to operational block 1118.

As shown by operational block 1118, the extent for polygon 1302 is expanded to include the entire edge 1346, or in other words, to include the vertex 1310. Control is then passed along logic path 1120 to operational block 1122.

As shown by operational block 1122, extent determination module 1002 is then configured to add the area under edge 1346 to the polygon 1302 area. Control is then passed along logic path 1124 to decisional block 1125.

As shown by decisional block 1125, the extent determination module 1002 is then configured to determine if there are any more edges in polygon 1302. Because more edges remain in polygon 1302, control is returned along logic path 1126 to operational block 1114 when the next edge of polygon 1302 is processed.

In the present example, the next edge in polygon 1302 is edge 1348. Edge 1348 is processed the same way as edge 1345 described above. Control is then passed along logic path 1116 to operational block 1118.

As shown by operational block 1118, the extent for cap polygon 1302 is expanded to include the entire edge 1348, or in other words, to include the vertex 1312. Control is then passed along logic path 1120 to operational block 1122.

As shown by operational block 1122, extent determination module 1002 is then configured to add the area under edge 1348 to the polygon 1302 area. Control is then passed along logic path 1124 to decisional block 1125.

As shown by decisional block 1125, the extent determination module 1002 is then configured to determine if there are any more edges in polygon 1302. Because more edges remain in polygon 1302, control is returned along logic path 1126 to operational block 1114 when the next edge of polygon 1302 is processed.

In the present example the next edge in polygon 1302 is edge 1350. Edge 1350 is processed the same way as edge 1345 described above. Control is then passed along logic path 1116 to operational block 1118.

As shown by operational block 1118, the extent for polygon 1302 is expanded to include the entire edge 1350, or in other words, to include the vertex 1314. Control is then passed along logic path 1120 to operational block 1122.

As shown by operational block 1122, extent determination module 1002 is then configured to add the area under edge 1350 to the polygon 1302 area. Control is then passed along logic path 1124 to decisional block 1125.

As shown by decisional block 1125, the extent determination module 1002 is then configured to determine if there are any more edges in polygon 1302. Because more edges remain in polygon 1302, control is returned along logic path 1126 to operational block 1114 when the next edge of polygon 1302 is processed.

In the present example, the next edge in polygon 1302 is edge 1351. Edge 1351 is processed the same way as edge 1345 described above. Control is then passed along logic path 1116 to operational block 1118.

As shown by operational block 1118, the extent for cap polygon 1302 is expanded to include the entire edge 1351, or in other words, to include the vertex 1316. Control is then passed along logic path 1120 to operational block 1122.

As shown by operational block 1122, extent determination module 1002 is then configured to add the area under edge 1351 to the polygon 1302 area. Control is then passed along logic path 1124 to decisional block 1125.

As shown by decisional block 1125, the extent determination module 1002 is then configured to determine if there are any more edges in polygon 1302. Because more edges remain in polygon 1302, control is returned along logic path 1126 to operational block 1114 when the next edge of polygon 1302 is processed.

In the present example the next edge in polygon 1302 is edge 1352. Edge 1352 is processed the same way as edge 1345 described above. Control is then passed along logic path 1116 to operational block 1118.

As shown by operational block 1118, the extent for polygon 1302 is expanded to include the entire edge 1352, or in other words, to include the vertex 1318. Control is then passed along logic path 1120 to operational block 1122.

As shown by operational block 1122, extent determination module 1002 is then configured to add the area under edge 1352 to the polygon 1302 area. Control is then passed along logic path 1124 to decisional block 1125.

As shown by decisional block 1125, the extent determination module 1002 is then configured to determine if there are any more edges in polygon 1302. Because more edges remain in polygon 1302, control is returned along logic path 1126 to operational block 1114 when the next edge of polygon 1302 is processed.

In the present example the next edge in polygon 1302 is edge 1354. Edge 1354 is also the last edge in polygon 1302. Edge 1354 is processed the same way as edge 1345 described above. Control is then passed along logic path 1116 to operational block 1118.

As shown by operational block 1118, the extent for polygon 1302 is expanded to include the entire edge 1354, or in other words, to include the initially chosen vertex 1306. Control is then passed along logic path 1120 to operational block 1122.

As shown by operational block 1122, extent determination module 1002 is then configured to add the area under edge 1354 to the polygon 1302 area. Control is then passed along logic path 1124 to decisional block 1125.

As shown by decisional block 1125, the extent determination module 1002 is then configured to determine if there are any more edges in polygon 1302. Because edge 1354 is the last edge in polygon 1302, control is passed via logic path 1128 to operational block 1130.

As shown by operational block 1130, extent determination Module 1002 is configured to expand the extent of polygon 1302 by 10%. Control is then passed along logic path 1132 to decisional block 1131.

As shown by decisional block 1131, extent determination module 1002 is then configured to determine whether the area of polygon 1302 is less than zero. If the area of polygon 1302 is less than zero, then control is passed to operational block 1136 wherein polygon 1302 is set to exclude its bounded area. If, however, the area of cap polygon 1302 is greater than zero, then control is passed to operational block 1144 wherein the polygon 1302 is set to include its bounded area. In the present example, it should be noticed that as the area of cap polygon 1302 was being integrally summed, the area calculation was continually going in a clockwise direction. As such, the area for cap polygon 1302 is positive. Control is then passed along logic path 1140 to decisional block 1141.

As shown by decisional block 1141, extent determination module 1002 is then configured to determine whether any other polygon exist in the polygon 1302. In the present case, no other polygons exist. However, it may often be the case where a cap polygon consists of multiple polygons. Such would typically be the case when the polyhedron has a hole. In the present example, however, control is passed to decisional block 1146.

As shown by decisional block 1146, the extent determination module, is then configured to determine whether there are any more cap polygons to be initialized. In the present example, an additional cap polygon exists. As such, control is returned to operational block 1106 wherein the polygon 1304 is processed.

The polygon 1304 is processed in the same manner as was polygon 1302 described above. As such, a detailed explanation of the operation of extent determination module 1002 as it relates to polygon 1304 will not be described. In short, the area for polygon 1304, like polygon 1302, is a positive number and as such, polygon 1304 is set to include area.

Upon initialization and area determination of polygons 1302 and 1304, control is passed to interference cap generation module 1004. Operation of interference cap generation module 1004 as it relates to the present example is described with reference to FIG. 12.

As shown by operational block 1206, the interference cap generation module 1004 is first configured to process the first polygon. In the present example, assume that polygon 1302 is the first polygon processed. Control is passed along a logic block 1208 to operational block 1210.

As shown by operational block 1210, interference cap generation module 1004 is then configured to determine whether the first vertex 1306 of the polygon 1302 is within the interference area. This operation is performed using the "scanline conversion" technique heretofore described. In the present example, vertex 1306 is found not to lie in the interference area. Interference cap generation module 1004 is further configured to set the IN/OUT flag for polygon 1302 as OUT. Control is then passed along logic path 1212 to an operational block 1214.

As shown by operational block 1214, the interference cap generation module 1004 is then configured to process the next edge of the cap polygon 1302. In the present example, the next edge is edge 1345. Control is passed along a logic path 1216 to an operational block 1218.

As shown by operational block 1218, interference cap generation module 1004 is then configured to retrieve the extent for one of the remaining polygons. In the present example, only one other polygon exists; polygon 1304. Control is then passed along a logic path 1220 to a decisional block 1222.

As shown by decisional block 1222, the interference cap generation module 1004 is then configured to determine whether the extent of the edge 1345 of the polygon 1302 overlaps the overall extent of polygon 1304. In the present example, the interference cap generation module 1302 determines that the extent of the edge 1345 of polygon 1302 does not overlap with the extent of polygon 1304. Control is passed along logic path 1230 to decisional block 1270.

As shown by decisional block 1270, the interference cap generation module 1004 is then configured to determine whether there are any other polygons to test against the edge 1345 of polygon 1302. In the present example, no other polygons exist and as such, control is passed along logic path 1274 to operational block 1276.

As shown by operational block 1276, interference cap generation module 102 is then configured to determine whether the vertices of edge 1345 are within the interference area. In the present case, the vertices of edge 1345 are not within the interference area. Control is then passed to decisional block 1280.

As shown by decisional block 1280, interference cap generation module 1004 is configured to determine whether there are any more edges in polygon 1302 that need to be processed. In the present example, there are more edges in cap polygon 1302, and as such, control is returned along a logic path 1282 to operational block 1214 where the next edge of the cap polygon 1302 is processed.

In the present example, the next edge is edge 1346. Control is then passed along logic path 1216 to operational block 1218.

As shown by operational block 1218, interference cap generation module 1004 is then configured to retrieve the extent for polygon 1304. Control is then passed along logic path 1220 to decisional block 1222.

As shown by decisional block 1222, the interference cap generation module 1004 is then configured to determine whether the extent of the edge 1346 of the polygon 1302 overlaps with the overall extent of the polygon 1304. In the present example, the interference cap generation module 1004 determines that the extent of the edge 1346 of the cap polygon 1302 does overlap with the extent of the cap polygon 1304. As such, control is passed along logic path 1238 to operational block 1240.

As shown by operational block 1240, the interference cap generation module 1004 is then configured to process the next edge of polygon 1304. In the present example this would be edge 1360. Control is then passed to decisional block 1244.

As shown by decisional block 1244, interference cap generation module 1004 is then configured to determine whether the extent of edge 1346 of polygon 1302 overlaps with the extent of edge 1360 of polygon 1304. In the present case, the extent of edge 1346 does not overlap with the extent of edge 1360. As such, control passes along logic path 1243 to decisional block 1264.

As shown by decisional block 1264, interference cap generation module 1004 is then configured to determine whether any more edges exist in polygon 1304. In the present example, additional edges exist and as such control is returned along logic path 1266 to operational block 1240 where the next edge of polygon 1304 is processed.

In the present example, the next edge of polygon 1304 is edge 1362. Control is then passed to decisional block 1244.

As shown by decisional block 1244, interference cap generation module 1004 is then configured to determine whether the extent of edge 1346 of polygon 1302 overlaps with the extent of edge 1362 of polygon 1304. In the present case, the extent of edge 1346 does not overlap with the extent of edge 1362. As such, control passes along logic path 1243 to decisional block 1264.

As shown by decisional block 1264, interference cap generation module 1004 is then configured to determine whether any more edges exist in polygon 1304. In the present example, additional edges exist and as such control is returned along logic path 1266 to operational block 1240 where the next edge of polygon 1304 is processed.

In the present example, the next edge of polygon 1304 is edge 1364. Control is then passed to decisional block 1244.

As shown by decisional block 1244, interference cap generation module 1004 is then configured to determine whether the extent of edge 1346 of polygon 1302 overlaps with the extent of edge 1364 of polygon 1304. In the present case, the extent of edge 1346 does not overlap with the extent of edge 1364. As such, control passes along logic path 1243 to decisional block 1264.

As shown by decisional block 1264, interference cap generation module 1004 is then configured to determine whether any more edges exist in polygon 1304. In the present example, additional edges exist and as such control is returned along logic path 1266 to operational block 1240 where the next edge of polygon 1304 is processed.

In the present example, the next edge of polygon 1304 is edge 1366. Control is then passed to decisional block 1244.

As shown by decisional block 1244, interference cap generation module 1004 is then configured to determine whether the extent of edge 1346 of polygon 1302 overlaps with the extent of edge 1366 of polygon 1304. In the present case, the extent of edge 1346 does not overlap with the extent of edge 1366. As such, control passes along logic path 1243 to decisional block 1264.

As shown by decisional block 1264, interference cap generation module 1004 is then configured to determine whether any more edges exist in polygon 1304. In the present example, additional edges exist and as such control is returned along logic path 1266 to operational block 1240 where the next edge of polygon 1304 is processed.

In the present example, the next edge of polygon 1304 is edge 1368. Control is then passed to decisional block 1244.

As shown by decisional block 1244, interference cap generation module 1004 is then configured to determine whether the extent of edge 1346 of polygon 1302 overlaps with the extent of edge 1366 of polygon 1304. In the present case, the extent of edge 1346 does not overlap with the extent of edge 1368. As such, control passes along logic path 1243 to decisional block 1264.

As shown by decisional block 1264, interference cap generation module 1004 is then configured to determine whether any more edges exist in polygon 1304. In the present example, edge 1368 was the last edge in polygon 1304. As such control is passed along logic path 1268 to decisional block 1270.

As shown by decisional block 1270, interference cap generation module 1004 is then configured to determine whether there are any more polygons to test against edge 1346 of polygon 1302. In the present example, no other polygons exist. As such, control is passed along logic path 1274 to operational block 1276.

As shown by operational block 1276, interference cap generation module 1002 is then configured to determine whether the vertices of edge 1346 of polygon 1302 are within the interference area. In the present case, the vertices of edge 1346 are not within the interference area. Control is then passed to decisional block 1280.

As shown by decisional block 1280, interference cap generation module 1004 is configured to determine whether there are any more edges in polygon 1302 that need to be processed. In the present example, there are more edges in cap polygon 1302, and as such, control is returned along a logic path 1282 to operational block 1214 where the next edge of the cap polygon 1302 is processed.

In the present example, the next edge in polygon 1302 is edge 1348. Control is then passed along logic path 1216 to operational block 1218.

As shown by operational block 1218, interference cap generation module 1004 is then configured to retrieve the extent for polygon 1304. Control is then passed along logic path 1220 to decisional block 1222.

As shown by decisional block 1222, the interference cap generation module 1004 is then configured to determine whether the extent of the edge 1348 of the polygon 1302 overlaps with the overall extent of the polygon 1304. In the present example, the interference cap generation module 1302 determines that the extent of the edge 1348 of the cap polygon 1302 does overlap with the extent of the polygon 1304. Control is passed along logic path 1238 to operational block 1240.

As shown by operational block 1240, the interference cap generation module 1004 is then configured to retrieve the next edge of the polygon 1304. In the present example, this would be edge 1360. Control is then passed along logic path 1242 to decisional block 1244.

As shown by decisional block 1244, the interference cap generation module 1004 is then configured to determine whether the extent of the edge 1348 of the polygon 1302 overlaps with the extent of the edge 1360 of polygon 1304. In the present case, the extent of edge 1348 does not overlap with the extent of edge 1360. As such, control passes along logic path 1243 to decisional block 1264.

As shown by decisional block 1264, interference cap generation module 1004 is then configured to determine whether any more edges exist in polygon 1304. In the present example, additional edges exist and as such control is returned along logic path 1266 to operational block 1240 where the next edge of polygon 1304 is processed.

In the present example, edge 1362 is the next edge in polygon 1304. Control is then passed along logic path 1242 to decisional block 1244.

As shown by decisional block 1244, the interference cap generation module 1004 is then configured to determine whether the extent of the edge 1348 of polygon 1302 overlaps with the extent of the edge 1362 of the polygon 1304. In the present case, the extent of edge 1348 does not overlap with the extent of edge 1362. As such, control passes along logic path 1243 to decisional block 1264.

As shown by decisional block 1264, interference cap generation module 1004 is then configured to determine whether any more edges exist in polygon 1304. In the present example, additional edges exist and as such control is returned along logic path 1266 to operational block 1240 where the next edge of polygon 1304 is processed.

In the present example, edge 1364 is the next edge in polygon 1304. Control is then passed along logic path 1242 to decisional block 1244.

As shown by decisional block 1244, the interference cap generation module 1004 is then configured to determine whether the extent of the edge 1348 of the polygon 1302 overlaps with the extent of the edge 1364 of the polygon 1304. In the present example, the extent of the edge 1348 of the polygon 1302 does not overlap with the extent of edge 1364 of polygon 1304. As such, control is passed along logic path 1243 to decisional block 1264.

As shown by decisional block 1264, interference cap generation module 1004 is then configured to determine whether any more edges exist in polygon 1304. In the present example, additional edges exist and as such control is returned along logic path 1266 to operational block 1240 where the next edge of polygon 1304 is processed.

In the present example, edge 1366 is the next edge in polygon 1304. Control is then passed along logic path 1242 to decisional block 1244.

As shown by decisional block 1244, the interference cap generation module 1004 is then configured to determine whether the extent of the edge 1348 of the polygon 1302 overlaps the extent of the edge 1366 of polygon 1304. In the present example, the extent of the edge 1348 of the cap polygon 1302 does overlap the extent of edge 1366 of polygon 1304. As such, control is passed along logic path 1246 to operational block 1248.

As shown by operational block 1248, interference cap generation module 1004 is then configured to determine if the edge 1348 of the polygon 1302 actually intersects with the edge 1366 of polygon 1304. Control is then passed along logic path 1250 to decisional block 1252.

As shown by decisional block 1252, the interference cap generation module 1004 determines that edge 1348 does not intersect with edge 1366. As such, control is passed along logic path 1254 to decisional block 1264.

As shown by decisional block 1264, interference cap generation module 1004 is then configured to determine whether any more edges exist in polygon 1304. In the present example, additional edges exist and as such control is returned along logic path 1266 to operational block 1240 where the next edge of polygon 1304 is processed.

In the present example, edge 1368 is the next edge in polygon 1304. Control is then passed along logic path 1242 to decisional block 1244.

As shown by decisional block 1244, the interference cap generation module 1004 is then configured to determine whether the extent of the edge 1348 of polygon 1302 overlaps with the extent of the edge 1368 of polygon 1304. In the present example, the extent of edge 1348 of the polygon 1302 does overlap with the extent of edge 1368 of polygon 1304. As such, control is passed along logic path 1246 to operational block 1248.

As shown by operational block 1248, interference cap generation module 1004 is then configured to determine if edge 1348 of polygon 1302 actually intersects with edge 1368 of polygon 1304. Control is then passed along logic path 1250 to decisional block 1252.

As shown by decisional block 1252, the interference cap generation module 1004 determines that edge 1348 of polygon 1302 does indeed intersect with edge 1368 of polygon 1304. As such, control is passed along logic path 1255 to operational block 1256.

As shown by operational block 1256, the interference cap generation module 1004 is then configured to calculate the intersection point of edges 1348 and 1368. In the present example, this point is shown as intersection point 1380. Control is then passed along logic path 1258 to operational block 1260.

As shown by operational block 1260, the interference cap generation module 1004 is then configured to store the intersection point 1380 in an interference cap edge list (not shown) as well as toggle the IN/OUT flag from "out" to "in." Control is then passed along logic path 1262 to decisional block 1264.

As shown by decisional block 1264, the interference cap generation module 1004 is then configured to determine whether there are any more edges in the polygon 1304 that need to be compared against edge 1248 of polygon 1320. Because edge 1368 was the last edge in polygon 1304, control is passed along logic path 1268 to decisional block 1270.

As shown by decisional block 1270, the interference cap generation module 1004 is then configured to determine whether there are any more polygons to test against edge 1248 of polygon 1302. In the present example, no other polygons exist, and as such, control is passed along logic path 1274 to operational block 1276.

As shown by operational block 1276, the interference cap generation module 1004 is then configured to check the end points (vertices 1310 and 1312) of edge 1248 of polygon 1320 and store the vertices in the interference cap edge list if they are in fact a part of the interference area. In the present case, only vertex 1312 is found to be within the interference area. Vertex 1210 is then stored in the intersection cap edge list. Control is then passed along logic path 1278 to decisional block 1280.

As shown by decisional block 1280 the interference cap generation module 1004 is then configured to determine if there are any more edges in the polygon 1302 that need to be processed. In the present example, additional edges exist for polygon 1302 (edges 1350, 1351, 1352, and 1354). Control is returned along logic path 1282 to operational block 1214 wherein the next edge of polygon 1302 is processed.

In the present example, the next edge in polygon 1302 is edge 1350. Control is then passed along logic path 1216 to operational block 1218.

As shown by operational block 1218, interference cap generation module 1004 is then configured to retrieve the extent for polygon 1304. Control is then passed along logic path 1220 to decisional block 1222.

As shown by decisional block 1222, the interference cap generation module 1004 is then configured to determine whether the extent of the edge 1350 of the polygon 1302 overlaps the overall extent of polygon 1304. In the present example, the interference cap generation module 1302 determines that the extent of the edge 1350 of polygon 1302 does overlap with the extent of polygon 1304. Control is passed along logic path 1238 to operational block 1240.

As shown by operational block 1240, the interference cap generation module 1004 is then configured to retrieve the first edge of polygon 1304. In the present example, this would be edge 1360. Control is then passed along logic path 1242 to decisional block 1244.

As shown by decisional block 1244, the interference cap generation module 1004 is then configured to determine whether the extent of the edge 1350 of polygon 1302 overlaps the extent of edge 1360 of polygon 1304. In the present case, the extent of edge 1350 does not overlap the extent of edge 1360. As such, control is passed along logic path 1243 to decisional block 1264.

As shown by decisional block 1264, interference cap generation module 1004 is then configured to determine whether any more edges exist in polygon 1304. In the present example, additional edges exist and as such control is returned along logic path 1266 to operational block 1240 where the next edge of polygon 1304 is processed.

In the present example, edge 1362 is the next edge in polygon 1304. Control is then passed along logic path 1242 to decisional block 1244.

As shown by decisional block 1244, the interference cap generation module 1004 is then configured to determine whether the extent of the edge 1350 of polygon 1302 overlaps the extent of edge 1362 of polygon 1304. In the present case, the extent of edge 1350 does not overlap with the extent of edge 1362 and as such, control is returned along a logic path 1243 to decisional block 1264.

As shown by decisional block 1264, interference cap generation module 1004 determines that additional edges exist in cap polygon 1304. As such, control is returned along logic path 1266 to operational block 1240 wherein the next edge of the polygon 1304 is processed.

In the present example, edge 1364 is the next edge in polygon 1304. Control is then passed along logic path 1242 to decisional block 1244.

As shown by decisional block 1244, the interference cap generation module 1004 is then configured to determine whether the extent of edge 1350 of the polygon 1302 overlaps with the extent of the edge 1364 of polygon 1304. In the present example, the extent of edge 1350 of polygon 1302 does overlap with the extent of edge 1364 of polygon 1304. As such, control is passed along logic path 1246 to operational block 1248.

As shown by operational block 1248, interference cap generation module 1004 is then configured to determine if the edge 1350 of the polygon 1302 actually intersects with the edge 1364 of polygon 1304. Control is then passed along logic path 1250 to decisional block 1252.

As shown by decisional block 1252, the interference cap generation module 1004 determines that edge 1350 does not intersect with edge 1364. As such, control is returned along logic path 1254 to decisional block 1264.

As shown by decisional block 1264, interference cap generation module 1004 determines that additional edges exist in cap polygon 1304. As such, control is returned along logic path 1266 to operational block 1240 wherein the next edge of the polygon 1304 is processed.

In the present example, edge 1366 is the next edge in polygon 1304. Control is then passed along logic path 1242 to decisional block 1244.

As shown by decisional block 1244, the interference cap generation module 1004 is then configured to determine whether the extent of the edge 1350 of polygon 1302 overlaps with the extent of edge 1366 of the polygon 1304. In the present example, the extent of edge 1350 of the polygon 1302 does overlap with the extent of edge 1366 of polygon 1304. As such, control is passed along logic path 1246 to operational block 1248.

As shown by operational block 1248, interference cap generation module 1004 is then configured to determine if the edge 1350 of the polygon 1302 actually intersects with the edge 1366 of polygon 1304. Control is then passed along logic path 1250 to decisional block 1252.

As shown by decisional block 1252, the interference cap generation module 1004 determines that edge 1350 of polygon 1302 does indeed intersect with edge 1366 of polygon 1304. As such, control is passed along logic path 1255 to operational block 1256.

As shown by operational block 1256, the interference cap generation module 1004 is then configured to calculate the intersection point of edges 1350 and 1366. In the present example, this point is shown as intersection point 1382. Control is then passed along logic path 1258 to operational block 1260.

As shown by operational block 1260, the interference cap generation module 1004 is then configured to store the intersection point 1382 the interference cap edge list and to toggle the IN/OUT flag for polygon 1302 from "in" to "out." Control is then passed along logic path 1262 to decisional block 1264.

As shown by decisional block 1264, the interference cap generation module 1004 is then configured to determine whether there are any more edges in the polygon 1304 that need to be compared against edge 1250 of polygon 1302. Because additional edges exist in polygon 1304 (edge 1368), control is passed along logic path 1266 to operational block 1240 wherein the next edge in polygon 1304 is processed.

In the present example, edge 1368 is the next edge in polygon 1304. Edge 1368 is also the last edge in polygon 1304. Control is then passed along logic path 1242 to decisional block 1244.

As shown by decisional block 1244, the interference cap generation module 1004 is then configured to determine whether the extent of edge 1350 of polygon 1302 overlaps with the extent of edge 1368 of polygon 1304. In the present case, the extent of edge 1350 does not overlap with the extent of edge 1368 and as such, control is passed along logic path 1243 to decisional block 1264.

As shown by decisional block 1264, interference cap generation module 1004 determines that edge 1368 is last edge in polygon 1304. As such, control is passed along logic path 1268 to decisional block 1270.

As shown by decisional block 1270, the interference cap generation module 1004 is then configured to determine whether there are any more polygons to test against edge 1250 of polygon 1302. In the present example, no other polygons exist, and as such, control is passed along logic path 1274 to operational block 1276.

As shown by operational block 1276, the interference cap generation module 1004 is then configured to check the end points (vertices 1312 and 1314) of edge 1250 of polygon 1302 and store the vertices in the interference cap edge list if they are in fact a part of the interference area. In the present case, only vertex 1312 is found to be within the interference area due to the flag being already set to "in." As such, vertex 1312 is stored in the interference cap edge list. Control is then passed along logic path 1278 to decisional block 1280.

As shown by decisional block 1280 the interference cap generation module 1004 is then configured to determine if there are any more edges in the polygon 1302. In the present example, additional edges exist for polygon 1302 (edges 1351, 1352, and 1354). Control is returned along logic path 1282 to operational block 1214 wherein the next edge of polygon 1302 is processed.

In the present example, the next edge of polygon 1302 is edge 1351. Control is then passed along logic path 1216 to operational block 1218.

As shown by operational block 1218, interference cap generation module 1004 is then configured to retrieve the extent list for polygon 1304. Control is then passed along logic path 1220 to decisional block 1222.

As shown by decisional block 1222, the interference cap generation module 1004 is then configured to determine whether the extent of edge 1351 of the polygon 1302 overlaps with the overall extent of polygon 1304. In the present example, the interference cap generation module 1302 determines that the extent of edge 1351 of polygon 1302 does overlap with the extent of polygon 1304. Control is passed along logic path 1238 to operational block 1240.

As shown by operational block 1240, the interference cap generation module 1004 is then configured to retrieve the next edge of polygon 1304. In the present example, this would be edge 1360. Control is then passed along logic path 1242 to decisional block 1244.

As shown by decisional block 1244, the interference cap generation module 1004 is then configured to determine whether the extent of edge 1351 of polygon 1302 overlaps with the extent of edge 1360 of polygon 1304. In the present case, the extent of edge 1351 does not overlap with the extent of edge 1360 and as such, control is passed along logic path 1243 to decisional block 1264.

As shown by decisional block 1264, interference cap generation module 1004 determines that additional edges exist in polygon 1304 and, as such, control is passed along logic path 1266 to operational block 1240 wherein the next edge of polygon 1304 is processed.

In the present example, edge 1362 is the next edge in polygon 1304. Control is then passed along logic path 1242 to decisional block 1244.

As shown by decisional block 1244, the interference cap generation module 1004 is then configured to determine whether the extent of edge 1351 of polygon 1302 overlaps with the extent of edge 1362 of polygon 1304. In the present case, the extent of edge 1348 does not overlap with the extent of edge 1362 and as such, control is passed along logic path 1243 to decisional block 1264.

As shown by decisional block 1264, interference cap generation module 1004 determines that additional edges exist in polygon 1302 and, as such, control is passed along logic path 1266 to operational block 1240 wherein the next edge of the polygon 1304 is processed.

In the present example, edge 1364 is the next edge in polygon 1304. Control is then passed along logic path 1242 to decisional block 1244.

As shown by decisional block 1244, the interference cap generation module 1004 is then configured to determine whether the extent of edge 1351 of polygon 1302 overlaps with the extent of edge 1364 of the polygon 1304. In the present example, the extent of edge 1351 of polygon 1302 does overlap with the extent of edge 1364 of polygon 1304. As such, control is passed along logic path 1246 to operational block 1248.

As shown by operational block 1248, interference cap generation module 1004 is then configured to determine if the edge 1351 of polygon 1302 actually intersects with edge 1364 of polygon 1304. Control is then passed along logic path 1250 to decisional block 1252.

As shown by decisional block 1252, the interference cap generation module 1004 determines that edge 1351 of polygon 1302 does indeed intersect with edge 1364 of polygon 1304. As such, control is passed along logic path 1255 to operational block 1256.

As shown by operational block 1256, the interference cap generation module 1004 is then configured to calculate the intersection point of edges 1351 and 1364 as well as toggle the IN/OUT flag for polygon 1302 from "out" to "in." In the present example, this point is shown as intersection point 1383. Control is then passed along logic path 1258 to operational block 1260.

As shown by operational block 1260, the interference cap generation module 1004 is then configured to store the intersection point 1383 in the interference cap edge list. Control is then passed along logic path 1262 to decisional block 1264.

As shown by decisional block 1264, the interference cap generation module 1004 is then configured to determine whether there are any more edges in polygon 1304 that need to be compared against edge 1250 of polygon 1320. Because additional edges exist in cap polygon 1304 (edges 1366 and 1368), control is passed along logic path 1266 to operational block 1240 wherein the next edge in polygon 1304 is processed.

In the present example, edge 1366 is the next edge in polygon 1304. Control is then passed along logic path 1242 to decisional block 1244.

As shown by decisional block 1244, the interference cap generation module 1004 is then configured to determine whether the extent of edge 1351 of polygon 1302 overlaps the extent of edge 1366 of polygon 1304. In the present case, the extent of edge 1351 does not overlap with the extent of edge 1366 and as such, control is passed along logic path 1243 to decisional block 1264.

As shown by decisional block 1264, interference cap generation module 1004 determines that additional edges exist in polygon 1304. As such, control is returned along logic path 1266 to operational block 1240 wherein the next edge of the polygon 1304 is processed.

In the present example, edge 1368 is the next edge in polygon 1304. Control is then passed along logic path 1242 to decisional block 1244.

As shown by decisional block 1244, the interference cap generation module 1004 is then configured to determine whether the extent of edge 1351 of cap polygon 1302 overlaps with the extent of edge 1368 of polygon

1304. In the present case, the extent of edge 1351 does not overlap with the extent of edge 1368 and as such, control is passed along logic path 1243 to decisional block 1264.

As shown by decisional block 1264, interference cap generation module 1004 determines that edge 1368 is last edge in polygon 1304. As such, control is passed along logic path 1268 to decisional block 1270.

As shown by decisional block 1270, the interference cap generation module 1004 is then configured to determine whether there are any more polygons to test against edge 1251 of polygon 1302. In the present example, no other polygons exist, and as such, control is passed along logic path 1274 to operational block 1276.

As shown by operational block 1276, the interference cap generation module 1004 is then configured to check the end points (vertices 1314 and 1316) of edge 1251 of polygon 1302 and store the vertices in the interference cap edge list if they are in fact a part of the interference area. In the present case, vertex 1316 is found to be within the interference area. This is because the flag for polygon 1302 had been previously toggled to "in." As such, vertex 1316 is stored in the intersection cap edge list. Control is then passed along logic path 1278 to decisional block 1280.

As shown by decisional block 1280 the interference cap generation module 1004 is then configured to determine if there are any more edges in the polygon 1302. In the present example, additional edges exist for polygon 1302 (edges 1352 and 1354). Control is returned along logic path 1282 to operational block 1214 wherein the next edge of polygon 1302 is processed.

In the present example, the next edge of polygon 1302 is edge 1352. Control is then passed along logic path 1216 to operational block 1218.

As shown by operational block 1218, interference cap generation module 1004 is then configured to retrieve the extent for polygon 1304. Control is then passed along logic path 1220 to decisional block 1222.

As shown by decisional block 1222, the interference cap generation module 1004 is then configured to determine whether the extent of edge 1352 of polygon 1302 overlaps with the overall extent of cap polygon 1304. In the present example, the interference cap generation module 1002 determines that the extent of edge 1352 of the polygon 1302 does overlap the extent of the polygon 1304. Control is passed along logic path 1238 to operational block 1240.

As shown by operational block 1240, the interference cap generation module 1004 is then configured to retrieve the next edge of polygon 1304. In the present example, this would be edge 1360. Control is then passed along logic path 1242 to decisional block 1244.

As shown by decisional block 1244, the interference cap generation module 1004 is then configured to determine whether the extent of edge 1352 of polygon 1302 overlaps with the extent of edge 1360 of polygon 1304. In the present case, the extent of edge 1352 does not overlap with the extent of edge 1360 and as such, control is passed along logic path 1243 to decisional block 1264.

As shown by decisional block 1264, interference cap generation module 1004 determines that additional edges exist in polygon 1304 and, as such, control is passed along logic path 1266 to operational block 1240 wherein the next edge of the polygon 1304 is processed.

In the present example, edge 1362 is the next edge in polygon 1304. Control is then passed along logic path 1242 to decisional block 1244.

As shown by decisional block 1244, the interference cap generation module 1004 is then configured to determine whether the extent of edge 1352 of polygon 1302 overlaps with the extent of edge 1362 of polygon 1304. In the present case, the extent of edge 1352 does overlap the extent of edge 1362 of polygon 1304. As such, control is passed along logic path 1246 to operational block 1248.

As shown by operational block 1248, interference cap generation module 1004 is then configured to determine if the edge 1352 of polygon 1302 actually intersects with edge 1362 of polygon 1304. Control is then passed along logic path 1250 to decisional block 1252.

As shown by decisional block 1252, the interference cap generation module 1004 determines that edge 1352 does not intersect with edge 1362. As such, control is returned along logic path 1254.

As shown by decisional block 1264, interference cap generation module 1004 determines that additional edges exist in polygon 1304 and, as such, control is passed along logic path 1266 to operational block 1240 wherein the next edge of the polygon 1304 is processed.

In the present example, edge 1364 is the next edge in polygon 1304. Control is then passed along logic path 1242 to decisional block 1244.

As shown by decisional block 1244, the interference cap generation module 1004 is then configured to determine whether the extent of edge 1352 of polygon 1302 overlaps with the extent of edge 1364 of polygon 1304. In the present example, the extent of edge 1352 of polygon 1302 does overlap with the extent of edge 1364 of polygon 1304. As such, control is passed along logic path 1246 to operational block 1248.

As shown by operational block 1248, interference cap generation module 1004 is then configured to determine if the edge 1352 of polygon 1302 actually intersects with the edge 1364 of polygon 1304. Control is then passed along logic path 1250 to decisional block 1252.

As shown by decisional block 1252, the interference cap generation module 1004 determines that edge 1352 of polygon 1302 does indeed intersect with edge 1364 of polygon 1304. As such, control is passed along logic path 1255 to operational block 1256.

As shown by operational block 1256, the interference cap generation module 1004 is then configured to calculate the intersection point of edges 1352 and 1364 as well as toggle the IN/OUT flag for polygon 1302 from "in" to "out." In the present example, this point is shown as intersection point 1385. Control is then passed along logic path 1258 to operational block 1260.

As shown by operational block 1260, the interference cap generation module 1004 is then configured to store the intersection point 1385 in the interference cap edge list. Control is then passed along logic path 1262 to decisional block 1264.

As shown by decisional block 1264, the interference cap generation module 1004 is then configured to determine whether there are any more edges in polygon 1304 that need to be compared against edge 1248 of polygon 1302. In the present example, more edges exist in polygon 1304 (edges 1366 and 1368). As such, control is returned along logic path 1266 to operational block 1240 where the next edge in polygon 1304 is processed.

In the present example, edge 1366 is the next edge in polygon 1304. Control is then passed along logic path 1242 to decisional block 1244.

As shown by decisional block 1244, the interference cap generation module 1004 is then configured to determine whether the extent of edge 1352 of cap polygon 1302 overlaps the extent of the edge 1366 of polygon 1304. In the present case, the extent of edge 1352 does not overlap with the extent of edge 1366 and as such, control is passed along logic path 1243 to decisional block 1264.

As shown by decisional block 1264, interference cap generation module 1004 determines that additional edges exist in polygon 1304 (edge 1368). As such, control is returned along logic path 1266 to operational block 1240 wherein the next edge of the polygon 1304 is processed.

In the present example, edge 1368 is the next edge in polygon 1304. Control is then passed along logic path 1242 to decisional block 1244.

As shown by decisional block 1244, the interference cap generation module 1004 is then configured to determine whether the extent of edge 1352 of polygon 1302 overlaps with the extent of edge 1368 of polygon 1304. In the present case, the extent of edge 1351 does not overlap with the extent of edge 1368 and as such, control is passed along logic path 1243 to decisional block 1264.

As shown by decisional block 1264, interference cap generation module 1004 determines that edge 1368 is last edge in cap polygon 1304. As such, control is passed along logic path 1268 to decisional block 1270.

As shown by decisional block 1270, the interference cap generation module 1004 is then configured to determine whether there are any more polygons to test against edge 1252 of polygon 1302. In the present example, no other polygons exist, and as such, control is passed along logic path 1274 to operational block 1276.

As shown by operational block 1276, the interference cap generation module 1004 is then configured to check the end points (vertices 1316 and 1318) of edge 1252 of polygon 1302 and store the vertices in the interference cap list edge if they are in fact a part of the interference area. In the present case, only vertex 1316 is found to be within the interference area. This is because the IN/-OUT flag for polygon 1302 had previously been set as "in." As such, vertex 1316 is stored in the intersection cap list. Control is then passed along the logic path 1278 to decisional block 1280.

As shown by decisional block 1280 the interference cap generation module 1004 is then configured to determine if there are any more edges in the polygon 1302 that need to be processed. In the present example, only one edge is left for polygon 1302 (edge 1354). Control is returned along logic path 1282 to operational block 1214 wherein the next edge of polygon 1302 is processed.

In the present example, the next edge of polygon 1302 is edge 1354. Edge 1354 is the last edge in polygon 1302. Control is then passed along logic path 1216 to operational block 1218.

As shown by operational block 1218, interference cap generation module 1004 is then configured to retrieve the extent for polygon 1304. Control is then passed along logic path 1220 to decisional block 1222.

As shown by decisional block 1222, the interference cap generation module 1004 is then configured to determine whether the extent of edge 1354 of polygon 1302 overlaps with the overall extent of polygon 1304. In the present example, the interference cap generation module 1004 determines that the extent of edge 1354 of polygon 1302 does not overlap with the extent of cap polygon 1304. Control is passed along a logic path 1230 to decisional block 1270.

As shown by decisional block 1270, the interference cap generation module 1004 is then configured to determine whether there are any other polygons to test against the edge 1354 of polygon 1302. In the present example, no other polygons exist and as such, control is passed along logic path 1274 to operational block 1276.

As shown by operational block 1276, interference cap generation module 102 is then configured to determine whether the vertices of edge 1354 are within the interference area. In the present case, the vertices of edge 1345 are not within the interference area. Control is then passed to decisional block 1280.

As shown by decisional block 1280, interference cap generation module 1004 is configured to determine whether there are any more edges in polygon 1302 that need to be processed. In the present example, edge 1254 is the last edge in polygon 1302. As such, control is passed along logic path 1232 to decisional block 1234.

As shown by decisional block 1234, the interference cap generation module 1004 is then configured to determine whether there are additional polygons to check. As described before each polygon is checked against all others. In the present case, we have only checked the polygon 1302 relative to polygon 1304. However, to complete the interference check, it is necessary to check polygon 1304 relative to polygon 1302. As such, control would be passed along logic path 1284 to operational block 1206 wherein polygon 1304 is processed.

The processing of polygon 1304 is the same as the described above for polygon 1302. As such, the details of such processing will not be explained herein. In short, comparison of polygon 1304 with polygon 1304 results in three edges being stored in the interference cap edge list. The first edge is defined by vertices 1385 and 1383. The second edge is defined by vertices 1382 and 1328. The third edge is defined by vertices 1328 and 1380.

Thereafter, control is eventually passed along logic path 1232 to decisional block 1234. As shown by decisional block 1234, the interference cap generation module 1004 is then configured to determine whether there are additional polygons to check.

In the present example, there are no more polygons need to be checked. As such, control is passed along logic path 1286 to operational block 1288.

As shown by operational block 1288, the interference cap generation module 1004 is then configured to connect the interference cap polygon using the edges (stored as vertices) in the interference cap edge list. In the preferred embodiment, this can be performed with the match cap vertex module 604. Control is then passed along logic path 1289 to operational block 1291.

As shown by operational block 1291, the interference cap generation module 1004 then sends the interference cap polygon to rendering module 208 where it is rendered. The rendering module 208 is configured to render the interference cap polygon with appropriate attributes indicative of the interference area. Such attributes may include, but are not limited to, shading or crosshatching.

Control is then passed along logic path 1291 to end block 1292 where operation of the interference cap generation module 1004 is terminated.

Figure 14:
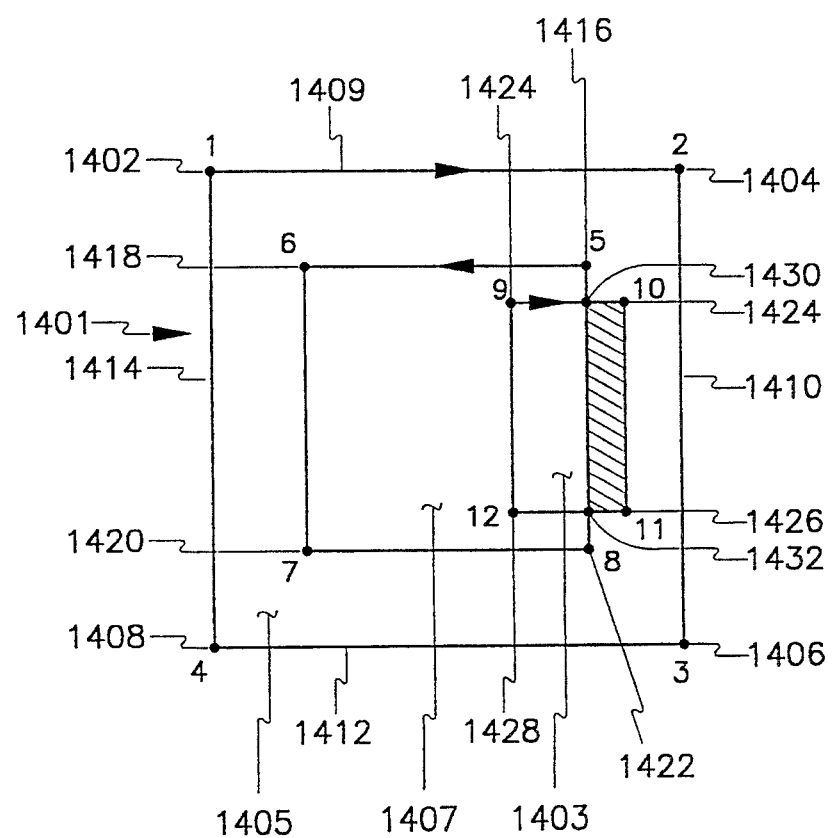
FIG. 14 is a plan view showing one cap polygon having a hole therein, a second solid cap polygon placed within the hole of the first cap polygon, and an interference cap polygon showing the intersection area of the first cap polygon and the second cap polygon.

Referring next to FIG. 14, shown is first cap polygon 1401 and a second cap polygon 1403. First cap polygon 1401 is composed of a first polygon 1405 and a second polygon 1407.

In practice, polygon 1401 may represent a square housing have a hole therein. Polygon 1405 would represent the housing and polygon 1407 would represent the hole. Typically, polyhedron having holes are created by the user as a set of sub-polyhedron having a plurality of polygons. After sectioning about a sectioning plane, the resultant cap polygon is made up of several sub-polygon caps; one sub-polygon cap for the housing and one sub-polygon cap for the hole.

Interference module 206 processes polygon 1405 and polygon 1407 as though they were separate and distinct polygons. This feature of interference module 206 allows the present invention, for example, to ensure that a polyhedron does not intersect itself. In other words, the present invention can check the object to ensure that the user did not inadvertently place the hole outside of the housing.

Interference module 206 processes polygon 1405, polygon 1407 and polygon 1403, the same as that described for the polygons shown in FIG. 13 and heretofore described. However, in contrast to the example shown in FIG. 13 where only two polygons had to be examined (polygons 1302 and 1304), in the present example three polygons must be processed by interference module 206 (polygon 1405, polygon 1407 and polygon 1403).

In operation, interference module 206 would operate as follows.

The extent for each polygon would be calculated and the polygons would be specified as either "including area" or "excluding area." In the present example, polygon 1405 would be determined to "include" its bounded area, thus representing a solid. Polygon 1407 would be determined to "exclude" its bounded area, thus representing a hole. Polygon 1403 would be determined to "include" its bounded area, thus representing a solid.

Thereafter, each polygon would be compared against all the other polygons to determine if its vertices are part of the interference area. Analysis of polygon 1405 relative to polygon 1407 and polygon 1403, would result in no intersection point and/or vertices of polygon 1407 being found in the interference area.

Analysis of polygon 1407 relative to polygon 1405 and 1403 would result in one edge being added to the interference cap edge list. The edge would be defined by intersection points 1430 and 1432.

Analysis of polygon 1403 relative to polygon 1405 and polygon 1407 would result in three edges being stored in the interference cap edge list. The first edge would be defined by intersection point 1430 and vertex 1424. The second edge would be defined by vertex 1424 and vertex 1426. The third edge would be defined by vertex 1426 intersection point 1432.

Referring now to FIG. 15, shown are several potential interference types detectable via the interference checking module 118 of the present invention. FIG. 15 is comprised of FIGS. 15(a)–(f). FIG. 15(a) shows two non-interfering cap polygons.

FIG. 15(b) shows two cap polygons that interfere with each other.

FIG. 15(c) shows a cap polygon that interferes with itself. Self intersecting polygons are detectable due to the combination of area containment in conjunction with the 'scan conversion' technique discussed heretofore.

FIG. 15(d) shows an excluding polygon inside of an including polygon. This situation could arise when the user correctly defines a hollow ellipse or a hollow cylinder.

FIG. 15(e) shows two excluding cap polygons interfering with each other inside of an including cap polygon. This situation could arise when the user desires to create an ellipse have two independent holes therein or in the case of a hosing with two hollow cylinders, and inadvertently enters the wrong coordinates of the polyhedron.

FIG. 15(f) shows an including polygon inside of an including polygon. This situation may arise where the user incorrectly defines a hollow ellipse or a hollow cylinder.

These above interference forms are made possible by requiring the user to specify the direction of polygons when creating the polyhedron. It should be clearly understood that FIGS. 15(a)–(f) represent only a small fraction of the type of interference types that can be checked by the present invention.

Alternative Embodiments/Enhancements

Referring now to FIG. 16, where an alternative embodiment of the interference checking module 118 is shown. This alternative embodiment comprises the extent determination module 1002, interference cap generation module 1004, and interference cap render module 1006 heretofore described. Additionally, the interference checking module 118 may further comprise a vertex movement module 1602.

Vertex movement module 1602 is generally provided to ensure that a point is not mistakenly considered by the interference checking module 118 to lie either on an edge or on a side of edge when in fact it does not. This problem may occur due to floating point roundoff errors that accumulate during generation of the cap polygons.

Following is the pseudo code for the vertex movement module 1602.

```
vertex_moved = TRUE
count = 0
while (vertex_moved and count <10)
    vertex_moved = False
    count = count + 1
    for each polygon P1 in set of caps
        this pgons hits = 0
        for each edge E1 in P1
            for each polygon P1 in set of caps
                if E1 is within extent of P1
                    for each; edge E2 in P1
                        if E1 intersects of almost intersects E1
                            this pgon hits = 1
                            if vertex in E1 is close to E1
                                move vertex
                                vertex_moved = TRUE
        if (this_pgon_hits == 0)
            remove this pgon from further processing
            if include/exclude flag disagrees with 'scan conversion'
                flag pgon as belonging in interference cap
                toggle include/exclude bits of all polygons inside this one
    if (count == 10)
```

| signal error |
|---|

Figure 17A:
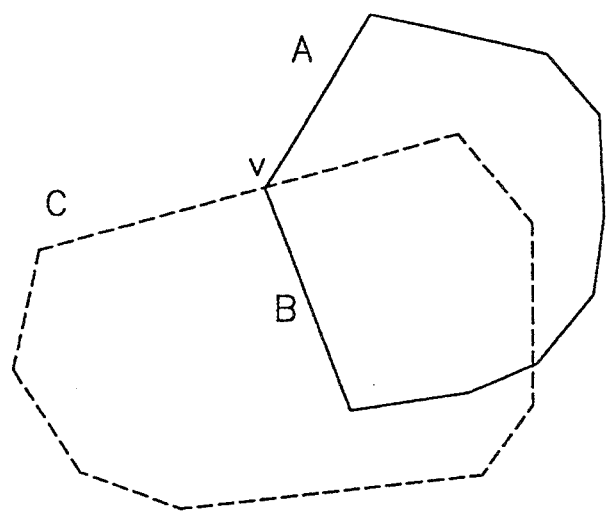
FIGS. 17(a) and 17(b) are illustrations showing a vertex very close to an edge.
Figure 17B:
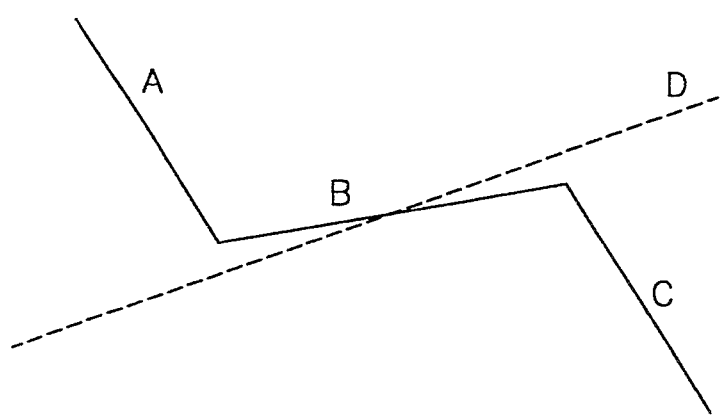

Referring to FIG. 17b, where points are very close to an edge. Shown is an edge B of a first cap polygon and a second edge D of a second cap polygon. Edges B and D are nearly parallel.

To encounter a problem, B's vertices need to be very close to D; so close that changing the least significant bit of the mantissa (vertices are stored in IEEE floating point notation) would move the vertex to the other side of D. This case, though rather uncommon, is by no means impossible in user applications since often polyhedra are entered into the computer with zero tolerance. What results is that D will decide edge A is completely on one side, edge C is completely on the other, and edge B intersects it. Edge B, however, due to floating point errors, will decide that D is completely on one side of it. Thus, neither A, B, nor C will intersect D, although the intersection appears obvious to us humans.

Vertex movement module 1602 is generally configured to move the vertices off of the edges. Because moving the vertex of an edge may cause previously safe vertices to lie on the new edge, operation of the Vertex movement module 1602 should continue until no vertices have to be moved. As an infinite loop limiter, in the rare event that several attempts to move vertices off edges have failed, the loop will terminate with an error message. Execution will continue after the error, however, and the generated interference polygon is often still correct. The movement done on each pass generally affects only the last 3 or 4 mantissa bits of a vertex and is completely unnoticeable at a pixel level.

Figure 17:
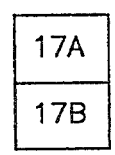
FIG. 17 is comprised of FIGS. 17(a) and 17(b).

In order to avoid the case in FIG. 17, the intersect check in the vertex movement loop will succeed if the lines nearly intersect. Thus, edges A, B, and C would pass the intersect check with D and both vertices of B would be move slightly. If a polygon makes it through the loop without having an intersection or near intersection, it is discarded from further processing. It may still generate interference edges, however, and a simulated scan conversion check is made to see if it is enclosed by the wrong number of polygons. The scan conversion takes a vertex of the polygon and sees how many edges cross a horizontal line from it to $<-\infty,0>$ in the two-dimensional coordinate system.

The polyhedron interference checking module 118 has been described heretofore as operating within the environment of a specific components/subsystems. It will be obvious to one of ordinary skill in the art that polyhedron interference checking module 118 can be easily added to other computer system not heretofore described. Furthermore, the polyhedron interference checking module 118 can be easily integrated with any polygon-generating primitives and/or other graphics primitives available to the user.

The invention works well if the number of vertices allowed in a polygon is unlimited. In conventional computer systems, however, rendering module 208 has a finite limit on the number of vertices it can process in a single polygon. In the VRX product manufactured by HP, this limit is 255 vertices. Thus, cap polygons with more than 255 vertices cannot be rendered by the VRX product rendering module. An alternative embodiment of this invention could include a cap subdivision module as part of the cap formation module.

Figure 18:
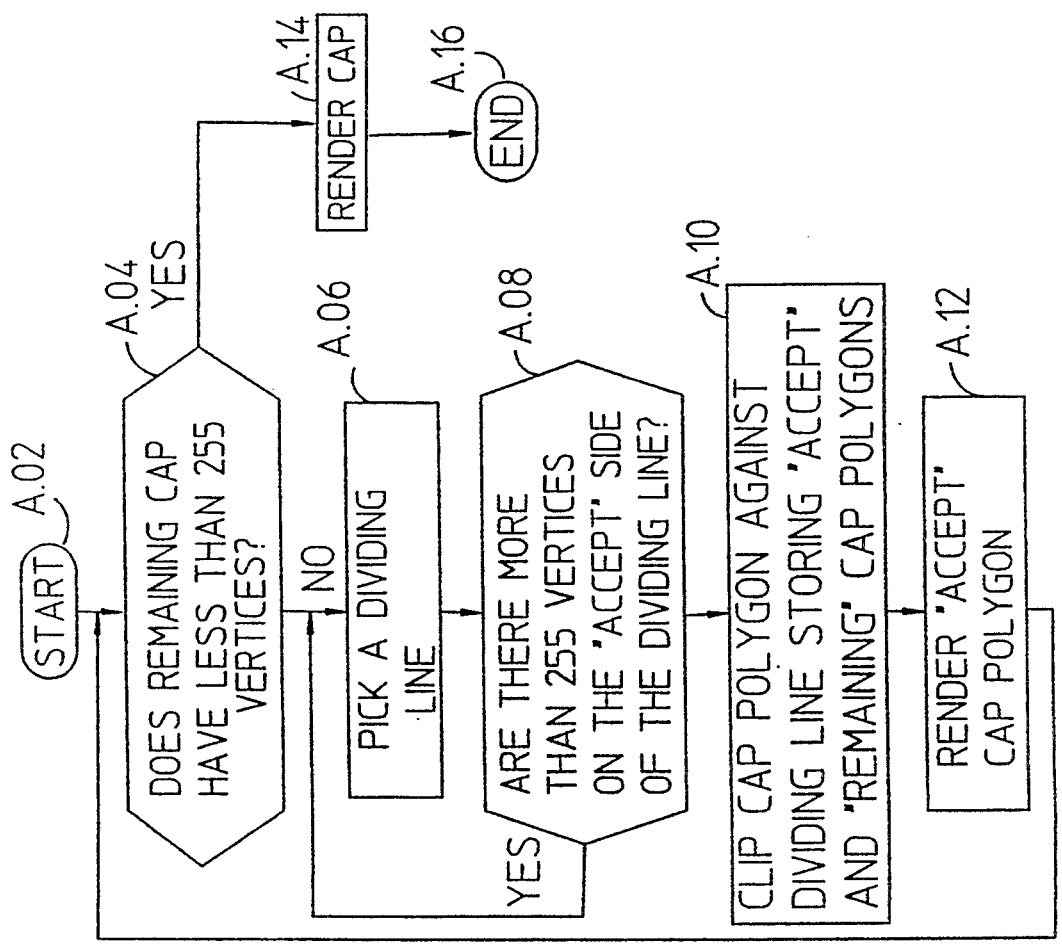
FIG. 18 shows a flow chart for a capped subdivision module.
Figure 19A:
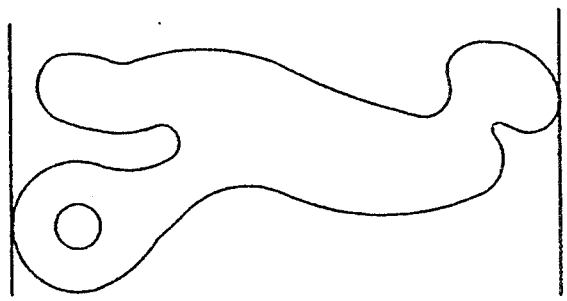
FIGS. 19(A-D) show alternate dividing line placement for polygon division.
Figure 19B:
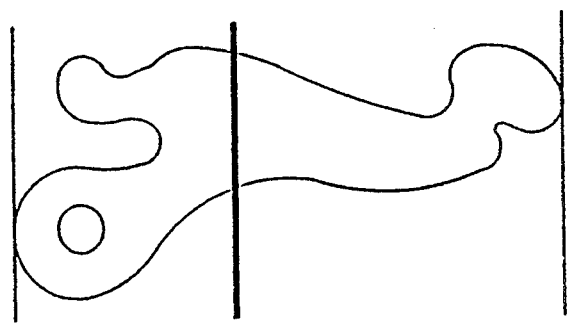
Figure 19C:
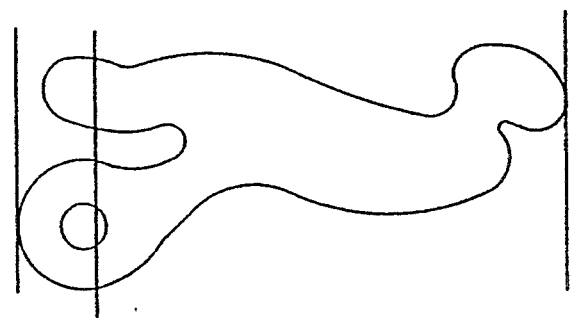
Figure 19D:
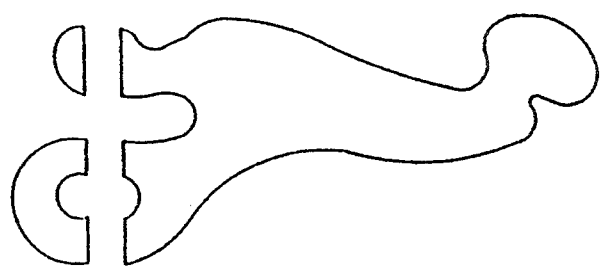

The flowchart for the cap subdivision module is shown in FIG. 18. Upon entering the module from start block A.02, if a cap is too large to be rendered by the rendering module (in this example, the limit is 255 vertices), decisional block A.04 will pass control to operational block A.06.

Operational block A.06 is then configured to pick a dividing line to divide the cap polygon into two new polygons. The first time that a cap polygon must be clipped, the dividing line may be taken as a fraction of the distance from one edge of the polygon to the other. For example, if an 800 vertex cap is to be subdivided, a good first choice for the dividing line would be to place it 200/800 of the way from the left edge to the right edge and specify the left side of the dividing line to be the "accept" cap polygon. As shown by decisional block A.08, if the picked dividing line did not yield an acceptable capping polygon, another dividing line must be chosen. For any given attempt at division, the second and successive dividing lines may be chosen as the average between the left edge of the cap polygon, and the last dividing line attempt.

Decisional block A.08 operates to decide if the chosen dividing line will produce an acceptable cap. For ease of example, let us assume the acceptance region is the left side of a vertical dividing line. In actuality, the accept side may be, but is not limited to, the "less than x" side of a plane with constant x value, the "less than y" side of a plane with constant y, or the "less than z" side of a plane with constant z. The number of vertices which would result from clipping the cap against the dividing line is: the number of vertices to the left of the dividing line PLUS the number of edges which have one vertex on the left of the dividing line and another on the right. If this number is greater than 255, control will pass to A.06 and another dividing line will be chose. Also at this point, but not shown in the flow chart, the cap subdivision module may protect against infinite loops by aborting the cap subdivision attempt if a dividing line has not been found after 10 consecutive attempts.

If the dividing line will yield an acceptable number of vertices, control passes to block A.10 which may be configured to actually clip the cap polygon against the dividing line. This clip will create an "accept" cap polygon with less than 255 vertices, and a "remaining" cap polygon with an unknown number of vertices. The clipping process and degenerate edge removal are similar to the sectioning code and will not be described here.

Control flows from block A.10 to block A.12 where the accepted cap is actually rendered. After rendering the accepted cap, control passes back to A.04 where the remaining cap is checked to see if it has less than 255 vertices. In the case where it does, control is passed to block A.14 which renders the cap. After block A.14, the cap subdivision module ends execution.

As an example, consider FIG. 19. Assume that FIG. 19(a) shows a 600 vertex cap with left and right edges as indicated. The first dividing line attempt is shown in FIG. 19(b). The dividing line was placed on third of the distance from the left edge to the right edge of the polygon since 200/600=one third. In this case, 200 is a constant number representing the number of vertices in an "ideal" accept polygon and 600 is the number of vertices in the actual polygon. In this example, we will assume that the accept polygon is calculated to have 350 vertices. Decision block A.08 would thus return control to A.06 where another dividing line is to be chosen. The second dividing line, as shown in FIG. 19(c) may be half-way between the first line and the left edge. Now assume that block A.08 discovers 220 vertices on the left of the dividing line and 6 edges which cross the dividing line. As shown in FIG. 19(d), the accept polygon will thus have 226 vertices after clipping and the remaining polygon will have 386. The accept polygon will then be rendered and the remaining polygon will be further subdivided.

As discussed previously, the cap edge lists for multiple sectioning planes are all independent of each other. In this way, the designer may close the caps independently of whatever other sectioning planes exist. By way of example only, the designer could close one cap with a blue color, and another with a red color. The designer, however, does still have the option of closing multiple caps in a single command. If only one processing module exists, it will then have to process each cap in series. However, since the caps are independent of each other, if a plurality of processors exist, they may close a plurality of caps using parallelism.

One implementation of a parallel graphics pipeline allows individual polygons from a polyhedron to be processed by one of a plurality of processors. Thus, each processor may need to maintain an edge list for each sectioning plane. With three processors, for example, there may be three edge lists for a single cap for a single sectioning plane.

In order to close caps in parallel, each processing element must determine or be assigned cap(s) for which it will be responsible. After this determination, the processors may need to communicate in order to bring all of the edges for a given cap within the address space of the processor responsible for it. In other words, since the edge list for a single cap polygon may be scattered among a plurality of edge lists, these edge lists need to be coalesced into a single edge list. Once the edges of the caps are readily available to the processors assigned to them, the cap formation modules may perform as previously described with the multiple processors proceeding through vertex matching and transformations in parallel.

In another embodiment of the present invention the memory module could remember which pixels have been drawn due to cap polygons and when they are drawn over again by a different cap polygon it could be drawn with a user defined color. This would not require edge intersection calculations, but would only require additional memory to remember where cap polygons are on the video screen.

For example, consider FIG. 20(a) which shows a 6×6 array of pixels. Consider then a cap polygon which is a triangle. When rendered to the screen as a set of pixels the triangle covers the pixels numbered 2, 8, 9, 14, 15, 16, 20, 21, 22 and 23. In conventional computer graphics systems, each of these pixels may have a variety of data associated with it including, but not limited to: 8 bits for red coloring, 8 bits for green coloring, 8 bits for blue coloring, and 24 bits for Z buffering (used in conventional systems for hidden surface removal). The alternative embodiment proposed would also add one bit which is set when the pixel is rendered as part of cap polygon. Next, consider FIG. 20(c) in which a second, separate, cap polygon is rendered which covers pixels 16, 17, 18, 22, 23, 24, 28, 29 and 30. Since pixels 22, 28 and 29 were rendered as part of the triangular cap polygon, the rendering module may detect this and alter the color written for those pixels to signify cap polygon interference. The color may be specified by the designer or may be predefined by the graphics device.

While this is an alternative embodiment of interference checking capping polygons, it is not as complete as the embodiment described in detail previously since it would fail to detect interference in FIGS. 15(c) and 15(e) and would only succeed in detecting interference in FIGS. 15(b) and 15(f) if the polygons in those pictures were from separate cap polygons (as opposed to part of a single polyhedron).

An excellent discussion on computer graphics is found in Foley, James, et al., *Computer Graphics, Principles and Practice*, Second Edition, Addison-Wesley Publishing Co., N.Y., N.Y., 1989, which is incorporated by reference in its entirety herein.

The foregoing description is intended primary for purposes of illustration. The polyhedron interference checking module 118 of the present invention may be embodied in other forms or carried out in other ways without departing from the spirit or scope of the invention. Modifications and variations still falling within the spirit or the scope of the invention will be readily apparent to those of ordinary skill in the art.

What is claimed:

1. A computer graphics system configured to allow a user to move at least one sectioning plane about at least one polyhedron having a plurality of polygons and to display an interference area between the plurality of polygons, the computer graphics system comprising:
   (a) at least one processor and at least one memory unit configured with the computer graphics system to process data;
   (b) an input device configured with the computer graphics system to allow the user to specify the at least one sectioning plane;
   (c) an interference checking module configured with the computer graphics system to generate an interference cap polygon indicative of the interference area, the interference checking module comprising a sectioning module, a cap formation module, and an interference module; and
   (d) a display device configured with the computer graphics system to display said interference cap polygon.

2. The computer graphics system of claim 1, wherein said sectioning module is configured to section the plurality of polygons of each polyhedron against the at least one sectioning plane.

3. The computer graphics system of claim 2, wherein said cap formation module is configured to generate a cap polygon for each polyhedron after at least one of the plurality of polygons of each polyhedron have been sectioned, each cap polygon has a plurality of vertices.

4. The computer graphics system of claim 3, wherein said interference module comprises;
   (a) an extent determination module; and
   (b) an interference cap generation module.

5. The computer graphics system of claim 4, wherein said extent determination module is configured to determine whether each of said cap polygons is an including area or an excluding area.

6. The computer graphics system of claim 5, wherein said extent determination module is configured to calculate an extent area for each said cap polygon, said extent area being indicative of whether said cap polygon bounds said including area or said excluding area.

7. The computer graphics system of claim 6, wherein said interference cap generation module is configured to generate said interference cap polygon.

8. The computer graphics system of claim 7, wherein said interference cap generation module is further configured to compare said each cap polygon against each other to thereby generate an interference cap list.

9. The computer graphics system of claim 8, wherein said interference cap list contains a plurality of vertices indicative of said interference cap polygon.

10. The computer graphics system of claim 9, wherein said interference cap generation module is further configured to determine whether the vertices of each of said cap polygons are part of the interference area.

11. The computer graphics system of claim 10, wherein said interference cap generation module is further configured to store said vertices in an interference cap list if said vertices are part of the interference area.

12. The computer graphics system of claim 11, wherein said interference cap generation module is further configured to determine whether each of said cap polygons intersects with each other, an if an intersection exists, to calculate an interference point.

13. The computer graphics system of claim 12, wherein said interference cap generation module is further configured to store said intersection point in said interference cap list.

14. The computer graphics system of claim 12, wherein said interference cap generation module is further configured to generate said interference cap polygon from said interference cap list.

15. A computer graphics system configured to allow a user to move at least one sectioning plane about at least one polyhedron having a plurality of polygons and to display an interference area between the plurality of polygons, the computer graphics system comprising:
(a) at least one processor and at least one memory unit configured with the computer graphics system to process data;
(b) an input device configured with the computer graphics system to allow the user to specify the at least one sectioning plane;
(c) interference checking means configured with the computer graphics system for generating an interference cap polygon indicative of the interference area, said interference checking means comprising a sectioning means for sectioning the plurality of polygons of each polyhedron against the at least one sectioning plane; and
(d) a display device configured with the computer graphics system to display said interference cap polygon.

16. The computer graphics system of claim 15, wherein said interference checking means further comprises a cap formation means for generating a cap polygon for each polyhedron after at least one of the plurality of polygons of each polyhedron have been sectioned by said sectioning means, each cap polygon has a plurality of vertices.

17. The computer graphics system of claim 16, wherein said interference checking means further comprises an extent determination means for determining whether each of said cap polygons is an including area or an excluding area.

18. The computer graphics system of claim 17, wherein said extent determination means is configured to calculate an extent area for each said cap polygon, said extent area being indicative of whether said cap polygon bounds said including area or said excluding area.

19. The computer graphics system of claim 18, wherein said interference checking means further comprises interference cap generation means for generating said interference cap polygon.

20. The computer graphics system of claim 19, wherein said interference cap generation means is further configured to compare said each cap polygon against each other to thereby generate an interference cap list.

21. The computer graphics system of claim 20, wherein said interference cap list contains a plurality of vertices indicative of said interference cap polygon.

22. The computer graphics system of claim 21, wherein said interference cap generation means is further configured to determine whether the vertices of each of said cap polygons are part of the interference area.

23. The computer graphics system of claim 22, wherein said interference cap generation means is further configured to store said vertices in an interference cap list if said vertices are part of the interference area.

24. The computer graphics system of claim 23, wherein said interference cap generation means is further configured to determine whether each of said cap polygons intersects with each other, an if an intersection exists, to calculate an interference point.

25. The computer graphics system of claim 24, wherein said interference cap generation means is further configured to store said intersection point in said interference cap list.

26. The computer graphics system of claim 25, wherein said interference cap generation means is further configured to generate said interference cap polygon from said interference cap list.

27. A computer graphics system for moving at least one sectioning plane about at least one polyhedron having a plurality of polygons and to display an interference area between the plurality of polygons, the computer graphics module comprising:
(a) a storage medium that can operate with the computer graphics system;
(b) interference checking means, configured on said storage medium, for instructing the computer graphics system how to interference check the at least one polyhedron about the at least one sectioning plane, said interference checking means comprising a sectioning module, a cap formation module, and an interference module.

28. The computer graphics system of claim 27, wherein said sectioning module is configured to section the plurality of polygons of each polyhedron against the at least one sectioning plane.

29. The computer graphics system of claim 28, wherein said cap formation module is configured to generate a cap polygon for each polyhedron after at least one of the plurality of polygons of each polyhedron have been sectioned, each cap polygon has a plurality of vertices.

30. The computer graphics system of claim 29, wherein said interference module comprises;
(a) an extent determination module; and
(b) an interference cap generation module.

31. The computer graphics system of claim 29, wherein said interference module comprises a display module to identify pixels previously rendered as capped pixels, and highlight said identified pixels previously rendered as capped pixels to show interference.

32. The computer graphics system of claim 30, wherein said extent determination module is configured to determine whether each of said cap polygons is an including area or excluding area.

33. The computer graphics system of claim 32, wherein said extent determination module is configured to calculate an extent area for each said cap polygon, said extent area being indicative of whether said cap polygon bounds said including area or said excluding area.

34. The computer graphics system of claim 33, wherein said interference cap generation module is configured to generate said interference cap polygon.

35. The computer graphics system of claim 34, wherein said interference cap generation module is further configured to compare said each cap polygon against each other to thereby generate an interference cap list.

36. The computer graphics system of claim 35, wherein said interference cap list contains a plurality of vertices indicative of said interference cap polygon.

37. The computer graphics system of claim 36, wherein said interference cap generation module is further configured to determine whether the vertices of each of said cap polygons are part of the interference area.

38. The computer graphics system of claim 37, wherein said interference cap generation module is further configured to store said vertices in an interference cap list if said vertices are part of the interference area.

39. The computer graphics system of claim 38, wherein said interference cap generation module is further configured to determine whether each of said cap polygons intersects with each other, an if an intersection exists, to calculate an interference point.

40. The computer graphics system of claim 39, wherein said interference cap generation module is further configured to store said intersection point in said interference cap list.

41. The computer graphics system of claim 40, wherein said interference cap generation module is further configured to generate said interference cap polygon from said interference cap list.

42. A computer method for interference checking of at least one polyhedron having a plurality of polygons on a computer graphics system about at least one sectioning plane, the computer method comprising the steps of:
(a) sectioning the at least one polyhedron on the computer graphics system about the at least one sectioning plane;
(b) generating a cap polygon on the computer graphics system for each of the polyhedron that have been sectioned, the cap polygon having a plurality of vertices; and
(c) generating an interference cap polygon indicative of the overlapping area between each of the cap polygons, step (c) comprising the step of determining whether each of the cap polygons is an including area or an excluding area.

43. The computer method of claim 42, wherein said step of generating an interference cap polygon further comprises the step of calculating an extent area for each the cap polygon, the extent area being indicative of whether the cap polygon bounds said including area or said excluding area.

44. The computer method of claim 43, wherein said step of generating an interference cap polygon further comprises the step of comparing each cap polygon against each other to thereby generate an interference cap list.

45. The computer method of claim 44, wherein said step of generating an interference cap polygon further comprises the step of determining whether the vertices of each of the cap polygons are part of the interference area.

46. The computer method of claim 45, wherein said step of generating an interference cap further comprises the step of storing the vertices in an interference cap list if the vertices are part of the interference area.

47. The computer method of claim 46, wherein said step of generating an interference cap further comprises the step of determining whether each of the cap polygons intersects with each other, an if an intersection exists, to calculate an interference point.

48. The computer method of claim 47, wherein said step of generating an interference cap further comprises the step of storing the intersection point in the interference cap list.

49. The computer method of claim 48, wherein said step of generating an interference cap further comprises the step of generating the interference cap polygon from the interference cap list.

50. A computer graphics system configured to allow a user to move at least one sectioning plane about at least one polyhedron having a plurality of polygons and to display, if necessary, an interference area between the plurality of polygons, the computer graphics system comprises;
(a) at least one processor and at least one memory unit configured with the computer graphics system to process data;
(b) an input device configured with the computer graphics system to allow the user to specify the at least one sectioning plane;
(c) an interference checking module configured with the computer graphics system to generate a two-dimensional interference cap polygon having a boundary, wherein said boundary is determined by at least one cap polygon generated by an intersection of at least one sectioning plane and at least one polyhedron; and
(d) a display device configured with the computer graphics system to display said interference cap polygon.

51. A computer graphics system configured to allow a user to move at least one sectioning plane about at least one polyhedron having a plurality of polygons and to display, if necessary, an interference area between the plurality of polygons, the computer graphics system comprises;
(a) at least one processor and at least one memory unit configured with the computer graphics system to process data;
(b) an input device configured with the computer graphics system to allow the user to specify the at least one sectioning plane;
(c) an interference checking module configured with the computer graphics system to generate a two-dimensional interference cap polygon having a boundary, wherein said boundary is determined by at least one cap polygon generated by an intersection of at least one sectioning plane and at least one polyhedron; and (d) a display device configured with the computer graphics system to display said interference cap polygon.

52. A computer graphics system for moving at least one sectioning plane about at least one polyhedron having a plurality of polygons and to display, if necessary, an interference area between the plurality of polygons, the computer graphics module comprises:

(a) a storage medium that can operate with the computer graphics system;

(b) interference checking means, configured on said storage medium, for instructing the computer graphics system how to indicate an interference area having a boundary, wherein said boundary is determined by at least one cap polygon generated by an intersection of at least one sectioning plane and at least one polyhedron.

53. A computer method for interference checking of at least one polyhedron having a plurality of polygons on a computer graphics system about at least one sectioning plane, the computer method comprising the steps of:

(a) sectioning the at least one polyhedron on the computer graphics system about the at least one sectioning plane;

(b) generating a cap polygon on the computer graphics system for each of the polyhedron that have been sectioned, the cap polygon having a plurality of vertices; and (c) generating a two-dimensional interference cap polygon having a boundary, wherein said boundary is determined by said cap polygon.

* * * * *